United States Patent
Yamamoto et al.

(10) Patent No.: US 10,638,085 B2
(45) Date of Patent: *Apr. 28, 2020

(54) REPRODUCTION DEVICE, REPRODUCTION METHOD, AND RECORDING MEDIUM

(71) Applicant: SATURN LICENSING LLC, New York, NY (US)

(72) Inventors: Kazuo Yamamoto, Chiba (JP); Toshiya Hamada, Saitama (JP); Kuniaki Takahashi, Tokyo (JP); Shinobu Hattori, Tokyo (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/047,253

(22) Filed: Jul. 27, 2018

(65) Prior Publication Data

US 2018/0338110 A1    Nov. 22, 2018

Related U.S. Application Data

(63) Continuation of application No. 15/160,642, filed on May 20, 2016, now Pat. No. 10,070,097, which is a
(Continued)

(30) Foreign Application Priority Data

Jun. 20, 2013    (JP) .................... 2013-129993

(51) Int. Cl.
*H04N 5/765*    (2006.01)
*H04N 5/92*    (2006.01)
(Continued)

(52) U.S. Cl.
CPC .......... *H04N 5/9201* (2013.01); *G11B 20/10* (2013.01); *G11B 27/105* (2013.01);
(Continued)

(58) Field of Classification Search
CPC ...... H04N 19/70; H04N 19/30; H04N 19/184; H04N 19/44; H04N 19/46; H04N 5/9201;
(Continued)

(56) References Cited

U.S. PATENT DOCUMENTS

2005/0286870 A1    12/2005    Owada
2008/0192819 A1    8/2008    Ward et al.
(Continued)

FOREIGN PATENT DOCUMENTS

CA    2563523    11/2005
CN    1713710 A    12/2005
(Continued)

OTHER PUBLICATIONS

Flynn et al., "High Efficiency Video Coding (HEVC) Range Extensions text specification: Draft 2 (for PDAM)", Joint Collaborative Team on Video Coding (JCT-VC) of ITU-T SG 16 WP 3 and ISO/IEC JTC 1/ SC 29/WG 11, Jan. 14-23, 2013, pp. i-301, 12$_{th}$ Meeting: Geneva, CH.
(Continued)

*Primary Examiner* — Robert Chevalier
(74) *Attorney, Agent, or Firm* — Paratus Law Group, PLLC

(57) ABSTRACT

The present technology relates to a reproduction device, a reproduction method, and a recording medium that enable content having a wide dynamic range of brightness to be displayed with an appropriate brightness. A recording medium, on which the reproduction device of one aspect of the present technology performs reproduction, records coded data of an extended video that is a video having a second brightness range that is wider than a first brightness range, brightness characteristic information that represents a brightness characteristic of the extended video, and brightness conversion definition information used when perform-
(Continued)

ing a brightness conversion of the extended video to a standard video that is a video having the first brightness range. The reproduction device decodes the coded data and converts the extended video obtained by decoding the coded data to the standard video on the basis of the brightness conversion definition information.

22 Claims, 55 Drawing Sheets

Related U.S. Application Data continuation of application No. 14/896,041, filed as application No. PCT/JP2014/065053 on Jun. 6, 2014, now Pat. No. 9,774,819.

(51) Int. Cl.
| | |
|---|---|
| H04N 19/70 | (2014.01) |
| H04N 19/30 | (2014.01) |
| H04N 19/184 | (2014.01) |
| G11B 20/10 | (2006.01) |
| G11B 27/32 | (2006.01) |
| H04N 19/44 | (2014.01) |
| H04N 19/46 | (2014.01) |
| G11B 27/10 | (2006.01) |
| H04N 9/87 | (2006.01) |
| H04N 9/80 | (2006.01) |
| H04N 9/797 | (2006.01) |

(52) U.S. Cl.
CPC ............ *G11B 27/329* (2013.01); *H04N 9/87* (2013.01); *H04N 19/184* (2014.11); *H04N 19/30* (2014.11); *H04N 19/44* (2014.11); *H04N 19/46* (2014.11); *H04N 19/70* (2014.11); *G11B 2220/2541* (2013.01)

(58) Field of Classification Search
CPC ........ H04N 9/87; G11B 27/105; G11B 20/10; G11B 27/329; G11B 2220/2541
USPC ....... 386/248, 307, 324, 326, 335, 337, 354, 386/355
See application file for complete search history.

(56) References Cited

U.S. PATENT DOCUMENTS

| | | |
|---|---|---|
| 2008/0310501 A1 | 12/2008 | Ward et al. |
| 2010/0110301 A1 | 5/2010 | Ota et al. |
| 2011/0081132 A1 | 4/2011 | Iwata et al. |
| 2011/0145432 A1 | 6/2011 | Kato |
| 2011/0274156 A1 | 11/2011 | Mighani et al. |
| 2012/0075421 A1 | 3/2012 | Tsukagoshi |
| 2012/0230597 A1 | 9/2012 | Ward et al. |
| 2012/0230656 A1 | 9/2012 | Owada |
| 2014/0037206 A1 | 2/2014 | Newton et al. |
| 2015/0245050 A1 | 8/2015 | Tourapis et al. |
| 2016/0134832 A1 | 5/2016 | Yamamoto et al. |
| 2017/0078724 A1* | 3/2017 | Wilson .................. G06F 3/1462 |

FOREIGN PATENT DOCUMENTS

| | | |
|---|---|---|
| CN | 101118772 A | 2/2008 |
| CN | 101742083 A | 6/2010 |
| CN | 101902637 A | 12/2010 |
| CN | 103079045 A | 5/2013 |
| CN | 103621084 A | 3/2014 |
| EP | 1743301 A1 | 1/2007 |
| EP | 2184734 A1 | 5/2010 |
| EP | 2702765 A1 | 3/2014 |
| JP | 2006-013750 A | 1/2006 |
| JP | 2007-534238 A | 11/2007 |
| JP | 2009-058692 A | 3/2009 |
| JP | 2009-089209 A | 4/2009 |
| JP | 2010-114557 A | 5/2010 |
| JP | 2014-519221 A | 8/2014 |
| KR | 10-2007-0026525 | 3/2007 |
| RU | 2009-140834 A | 5/2011 |
| RU | 2433477 C1 | 11/2011 |
| WO | WO 2012/147010 A1 | 11/2012 |
| WO | WO 2012/153224 A1 | 11/2012 |
| WO | 2013/046095 A1 | 4/2013 |

OTHER PUBLICATIONS

Sep. 9, 2014, Written Opinion of the International Searching Authority for related PCT Application No. PCT/JP2014/065053.
Nov. 15, 2016, AU communication issued for related AU application No. 2014282416.
Nov. 24, 2016, EP communication issued for related EP application No. 14813229.3.
Hattori et al., Signaling of Luminance Dynamic Range in Tone mapping information SEI, International Organisation for Standardisation ISO/IEC JTC1/SC29/WG11 Coding of Moving Pictures and Audio, Oct. 2012, pp. 1-6, Shanghai, China.
Suzuki et al., Text of ISO/IEC 14496-10:2012/DAM 4 Additional Colour Space and Tone Mapping Descriptors, International Organization for Standardization ISO/IEC/JTC1/SC29/WG11 Coding of Moving Pictures and Associated Audio Information, Apr. 2013, pp. 1-16, Incheon, KR.
May 4, 2018, Chinese Office Action issued for related CN application No. 201480033681X.

* cited by examiner

FIG. 7

| | | Descriptor |
|---|---|---|
| 1: | tone_mapping_info(payloadSize) { | |
| 2: |   tone_map_id | ue(v) |
| 3: |   tone_map_cancel_flag | u(1) |
| 4: |   if(!tone_map_cancel_flag) { | |
| 5: |     tone_map_persistence_flag | u(1) |
| 6: |     coded_data_bit_depth | u(8) |
| 7: |     target_bit_depth | u(8) |
| 8: |     tone_map_model_id | ue(v) |
| 9: |     if(tone_map_model_id==0) { | |
| 10: |       min_value | u(32) |
| 11: |       max_value | u(32) |
| 12: |     }else if(tone_map_model_id==1) { | |
| 13: |       sigmoid_midpoint | u(32) |
| 14: |       sigmoid_width | u(32) |
| 15: |     }else if(tone_map_model_id==2) { | |
| 16: |       for(i=0;i<(1<<target_bit_depth);i++) | |
| 17: |         start_of_coded_interval[i] | u(v) |
| 18: |     }else if(tone_map_model_id==3) { | |
| 19: |       num_pivots | u(16) |
| 20: |       for(i=0;i<num_pivots;i++) { | |
| 21: |         coded_pivot_value[i] | u(v) |
| 22: |         target_pivot_value[i] | u(v) |
| 23: |       } | |
| 24: |     }else if(tone_map_model_id==4) { | |
| 25: |       camera_iso_speed_idc | u(8) |
| 26: |       if(camera_iso_speed_idc==EXTENDED_ISO) | |
| 27: |         camera_iso_speed_value | u(32) |
| 28: |       exposure_index_idc | u(8) |
| 29: |       if(exposure_index_idc==EXTENDED_ISO) | |
| 30: |         exposure_index_value | u(32) |
| 31: |       exposure_compensation_value_sign_flag | u(1) |
| 32: |       exposure_compensation_value_numerator | u(16) |
| 33: |       exposure_compensation_value_denom_idc | u(16) |
| 34: |       ref_screen_luminance_white | u(32) |
| 35: |       extended_range_white_level | u(32) |
| 36: |       nominal_black_level_code_value | u(16) |
| 37: |       nominal_white_level_code_value | u(16) |
| 38: |       extended_white_level_code_value | u(16) |
| 39: |     } | |
| 40: |   } | |
| 41: | } | |

FIG. 8

```
(tone_map_model_id=0)
    min_value
    max_value (tone_map_model_id=2)
    for(i=0; i<(1<<target_bit_depth); i++)
        start_of_coded_interval[i]

(tone_map_model_id=3)
    num_pivots
    for(i=0; i<num_pivots; i++){
        coded_pivot_value[i]
        target_pivot_value[i]
    }
```
⎱ USE ONE AMONG THREE AS tone mapping DEFINITION INFORMATION FOR STD → HDR CONVERSION OR AS tone mapping DEFINITION INFORMATION FOR HDR → STD CONVERSION.

```
(tone_map_model_id=4)
    camera_iso_speed_idc
    if(camera_iso_speed_idc==EXTENDED_ISO)
        camera_iso_speed_value
    exposure_index_idc
    if(exposure_index_idc==EXTENDED_ISO)
        exposure_index_value
    exposure_compensation_value_sign_flag
    exposure_compensation_value_numerator
    exposure_compensation_value_denom_idc
    ref_screen_luminance_white
    extended_range_white_level
    nominal_black_level_code_value
    nominal_white_level_code_value
    extended_white_level_code_value
```
⎱ USE AS HDR INFORMATION.

FIG. 16

| Syntax | No. of bits | Mnemonic |
|---|---|---|
| xxxxx.mpls { | | |
|     type_indicator | 8*4 | bslbf |
|     version_number | 8*4 | bslbf |
|     PlayList_start_address | 32 | uimsbf |
|     PlayListMark_start_address | 32 | uimsbf |
|     ExtensionData_start_address | 32 | uimsbf |
|     reserved_for_future_use | 160 | bslbf |
|     AppInfoPlayList() | | |
|     for(i=0; i<N1; i++) { | | |
|         padding_word | 16 | bslbf |
|     } | | |
|     PlayList() | | |
|     for(i=0; i<N2; i++) { | | |
|         padding_word | 16 | bslbf |
|     } | | |
|     PlayListMark() | | |
|     for(i=0; i<N3; i++) { | | |
|         padding_word | 16 | bslbf |
|     } | | |
|     ExtensionData() | | |
|     for(i=0; i<N4; i++) { | | |
|         padding_word | 16 | bslbf |
|     } | | |
| } | | |

FIG. 17

| Syntax | No. of bits | Mnemonic |
|---|---|---|
| zzzzz.clpi { | | |
|     type_indicator | 8*4 | bslbf |
|     version_number | 8*4 | bslbf |
|     SequenceInfo_start_address | 32 | uimsbf |
|     ProgramInfo_start_address | 32 | uimsbf |
|     CPI_start_address | 32 | uimsbf |
|     ClipMark_start_address | 32 | uimsbf |
|     ExtensionData_start_address | 32 | uimsbf |
|     reserved_for_future_use | 96 | bslbf |
|     ClipInfo() | | |
|     for (i=0; i<N1; i++) { | | |
|         padding_word | 16 | bslbf |
|     } | | |
|     SequenceInfo() | | |
|     for (i=0; i<N2; i++) { | | |
|         padding_word | 16 | bslbf |
|     } | | |
|     ProgramInfo() | | |
|     for (i=0; i<N3; i++) { | | |
|         padding_word | 16 | bslbf |
|     } | | |
|     CPI() | | |
|     for (i=0; i<N4; i++) { | | |
|         padding_word | 16 | bslbf |
|     } | | |
|     ClipMark() | | |
|     for (i=0; i<N5; i++) { | | |
|         padding_word | 16 | bslbf |
|     } | | |
|     ExtensionData() | | |
|     for (i=0; i<N6; i++) { | | |
|         padding_word | 16 | bslbf |
|     } | | |
| } | | |

FIG. 18

| Syntax | No. of bits | Mnemonic |
|---|---|---|
| ProgramInfo() { | | |
|   length | 32 | uimsbf |
|   reserved_for_word_align | 8 | bslbf |
|   number_of_program_sequences | 8 | uimsbf |
|   for(i=0; i<number_of_program_sequences; i++) { | | |
|     SPN_program_sequence_start[i] | 32 | uimsbf |
|     program_map_PID[i] | 16 | uimsbf |
|     number_of_streams_in_ps[i] | 8 | uimsbf |
|     reserved_for_future_use | 8 | bslbf |
|     for(stream_index=0; stream_index<number_of_streams_in_ps[i]; stream_index++) { | | |
|       stream_PID[i][stream_index] | 16 | uimsbf |
|       StreamCodingInfo(i, stream_index) | | |
|     } | | |
|   } | | |
| } | | |

FIG. 19

| Syntax | No. of bits | Mnemonic |
|---|---|---|
| StreamCodingInfo(i, stream_index) { | | |
| length | 8 | uimsbf |
| stream_coding_type | 8 | bslbf |
| if(stream_coding_type==0x02\|\| | | |
| stream_coding_type==0x1B\|\| | | |
| stream_coding_type==0xEA{ | | |
| video_format | 4 | bslbf |
| frame_rate | 4 | bslbf |
| aspect_ratio | 4 | bslbf |
| reserved_for_future_use | 2 | bslbf |
| cc_flag | 1 | bslbf |
| HDR_flag | 1 | bslbf |
| mode_flag | 1 | bslbf |
| reserved_for_future_use | 15 | bslbf |
| ... | | |

FIG. 35

| Syntax | No. of bits | Mnemonic |
|---|---|---|
| AppInfoPlayList() { | | |
|   length | 32 | uimsbf |
|   reserved_for_future_use | 8 | bslbf |
|   PlayList_playback_type | 8 | bslbf |
|   if(PlayList_playback_type==2\|\|PlayList_playback_type==3{ | | |
|     playback_count | 16 | uimsbf |
|   }else{ | | |
|     reserved_for_futute_use | 16 | bslbf |
|   } | | |
|   UO_mask_table() | | |
|   PlayList_random_access_flag | 1 | bslbf |
|   audio_mix_app_flag | 1 | bslbf |
|   lossless_may_bypass_mixer_flag | 1 | bslbf |
|   MVC_Base_view_R_flag | 1 | bslbf |
|   HDR_flag | 1 | bslbf |
|   mode_flag | 1 | bslbf |
|   reserved_for_future_use | 10 | bslbf |
| } | | |

FIG. 36

| Syntax | No. of bits | Mnemonic |
|---|---|---|
| PlayList() { | | |
|   length | 32 | uimsbf |
|   reserved_for_future_use | 16 | bslbf |
|   number_of_PlayItems | 16 | uimsbf |
|   number_of_SubPaths | 16 | uimsbf |
|   for(PlayItem_id=0; | | |
|     PlayItem_id<number_of_PlayItems; | | |
|     PlayItem_id++) { | | |
|     PlayItem() | | |
|   } | | |
|   for(SubPath_id= 0; | | |
|     SubPath_id<number_of_SubPaths; | | |
|     SubPath_id++) { | | |
|     SubPath() | | |
|   } | | |
| } | | |

FIG. 37

| Syntax | No. of bits | Mnemonic |
|---|---|---|
| PlayItem() { | | |
|     length | 16 | uimsbf |
|     Clip_Information_file_name[0] | 8*5 | bslbf |
|     Clip_codec_identifier[0] | 8*4 | bslbf |
|     reserved_for_future_use | 11 | bslbf |
|     is_multi_angle | 1 | bslbf |
|     connection_condition | 4 | uimsbf |
|     ref_to_STC_id[0] | 8 | uimsbf |
|     IN_time | 32 | uimsbf |
|     OUT_time | 32 | uimsbf |
|     UO_mask_table() | | |
|     PlayItem_random_access_mode | 8 | uimsbf |
|     still_mode | 8 | uimsbf |
|     if(still_mode==0x1) { | | |
|         still_time | 16 | uimsbf |
|     }else{ | | |
|         reserved | 16 | bslbf |
|     } | | |
|     if(is_multi_angle==1b) { | | |
|         number_of_angles | 8 | uimsbf |
|         reserved_for_future_use | 7 | bslbf |
|         is_seamless_angle_change | 1 | uimsbf |
|         for(angle_id = 1; //Note: angles after angle_id=1 | | |
|         angle_id<number_of_angles; angle_id++) { | | |
|             Clip_Information_file_name[angle_id] | 8*5 | bslbf |
|             Clip_codec_identifier[angle_id] | 8*4 | bslbf |
|             ref_to_STC_id[angle_id] | 8 | uimsbf |
|             reserved_for_future_use | 16 | bslbf |
|         } | | |
|     } | | |
|     STN_table() | | |
| } | | |

FIG. 38

| Syntax | No. of bits | Mnemonic |
|---|---|---|
| STN_table() { | | |
|     length | 16 | uimsbf |
|     reserved_for_future_use | 16 | bslbf |
|     number_of_video_stream_entries | 8 | uimsbf |
|     number_of_audio_stream_entries | 8 | uimsbf |
|     number_of_audio_stream2_entries | 8 | uimsbf |
|     number_of_PG_textST_stream_entries | 8 | uimsbf |
|     number_of_IG_stream_entries | 8 | uimsbf |
|     reserved_for_future_use | 64 | bslbf |
|     for (video_stream_id=0;<br>        video_stream_id < number_of_video_stream_entries;<br>        video_stream_id++) { | | |
|         stream_entry() | | |
|         stream_attribute() | | |
|     } | | |
|     for (audio_stream_id=0;<br>        audio_stream_id < number_of_audio_stream_entries;<br>        audio_stream_id++) { | | |
|         stream_entry() | | |
|         stream_attributes() | | |
|     } | | |
|     for (audio_stream_id2=0;<br>        audio_stream_id2 < number_of_audio_stream2_entries;<br>        audio_stream_id2++) { | | |
|         stream_entry() | | |
|         stream_attributes() | | |
|     } | | |
|     for (PG_textST_stream_id=0;<br>        PG_textST_stream_id < number_of_PG_textST_stream_entries;<br>        PG_textST_stream_id++) { | | |
|         stream_entry() | | |
|         stream_attribute() | | |
|     } | | |
|     for (IG_stream_id=0;<br>        IG_stream_id < number_of_IG_stream_entries;<br>        IG_stream_id++) { | | |
|         stream_entry() | | |
|         stream_attribute() | | |
|     } | | |
| } | | |

FIG. 39

| Syntax | No. of bits | Mnemonic |
|---|---|---|
| stream_attributes () { | | |
| length | 8 | uimsbf |
| stream_coding_type | 8 | bslbf |
| if(stream_coding_type==0x02\|\| | | |
| stream_coding_type==0x1B\|\| | | |
| stream_coding_type==0xEA{ | | |
| video_format | 4 | bslbf |
| frame_rate | 4 | bslbf |
| HDR_flag | 1 | bslbf |
| mode_flag | 1 | bslbf |
| reserved_for_future_use | 22 | bslbf |

FIG. 40

| PSR number | Name | Meaning |
|---|---|---|
| 0 | Interactive Graphics | Interactive Graphics Stream Number |
| 1 | Primary Audio | Primary Audio Stream Number |
| 2 | PG TextST stream and PiP PG TextST stream | PG TextST Stream Number and PiP PG TextST Stream Number |
| 3 | Angle | Angle Number |
| 4 | Title | Title Number |
| 5 | Chapter | Chapter Number |
| 6 | PlayList | PlayList id |
| 7 | PlayItem | PlayItem id |
| 8 | Presentation Time | Presentation Time in 45kHz |
| 9 | Timer | Navigation Timer |
| 10 | Selected Button | Button id in Selected State |
| 11 | Menu Page | Page id |
| 12 | Selected Style | User Style Number |
| 13 | Parental | Parental Level |
| 14 | Secondary Audio and Secondary Video | Secondary Audio Stream Number and Secondary Video Stream Number |
| 15 | Audio Capability | Player Capability for Audio |
| 16 | Audio Language | Language Code for Audio |
| 17 | Presentation Graphics and Text subtitle Language | Language Code for Presentation Graphics and Text subtitle |
| 18 | Menu Language | Language Code for Menu Description |
| 19 | Country | Country Code |
| 20 | Region | Region Code |
| 21 | Output Mode Preference (Note3) | Output Mode Preference value |
| 22 | Stereoscopic status(Note3) | Stereoscopic status |
| 23 | Display Capability(Note3) | Display Capability for video |
| 24 | 3D Capability(Note3) | Player Capability for 3D |
| 25 | HDR Display Capability | Display Capability |
| 26~28 | - | reserved |
| 29 | Video Capability | Player Capability for Video |
| 30 | Text Capability | Player Capability for Text Subtitle |
| 31 | Player Profile/ Player Version | Profile/Version number |
| 32~35 | - | reserved |

HDR EDID

- MAXIMUM BRIGHTNESS OF MONITOR
- MAXIMUM EXTENSION LEVEL
- raw/cooked flag-1

FIG. 50

HDR InfoFrame

- ref_screen_luminance_white
- extended_range_white_level
- nominal_black_level_code_value
- nominal_white_level_code_value
- extended_white_level_code_value
- raw/cooked flag-2

REPRODUCTION DEVICE, REPRODUCTION METHOD, AND RECORDING MEDIUM

CROSS REFERENCE TO PRIOR APPLICATION

This application is a continuation of U.S. patent application Ser. No. 15/160,642 (filed on May 20, 2016), which is a continuation of U.S. patent application Ser. No. 14/896,041 (filed on Dec. 4, 2015 and issued as U.S. Pat. No. 9,774,819 on Sep. 26, 2017), which is a National Stage patent application of PCT International Patent Application No. PCT/JP2014/065053 (filed on Jun. 6, 2014) under 35 U.S.C. § 371, which claims priority to Japanese Patent Application No. 2013-129993 (filed on Jun. 20, 2013), which are all hereby incorporated by reference in their entirety.

TECHNICAL FIELD

The present technology relates to a reproduction device, a reproduction method, and a recording medium and, in particular, relates to a reproduction device, a reproduction method, and a recording medium that enable content having a wide dynamic range of brightness to be displayed with an appropriate brightness.

BACKGROUND ART

There is a Blu-ray (registered trademark) Disc (hereinafter, as appropriate, referred to as a BD) serving as a recording medium of content such as a movie. Hitherto, in authoring a video recorded on a BD, a dynamic range of the master video is compressed on the premise that the video is viewed on a monitor with a standard brightness (100 nit=100 cd/m$^2$).

The video that is to be the master is taken by a high-quality camera and includes a dynamic range that is equivalent to or greater than a dynamic range that can be displayed on a monitor with the standard brightness. It goes without saying that the dynamic range of the master video is deteriorated by being compressed.

CITATION LIST

Patent Literature

Patent Literature1: JP 2009-58692A
Patent Literature2: JP 2009-89209A

SUMMARY OF INVENTION

Technical Problem

Owing to technological progresses in displays such as organic electroluminescence (EL) displays and liquid crystal displays (LCDs), monitors with brightness, such as 500 nit and 1000 nit, that is brighter than standard monitors are commercially available. Content that can take advantage of the performance of such monitors having such a wide dynamic range is in demand.

The present technology has been made in view of the above situation and enables content having a wide dynamic range of brightness to be displayed with an appropriate brightness.

Solution to Problem

A reproduction device according to an aspect of the present technology includes: a readout unit configured to read out, from a recording medium that has recorded coded data of an extended video that is a video having a second brightness range that is wider than a first brightness range, brightness characteristic information that represents a brightness characteristic of the extended video, and brightness conversion definition information used when performing a brightness conversion of the extended video to a standard video that is a video having the first brightness range, the coded data, the brightness characteristic information, and the brightness conversion definition information; a decoding unit configured to decode the coded data; a conversion unit configured to convert the extended video obtained by decoding the coded data to the standard video on a basis of the brightness conversion definition information; and an output unit configured to output data of the extended video and the brightness characteristic information to a display device that is capable of displaying the extended video and configured to output data of the standard video to a display device that is not capable of displaying the extended video.

The brightness characteristic information and the brightness conversion definition information can be inserted, as auxiliary information of the coded data, in a stream including the coded data and are recorded in the recording medium.

The coded data can be coded data of an HEVC, and the brightness characteristic information and the brightness conversion definition information can be each an SEI of an HEVC stream.

The brightness conversion definition information can be first Tone mapping information in which either one of values 0, 2, and 3 is set as a value of a tone_map_model_id. The brightness characteristic information can be second Tone mapping information in which 4 is set as the value of the tone_map_model_id.

The tone_map_model_id of the first Tone mapping information and the tone_map_model_id of the second Tone mapping information can be each set with a same value representing a recording mode of the recording medium.

Information related to reproduction of the coded data, the information including a flag representing whether a recording of the extended video as a master is being performed, can be further recorded in the recording medium. When the flag represents that the recording of the extended video as the master is being performed, the decoding unit can decode the coded data.

The recording medium can be a Blu-ray Disc. The flag can be included in a Clip Information file serving as the information related to the reproduction.

The recording medium can be a Blu-ray Disc. The flag can be included in a PlayList file serving as the information related to the reproduction.

According to an aspect of the present technology, from a recording medium that has recorded coded data of an extended video that is a video having a second brightness range that is wider than a first brightness range, brightness characteristic information that represents a brightness characteristic of the extended video, and brightness conversion definition information used when performing a brightness conversion of the extended video to a standard video that is a video having the first brightness range, the coded data, the brightness characteristic information, and the brightness conversion definition information are read out. The coded data is decoded. The extended video obtained by decoding the coded data is converted to the standard video on a basis of the brightness conversion definition information. Data of the extended video and the brightness characteristic information are output to a display device that is capable of displaying the extended video. Data of the standard video is output to a display device that is not capable of displaying the extended video.

A reproduction device according to another aspect of the present technology includes: a readout unit configured to read out, from a recording medium that has recorded coded data of a standard video that is obtained by performing a brightness conversion of an extended video that is a video having a second brightness range that is wider than a first brightness range, the standard video being a video having the first brightness range, brightness characteristic information that represents a brightness characteristic of the extended video, and brightness conversion definition information used when performing the brightness conversion of the standard video to the extended video, the coded data, the brightness characteristic information, and the brightness conversion definition information; a decoding unit configured to decode the coded data, a conversion unit configured to convert the standard video obtained by decoding the coded data to the extended video on a basis of the brightness conversion definition information; and an output unit configured to output data of the extended video and the brightness characteristic information to a display device that is capable of displaying the extended video and configured to output data of the standard video to a display device that is not capable of displaying the extended video.

The brightness characteristic information and the brightness conversion definition information can be inserted, as auxiliary information of the coded data, in a stream including the coded data and are recorded in the recording medium.

The coded data can be coded data of an HEVC, and the brightness characteristic information and the brightness conversion definition information can be each an SEI of an HEVC stream.

The brightness conversion definition information can be first Tone mapping information in which either one of values 0, 2, and 3 is set as a value of a tone_map_model_id. The brightness characteristic information can be second Tone mapping information in which 4 is set as the value of the tone_map_model_id.

The tone_map_model_id of the first Tone mapping information and the tone_map_model_id of the second Tone mapping information can be each set with a same value representing a recording mode of the recording medium.

Information related to reproduction of the coded data, the information including a flag representing whether a recording of the extended video as a master is being performed, can be further recorded in the recording medium. When the flag represents that the recording of the extended video as the master is being performed, the decoding unit can decode the coded data.

The recording medium can be a Blu-ray Disc. The flag can be included in a Clip Information file serving as the information related to the reproduction.

The recording medium can be a Blu-ray Disc. The flag can be included in a PlayList file serving as the information related to the reproduction.

According to another aspect of the present technology, from a recording medium that has recorded coded data of a standard video that is obtained by performing a brightness conversion of an extended video that is a video having a second brightness range that is wider than a first brightness range, the standard video being a video having the first brightness range, brightness characteristic information that indicates a brightness characteristic of the extended video, and brightness conversion definition information used when performing the brightness conversion of the standard video to the extended video, the coded data, the brightness characteristic information, and the brightness conversion definition information are read out. The coded data is decoded. The standard video obtained by decoding the coded data is converted to the extended video on a basis of the brightness conversion definition information. Data of the extended video and the brightness characteristic information are output to a display device that is capable of displaying the extended video. Data of the standard video is output to a display device that is not capable of displaying the extended video.

Advantageous Effects of Invention

According to the present technology, content having a wide dynamic range of brightness can be displayed with an appropriate brightness.

BRIEF DESCRIPTION OF DRAWINGS

FIG. 7 is a diagram illustrating syntax of Tone mapping information.

FIG. 8 is a diagram illustrating an example of information used as tone mapping definition information and HDR information.

FIG. 16 is a diagram illustrating syntax of a PlayList file.

FIG. 17 is a diagram illustrating syntax of a Clip Information file.

FIG. 18 is a diagram illustrating syntax of ProgramInfo ( ) in FIG. 17.

FIG. 19 is a diagram illustrating syntax of StreamCodingInfo in FIG. 18.

FIG. 35 is a diagram illustrating an example of syntax of AppInfoPlayList ( ) included in the PlayList file in FIG. 16.

FIG. 36 is a diagram illustrating syntax of PlayList ( ) included in the PlayList file in FIG. 16.

FIG. 37 is a diagram illustrating syntax of PlayItem ( ) in FIG. 36.

FIG. 38 is a diagram illustrating syntax of STN_table ( ) in FIG. 37.

FIG. 39 is a diagram illustrating syntax of stream_attributes ( ) in FIG. 38.

FIG. 40 is a diagram illustrating an example of an allocation of PSR.

FIG. 49 is a diagram illustrating an example of HDR EDID.

FIG. 50 is a diagram illustrating an example of HDR InfoFrame.

DESCRIPTION OF EMBODIMENTS

Hereinafter, a mode to implement the present technology will be described. The description will be given in the following order.

1. Recording/Reproduction System
2. HEVC
3. BD Format
4. Configuration of Each Device
5. Operation of Each Device
6. Modifications
7. Exemplary Case in Which Brightness Is Adjusted on Reproduction Device Side
8. Exemplary Application to HDMI
9. Other Modifications <1. Recording/Reproduction System>

Figure 1:
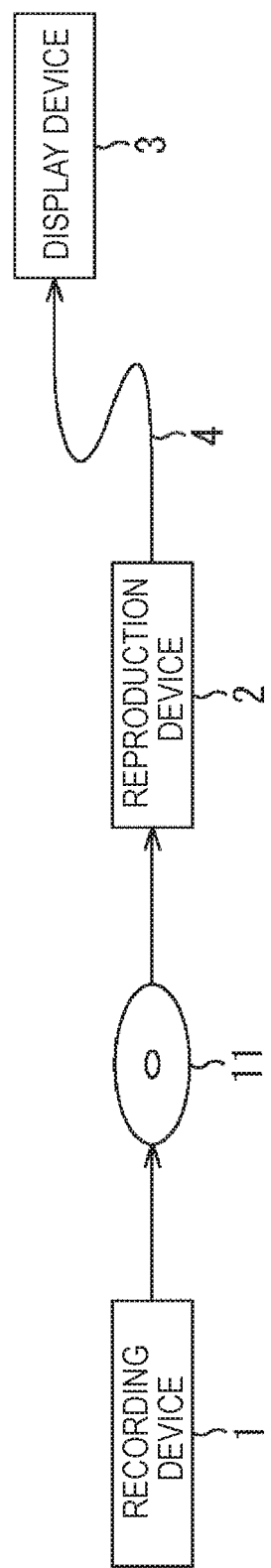
FIG. 1 is a diagram illustrating an exemplary configuration of a recording/reproduction system according to an embodiment of the present technology.

FIG. 1 is a diagram illustrating an exemplary configuration of a recording-reproduction system according to an embodiment of the present technology.

The recording/reproduction system in FIG. 1 includes a recording device 1, a reproduction device 2, and a display device 3. The reproduction device 2 and the display device 3 are connected to each other through a high-definition multimedia interface (HDMI) (registered trademark) cable 4. The reproduction device 2 and the display device 3 may be connected to each other through a cable of another standard or may be connected via radio communication.

The recording device 1 records content, and the reproduction device 2 reproduces the content. An optical disc 11 is used to provide the content from the recording device 1 to the reproduction device 2. The optical disc 11 is a disc on which the content is recorded in a Blu-ray (registered trademark) Disc Read-Only (BD-ROM) Format, for example.

The content may be recorded on the optical disc 11 in another format such as a BD-R or BD-RE format. Furthermore, the content may be provided from the recording device 1 to the reproduction device 2 by using a removable media other than an optical disc, such as a memory card mounted with a flash memory.

When the optical disc 11 is a BD-ROM disc, the recording device 1 is a device used by the author of the content, for example. Hereinafter, while a description will be appropriately given assuming that the optical disc 11 on which the content has been recorded with the recording device 1 is provided to the reproduction device 2, in actuality, an optical disc 11 that is one of the optical discs that are copies of a master disc on which the content is recorded with the recording device 1 is provided to the reproduction device 2.

A high dynamic range (HDR) video that is a video having a dynamic range that is equivalent to or greater than a dynamic range (a brightness range) that can be displayed on a monitor having a standard brightness is input to the recording device 1. The standard brightness is 100 cd/m² (=100 nit).

The recording device 1 records, on the optical disc 11, the input master HDR video as it is, that is, as a video having a dynamic range that is equivalent to or greater than the dynamic range that can be displayed on a monitor with a standard brightness. In such a case, information representing the brightness characteristic of the master HDR video and, also, information used when converting an HDR video to an STD video are recorded on the optical disc 11.

A standard video (the STD video) is a video having a dynamic range that can be displayed on a monitor having a standard brightness. When the dynamic range of the STD video is 0-100%, the dynamic range of the HDR video is expressed as a range of 0% to 101% or more, such as 0-500% or 0-1000%.

Furthermore, after converting the input master HDR video to an STD video, that is, after converting the input master HDR video to a video that has a dynamic range that is capable of being displayed on a monitor having a standard brightness, the recording device 1 records the video on the optical disc 11. In such a case, information representing the brightness characteristic of the master HDR video and, also, information used when converting an STD video to an HDR video are recorded on the optical disc 11.

The HDR video that the recording device 1 records or the STD video that is obtained by converting the HDR video are videos having a so-called 4K resolution in which the horizontal/vertical resolution is 4096/2160 pixels, 3840/2160 pixels, or the like. For example. High Efficiency Video Coding (HEVC) is used in coding the video data with the recording device 1.

Information representing the brightness characteristic of the master HDR video and information used when converting an HDR video to an STD video or when converting an STD video to an HDR video are inserted into the coded data of the HEVC as supplemental enhancement information (SEI). An HEVC stream, which is coded data of HEVC in which the SEI is inserted, is recorded on the optical disc 11 in BD format.

The reproduction device 2 communicates with the display device 3 through the HDMI cable 4 and acquires information related to the display performance of the display device 3. The reproduction device 2 specifies whether the display device 3 is a device having an HDR monitor that is a monitor that is capable of displaying an HDR video or whether the display device 3 is a device having an STD monitor that is a monitor that can only display an STD video.

Furthermore, the reproduction device 2 drives a drive and reads out and decodes the HEVC stream recorded on the optical disc 11.

For example, when the video data obtained through decoding is data of an HDR video and when the display device 3 includes an HDR monitor, the reproduction device 2 outputs the data of the HDR video obtained through decoding the HEVC stream to the display device 3. In such a case, the reproduction device 2 outputs, together with the data of the HDR video, data representing the brightness characteristic of the master HDR video to the display device 3.

On the other hand, when the video data obtained through decoding is data of an HDR video and when the display device 3 includes an STD monitor, the reproduction device 2 converts the HDR video, which has been obtained by decoding the HEVC stream, to an STD video and outputs the data of the STD video. The conversion of the HDR video to an STD video is performed by using information that is recorded on the optical disc 11 and that is used when converting an HDR video to an STD video.

When the video data obtained through decoding is data of an STD video and when the display device 3 includes an HDR monitor, the reproduction device 2 converts the STD video, which has been obtained by decoding the HEVC stream, to an HDR video and outputs the data of the HDR video to the display device 3. The conversion of the STD video to an HDR video is performed by using information that is recorded on the optical disc 11 and that is used when converting an STD video to an HDR video. In such a case, the reproduction device 2 outputs, together with the HDR video, data representing the brightness characteristic of the master HDR video to the display device 3.

On the other hand, when the video data obtained through decoding is data of an STD video and when the display device 3 includes an STD monitor, the reproduction device 2 outputs the data of the STD video obtained through decoding the HEVC stream to the display device 3.

The display device 3 receives video data transmitted from the reproduction device 2 and displays an image of the content on the monitor. Audio data of the content is also transmitted from the reproduction device 2. On the basis of the audio data transmitted from the reproduction device 2, the display device 3 outputs audio of the content from a loudspeaker.

For example, when information representing the brightness characteristic of the master HDR video is transmitted together with the video data, the display device 3 recognizes that the video data transmitted from the reproduction device 2 is data of an HDR video. As described above, information representing the brightness characteristic of the master HDR video is transmitted together with the data of the HDR video to the display device 3 including an HDR monitor.

In such a case, the display device 3 displays the image of the HDR video in accordance with the characteristics specified by the information representing the brightness characteristic of the master HDR video. In other words, when the monitor included in the display device 3 is a monitor having a dynamic range of 0-500% and when the dynamic range of the HDR video is designated to have a predetermined characteristic of 0-500% from the information representing the brightness characteristic of the master HDR video, then in accordance with the predetermined characteristic, the display device 3 displays an image while adjusting the brightness in the range of 0-500%.

By enabling the brightness characteristic of the master HDR video to be designated, the author of the content is capable of displaying an image at an intended brightness.

Typically, a display device such as a TV recognizes the video input from the outside as a video having a dynamic range of 0-100%. Furthermore, when the monitor of the display device has a dynamic range that is wider than the input video, the display device displays the image while disadvantageously extending the brightness in accordance with the characteristics of the monitor. By designating the brightness characteristic and by adjusting the brightness of the HDR video according to the designated characteristic, an adjustment of the brightness unintended by the author can be prevented from being performed on the display device side.

Furthermore, a reproduction device that outputs a video on a display device such as a TV typically outputs the video after converting the brightness in accordance with the characteristics of the transmission line. The display device that has received the video will display the image after converting the brightness of the received video in accordance with the characteristics of the monitor. By not converting the brightness in the reproduction device 2 and by having the HDR video from the reproduction device 2 be output as it is on the display device 3, the number of brightness conversions can be reduced and an image with a brightness that is more close to the master can be displayed on the display device 3.

Meanwhile, when the video data transmitted from the reproduction device 2 is data of an STD video, the display device 3 displays an image of the STD video. An STD video being transmitted from the reproduction device 2 indicates that the display device 3 is a device including an STD monitor.

Hereinafter, as appropriate, a mode in which the master HDR video is recorded on the optical disc 11 as it is will be referred to as mode-i. In mode-i, information representing the brightness characteristic of the master HDR video and information used when converting an HDR video to an STD video are recorded on the optical disc 11.

Furthermore, a mode in which the master HDR video is recorded on the optical disc 11 after being converted to an STD video will be referred to as mode-ii. In mode-ii, information representing the brightness characteristic of the master HDR video and information used when converting an STD video to an HDR video are recorded on the optical disc 11.

[Signal Processing in Mode-i]

Figure 2:
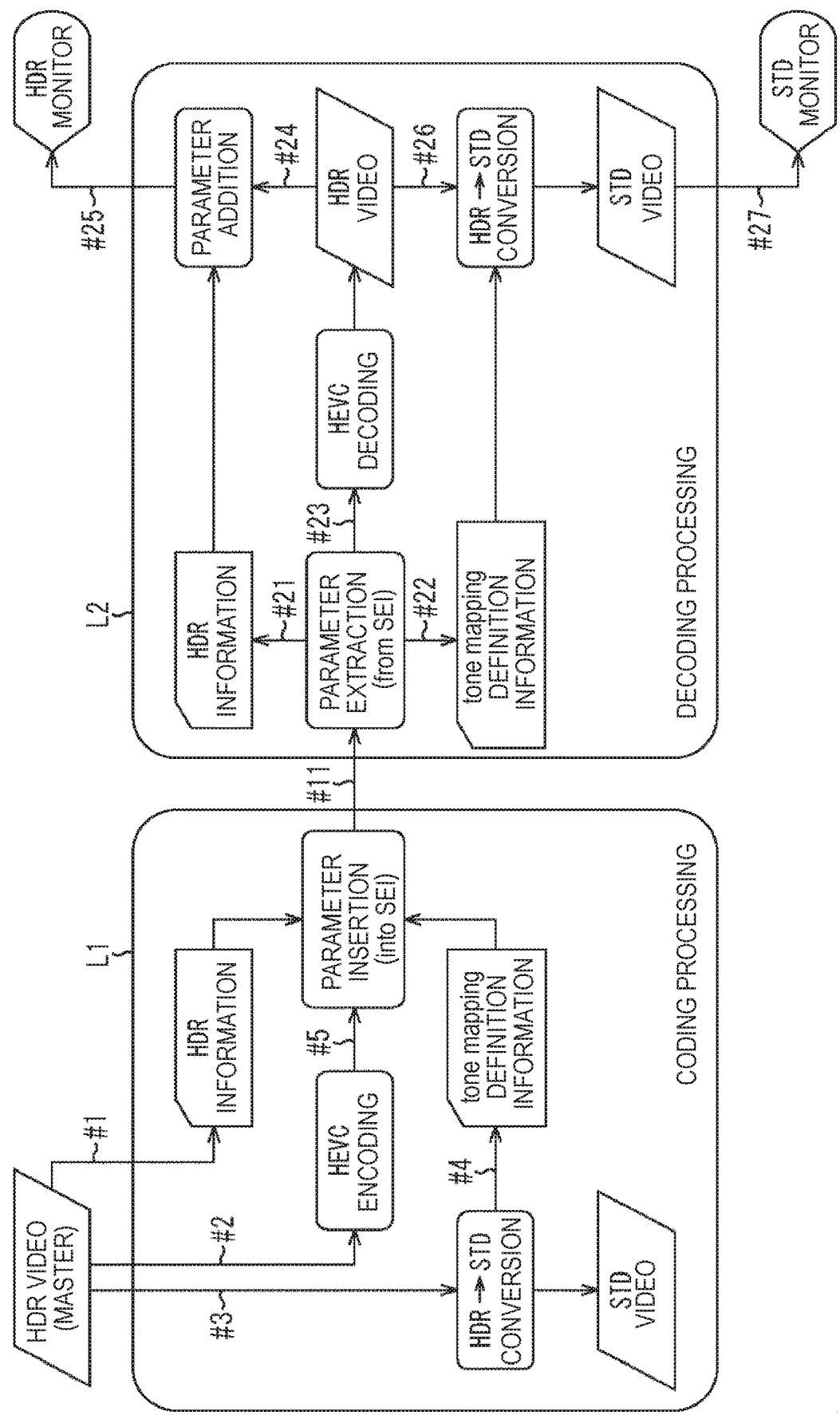
FIG. 2 is a diagram illustrating an example of signal processing in mode-i.

FIG. 2 is a diagram illustrating an example of signal processing in mode-i.

The processing on the left side illustrated by surrounding a solid line L1 illustrates coding processing performed in the recording device 1, and the processing on the right side illustrated by surrounding a solid line L2 illustrates decoding processing performed in the reproduction device 2.

When a master HDR video is input, the recording device 1 detects the brightness of the master HDR video and, as illustrated at the aid of arrow #1, HDR information that is information representing the brightness characteristic of the master HDR video is generated. Furthermore, as illustrated at the end of arrow #2, the recording device 1 performs coding on the master HDR video by HEVC.

As illustrated at the end of arrow #3, the recording device 1 converts the master HDR video to an STD video. An image of the STD video obtained by the conversion is displayed on a monitor (not shown). The conversion of the HDR video to the STD video is carried out, as appropriate, while the author visually checks the image of the STD video after the conversion and while adjusting the conversion parameter.

As illustrated at the end of arrow #4, on the basis of the adjustment performed by the author, the recording device 1 generates tone mapping definition information for HDR-STD conversion that is used when converting an HDR video to an STD video.

The tone mapping definition information is information that defines the correlation between each pixel value representing the brightness of the dynamic range of 0-400% or the like that is a dynamic range that is wider than the standard dynamic range and each pixel value representing the brightness of the dynamic range of 0-100% that is the standard dynamic range.

As illustrated at the end of arrow #5, the recording device 1 generates an HEVC stream by inserting the HDR information and the tone mapping definition information as SEI into the coded data of the HEVC. The recording device 1 records the generated HEVC stream on the optical disc 11 in BD format and, as illustrated by arrow #11, provides the HEVC stream to the reproduction device 2.

As described above, information representing the brightness characteristic of the master HDR video and information used when converting an HDR video to an STD video are provided to the reproduction device 2 in the form of insertion into the stream by using the SEI of the HEVC.

The reproduction device 2 reads out the HEVC stream from the optical disc 11 and, as illustrated at the ends of arrows #21 and #22, extracts the HDR information and the tone mapping definition information from the SEI of the HEVC stream.

Furthermore, as illustrated at the end of arrow #23, the reproduction device 2 decodes the coded data of the HEVC. As illustrated at the end of arrow #24, when the display device 3 includes an HDR monitor, the reproduction device 2 adds the HDR information to the data of the HDR video obtained by decoding the coded data and, as illustrated at the end of arrow #25, outputs the data to the display device 3.

On the other hand, as illustrated at the end of arrow #26, when the display device 3 includes an STD monitor, the reproduction device 2 converts the HDR video, which has been obtained by decoding the coded data, to an STD video by using the tone mapping definition information for HDR-STD conversion extracted from the HEVC stream. As illustrated at the end of arrow #27, the reproduction device 2 outputs the data of the STD video, which has been obtained by the conversion, to the display device 3.

As described above, the HDR video data obtained by decoding the coded data of the HEVC is, together with the HDR information, output to the display device 3 including an HDR monitor. Furthermore, the HDR video data obtained by decoding the coded data of the HEVC is, after being converted to an STD video, output to the display device 3 including an STD monitor.

Figure 3:
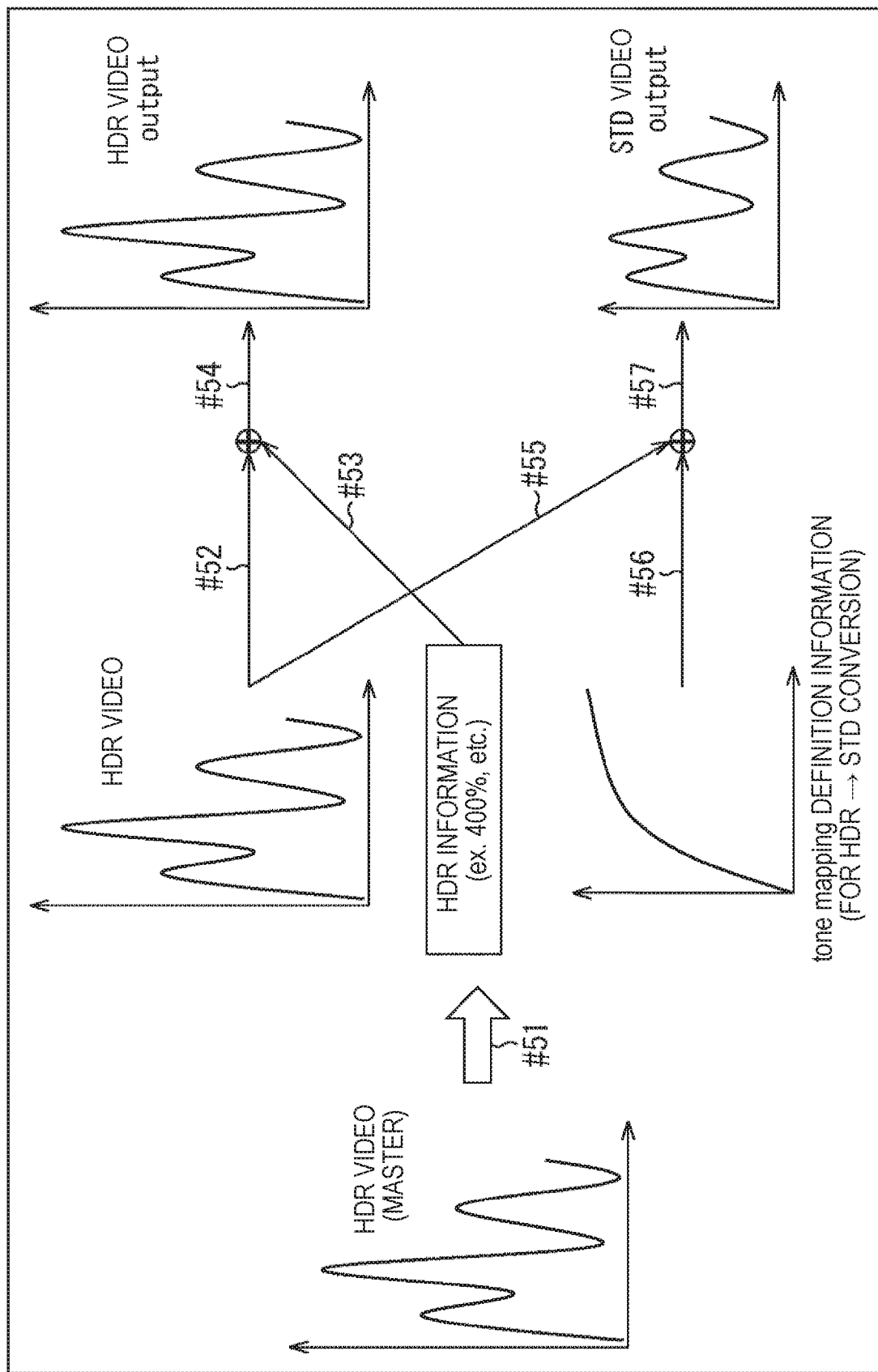
FIG. 3 is a diagram illustrating a flow of a signal processed in mode-i.

FIG. 3 is a diagram illustrating a flow of a process from when the master HDR video is input to the recording device 1 until the video data is output from the reproduction device 2.

As illustrated at the end of hollow arrow #51, the master HDR video is provided to the reproduction device 2 together with the HDR information and the tone mapping definition information for HDR-STD conversion that are generated in the recording device 1 on the basis of the master HDR video. Information representing that the dynamic range is extended to a range of 0-400%, for example, is included in the HDR information.

When the display device 3 includes an HDR monitor, as illustrated at the ends of arrows #52 and #53, in the reproduction device 2, the HDR information is added to the HDR video data that has been obtained by decoding the coded data of the HEVC. Furthermore, as illustrated at the end of arrow #54, the HDR video data to which the HDR information has been added is output to the display device 3.

On the other hand, when the display device 3 includes an STD monitor, as illustrated at the ends of arrows #55 and #56, in the reproduction device 2, the HDR video that has been obtained by decoding the coded data of the HEVC is converted to an STD video by using the tone mapping definition information for HDR-STD conversion. Furthermore, as illustrated at the end of arrow #57, the STD video data obtained by the conversion is output to the display device 3. In FIG. 3, the waveform amplitude representing the HDR video and the waveform amplitude representing the STD video each represents a dynamic range.

As described above, in mode-i, the master HDR video is recorded on the optical disc 11 as it is. Furthermore, switching between outputting the HDR video, which has been obtained by decoding the coded data, as it is after adding the HDR information, and outputting the HDR video after converting to an STD video can be performed according to the performance of the display device 3 serving as an output destination.

[Signal Processing in Mode-ii]

Figure 4:
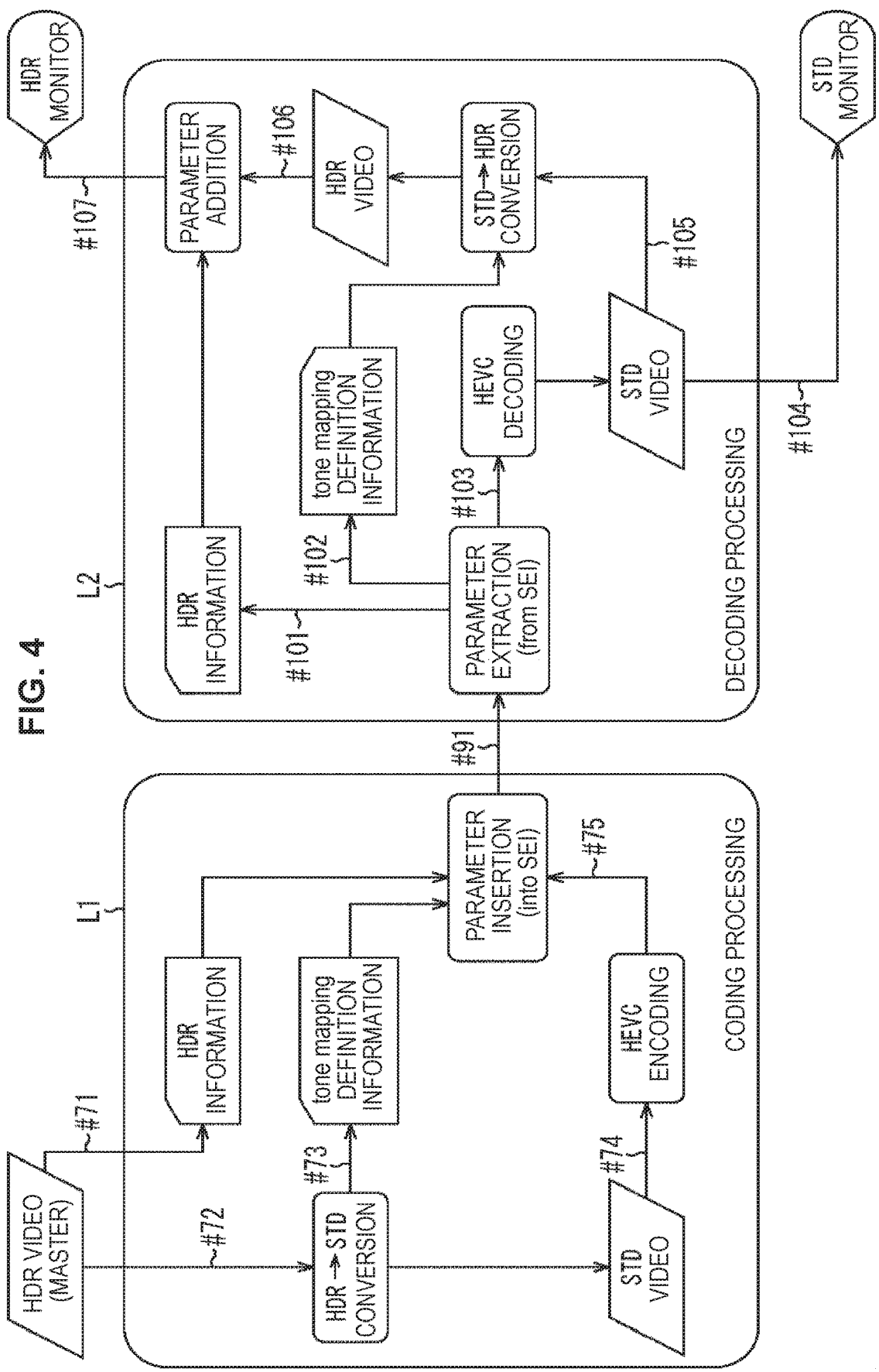
FIG. 4 is a diagram illustrating an example of signal processing in mode-ii.

FIG. 4 is a diagram illustrating an example of signal processing in mode-ii.

When a master HDR video is input, the recording device 1 detects the brightness of the master HDR video and, as illustrated at the end of arrow #71, HDR information is generated.

As illustrated at the end of the arrow #72, the recording device 1 converts the master HDR video to an STD video. An image of the STD video obtained by the conversion is displayed on a monitor (not shown).

As illustrated at the end of arrow #73, on the basis of the adjustment performed by the author, the recording device 1 generates tone mapping definition information for STD-HDR conversion that is used when converting an STD video to an HDR video.

Furthermore, as illustrated at the end of the arrow #74, the recording device 1 performs coding on the STD video, which has been obtained by converting the master HDR video, by HEVC.

As illustrated at the end of arrow #75, the recording device 1 generates an HEVC stream by inserting the HDR information and the tone mapping definition information as SEI into the coded data of the HEVC. The recording device 1 records the generated HEVC stream on the optical disc 11 in BD format and, as illustrated by arrow #91, provides the HEVC stream to the reproduction device 2.

The reproduction device 2 reads out the HEVC stream from the optical disc 11 and, as illustrated at the ends of arrows #101 and #102, extracts the HDR information and the tone mapping definition information from the SEI of the HEVC stream.

Furthermore, as illustrated at the end of arrow #103, the reproduction device 2 decodes the coded data of the HEVC. As illustrated at the end of arrow #104, when the display device 3 includes an STD monitor, the reproduction device 2 outputs the STD video data obtained by decoding the coded data to the display device 3.

On the other hand, as illustrated at the end of arrow #105, when the display device 3 includes an HDR monitor, the reproduction device 2 converts the STD video, which has been obtained by decoding the coded data, to an HDR video by using the tone mapping definition information for STD-HDR conversion extracted from the HEVC stream. As illustrated at the end of arrow #106, the reproduction device 2 adds the HDR information to the data of the HDR video obtained by the conversion and, as illustrated at the end of arrow #107, outputs the data to the display device 3.

As described above, the STD video data obtained by decoding the coded data of the HEVC is, after being converted to an HDR video, output to the display device 3 including an HDR monitor together with the HDR information. Furthermore, the STD video data obtained by decoding the coded data of the HEVC is output as it is to the display device 3 including an STD monitor.

Figure 5:
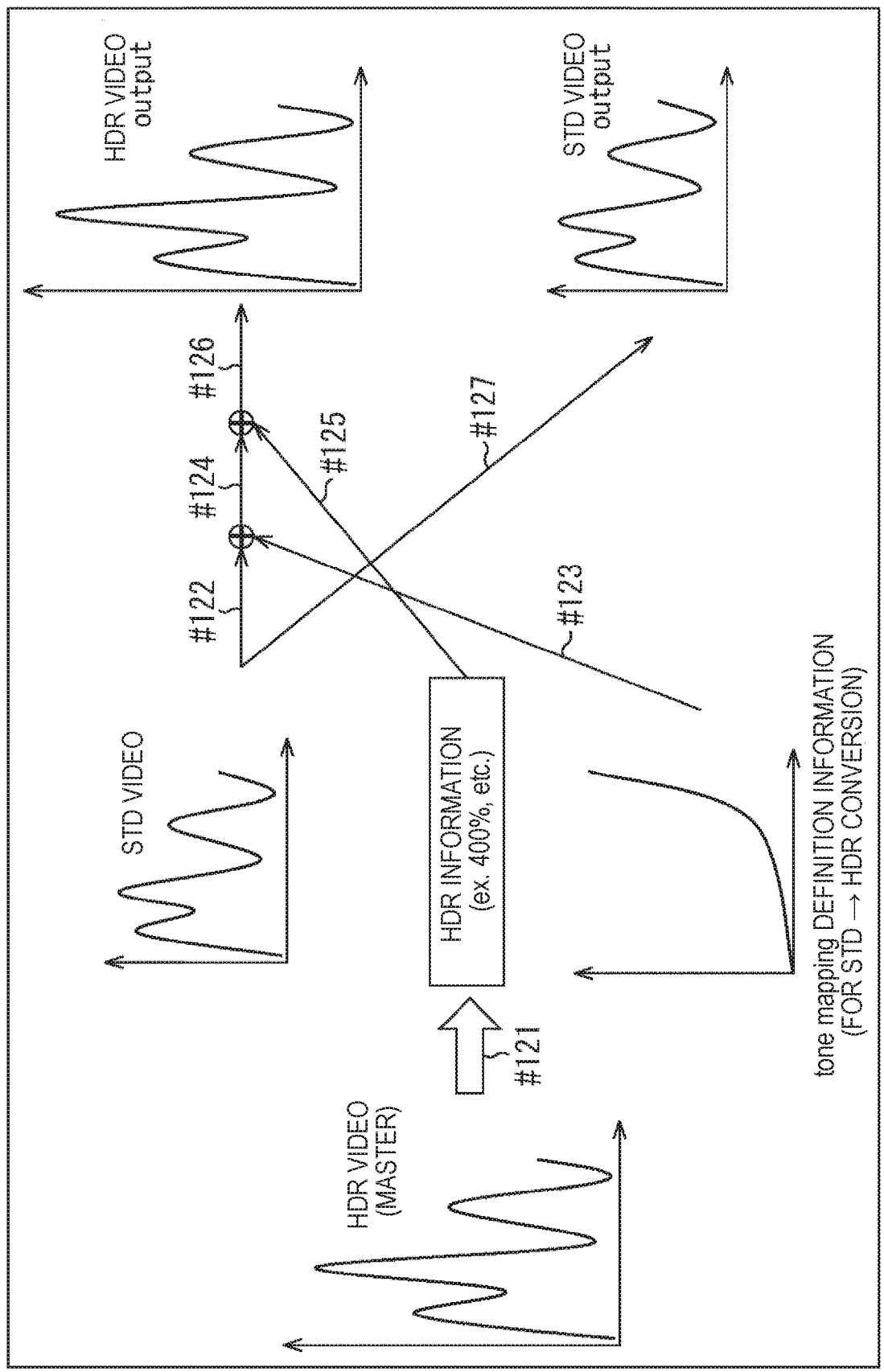
FIG. 5 is a diagram illustrating a flow of a signal processed in mode-ii.

FIG. 5 is a diagram illustrating a flow of a process from when the master HDR video is input to the recording device 1 until the video data is output from the reproduction device 2.

As illustrated at the end of hollow arrow #121, after being converted to an STD video, the master HDR video is provided to the reproduction device 2 together with the HDR information and the tone mapping definition information for STD-HDR conversion that are generated in the recording device 1 on the basis of the master HDR video.

When the display device 3 includes an HDR monitor, as illustrated at the ends of arrows #122 and #123, in the reproduction device 2, the STD video that has been obtained by decoding the coded data of the HEVC is converted to an HDR video by using the tone mapping definition information for STD-HDR conversion. Furthermore, as illustrated at the ends of arrows #124 and #125, the HDR information is added to the data of the HDR video obtained by the conversion of the STD video and, as illustrated at the end of arrow #126, the data is output to the display device 3.

On the other side, when the display device 3 includes an STD monitor, as illustrated at the end of arrows #127, in the reproduction device 2, the STD video data that has been obtained by decoding the coded data of the HEVC is output to the display device 3.

As described above, in mode-ii, the master HDR video is converted to an STD video and is recorded on the optical disc 11. Furthermore, switching between outputting the STD video, which has been obtained by decoding the coded data, after converting the STD video to an HDR video and adding HDR information, and outputting the STD video as it is is performed according to the performance of the display device 3 serving as an output destination.

Detailed configurations and operations of such recording device 1 and reproduction device 2 will be described later.

<2. HEVC>

Herein, a description of the HEVC will be given.

Figure 6:
FIG. 6 is a diagram illustrating a configuration of an access unit of an HEVC.

FIG. 6 is a diagram illustrating a configuration of an access unit of the HEVC.

An HEVC stream is configured of an access unit that is a group of network abstraction layer (NAL) units. Video data of a single picture is included in a single access unit.

As illustrated in FIG. 6, a single access unit is configured of an access unit delimiter (AU delimiter), a video parameter set (VPS), a sequence parameter set (SPS), a picture parameter set (PPS), an SEI, a video coding layer (VCL), an end of sequence (EOS), and an end of stream (EOS).

The AU delimiter represents the head of the access unit. The VPS includes metadata representing the content of the bitstream. The SPS includes information, such as the picture size, the coding tree block (CTB) size, and the like that the HEVC decoder needs to refer to through the decoding processing of the sequence. The PPS includes information that needs to be referred to in order for the HEVC decoder to execute the decoding processing of the picture. The VPS, the SPS, and the PPS are used as the header information.

The SEI is auxiliary information including information related to timing information and random access of each picture, and the like. The HDR information and the tone mapping definition information are included in Tone mapping information that is one of the SEIs. The VCL is data of a single picture. The end of sequence (EOS) represents the end position of the sequence and the end of stream (EOS) represents the end position of the stream.

FIG. 7 is a diagram illustrating syntax of the Tone mapping information.

The brightness and the color of the picture obtained by decoding are converted in accordance with the performance of the monitor serving as an output destination of the picture by using the Tone mapping information. Note that the line numbers and the colons (:) on the left side in FIG. 7 are described for convenience of description and are not information included in the Tone mapping information. Main information included in the Tone mapping information will be described.

Tone_map_id on the second line is identification information of the Tone mapping information. An object of the Tone mapping information is identified by the tone_map_id.

For example, an ID for mode-i and an ID for mode-ii are secured. When the recording mode is mode-i, an ID for mode-i is set in the tone_map_id of the Tone mapping information that is inserted into the SEI of the coded data of the HDR video. Furthermore, when the recording mode is mode-ii, an ID for mode-ii is set in the tone_map_id of the Tone mapping information that is inserted into the SEI of the coded data of the STD video. In the optical disc 11, either of the IDs among the ID for mode-i and the ID for mode-ii is set in the tone_map_id.

Tone_map_model_id on the eighth line represents a model of the tone map used to convert the coded data.

In the recording device 1, a single Tone mapping information in which either one of 0, 2, and 3 is set as the value of the tone_map_model_id, and a single Tone mapping information in which 4 is set as the value of the tone_map_model_id are generated.

As illustrated in FIG. 8, the Tone mapping information in which either one of the values 0, 2, and 3 is set as the tone_map_model_id is used as the tone mapping definition information for HDR-STD conversion or for STD-HDR conversion. Furthermore, information included in the Tone mapping information in which 4 is set as the value of the tone_map_model_id is used as the HDR information.

Lines 9 to 11 in FIG. 7 are a description relating to tone_map_model_id=0. When tone_map_model_id=0, min_value and max_value are described.

Figure 9:
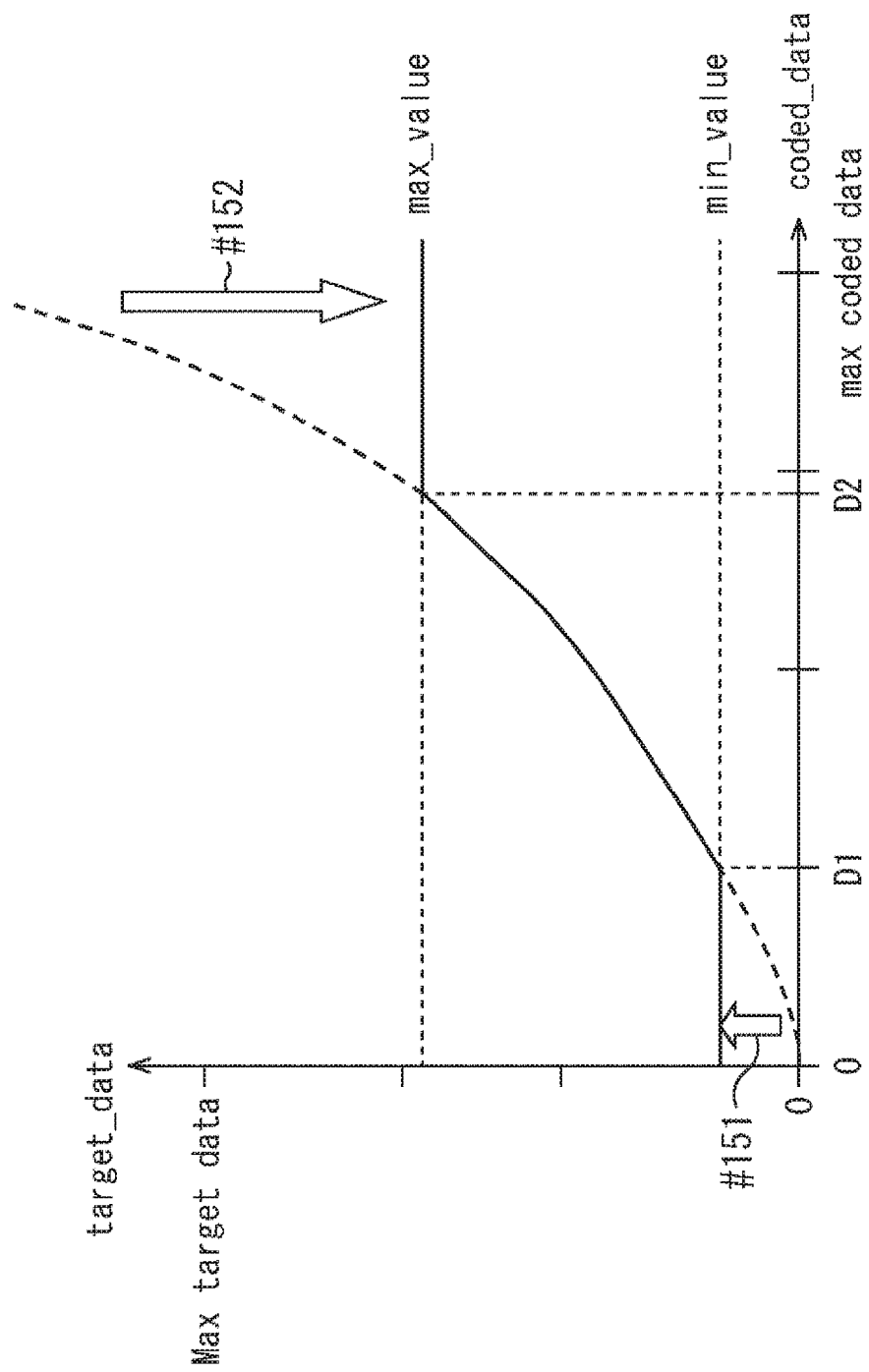
FIG. 9 is a diagram illustrating an example of a tone curve drawn with the tone mapping information of tone_map_model_id=0.

FIG. 9 is a diagram illustrating an example of a tone curve drawn with the Tone mapping information of tone_map_model_id=0.

The axis of abscissas in FIG. 9 represents coded_data (an RGB value before conversion) and the axis of ordinates represents target_data (an RGB value after conversion). When the tone curve in FIG. 9 is used, as indicated by hollow arrow #151, the RGB value equivalent to or below coded_data D1 is converted to an RGB value expressed by min_value. Furthermore, as indicated by hollow arrow #152, the RGB value equivalent to or above coded_data D2 is converted to an RGB value expressed by max_value.

The tone mapping information of tone_map_model_id=0 is used as the tone mapping definition information for HDR-STD conversion. When the Tone mapping information of tone_map_model_id=0 is used, the brightness (the brightness expressed by RGB values) equivalent to or above max_value and equivalent to or below min_value are lost; however, the load on the conversion processing becomes lighter.

Lines 15 to 17 in FIG. 7 are a description relating to tone_map_model_id=2. Tone_map_model_id=2 draws a step function and the number of start_of_coded_interval[i] that is the same as the number of max_target_data is described.

Figure 10:
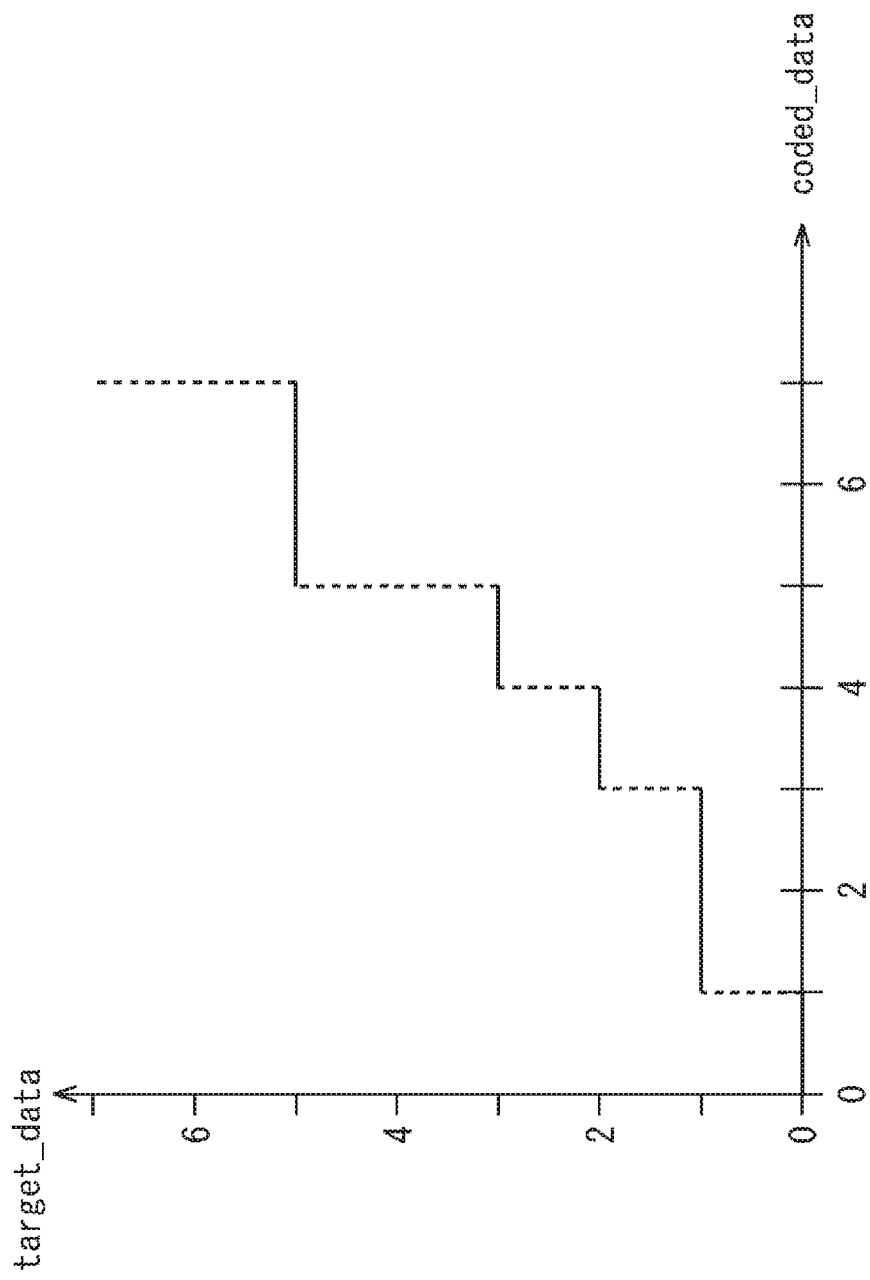
FIG. 10 is a diagram illustrating an example of a step function drawn with the tone mapping information of tone_map_model_id=2.

FIG. 10 is a diagram illustrating an example of a step function drawn with the Tone mapping information of tone_map_model_id=2.

When the step function in FIG. 10 is used, coded_data=5 is converted to target_data=3, for example. When start_of_coded_interval[i] is {1, 3, 4, 5, 5, 5, 7, 7 . . . }, a conversion table of the coded_data-target_data is expressed as {0, 1, 1, 2, 3, 5, 5 . . . }.

The tone mapping information of tone_map_model_id=2 is used as the tone mapping definition information for STD-HDR conversion or for HDR-STD conversion. Since the amount of data of the Tone mapping information of tone_map_model_id=2 is large, when creating the tone_map_model_id=2, convolution with the conversion table needs to be performed; however, the load on the conversion processing is light.

Lines 18 to 23 in FIG. 7 are a description relating to tone_map_model_id=3. When tone_map_model_id=3, the coded_pivot_value[i] and target_pivot_value[i], the numbers of which are designated by num_pivots, that draw a polygonal line function are described.

Figure 11:
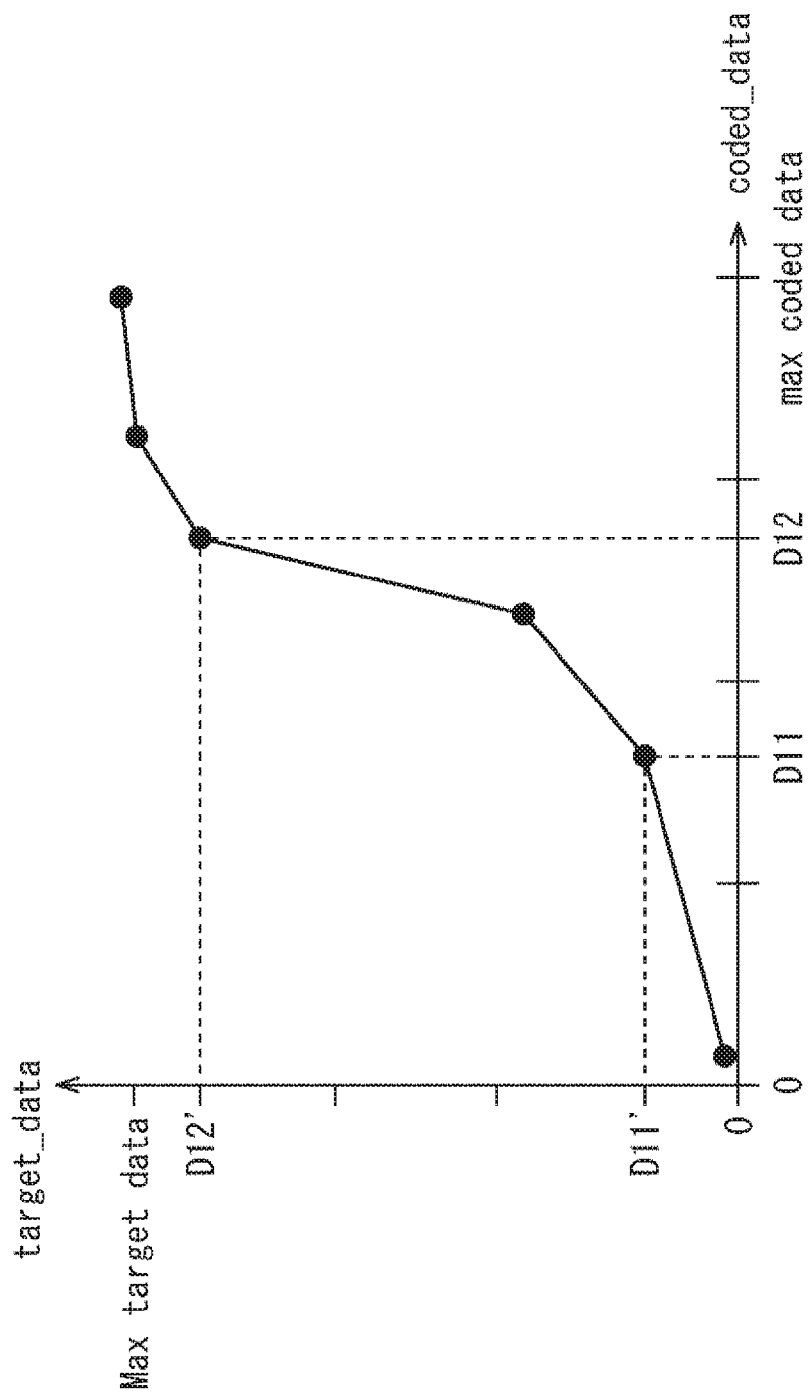
FIG. 11 is a diagram illustrating an example of a polygonal line function drawn with the tone mapping information of tone_map_model_id=3.

FIG. 11 is a diagram illustrating an example of a polygonal line function drawn with the Tone mapping information of tone_map_model_id=3.

When the polygonal line function in FIG. 11 is used, the coded_data=D11 is converted to target_data=D11', and the coded_data=D12 is converted to target_data=D12', for example. The tone mapping information of tone_map_model_id=3 is used as the tone mapping definition information for STD-HDR conversion or for HDR-STD conversion.

As described above, the Tone mapping information in which either one of the values 0, 2, and 3 is set as the tone_map_model_id is used as the tone mapping definition information for STD-HDR conversion or for HDR-STD conversion and is transmitted to the reproduction device 2 from the recording device 1.

Lines 24 to 39 in FIG. 7 are a description relating to tone_map_model_id=4. Among the information related to tone_map_model_id=4, ref_screen_luminance_white, extended_range_white_level, nominal_black_level_code_value, nominal_white_level_code_value, and extended_white_level_code_value are parameters configuring the HDR information.

Figure 12:
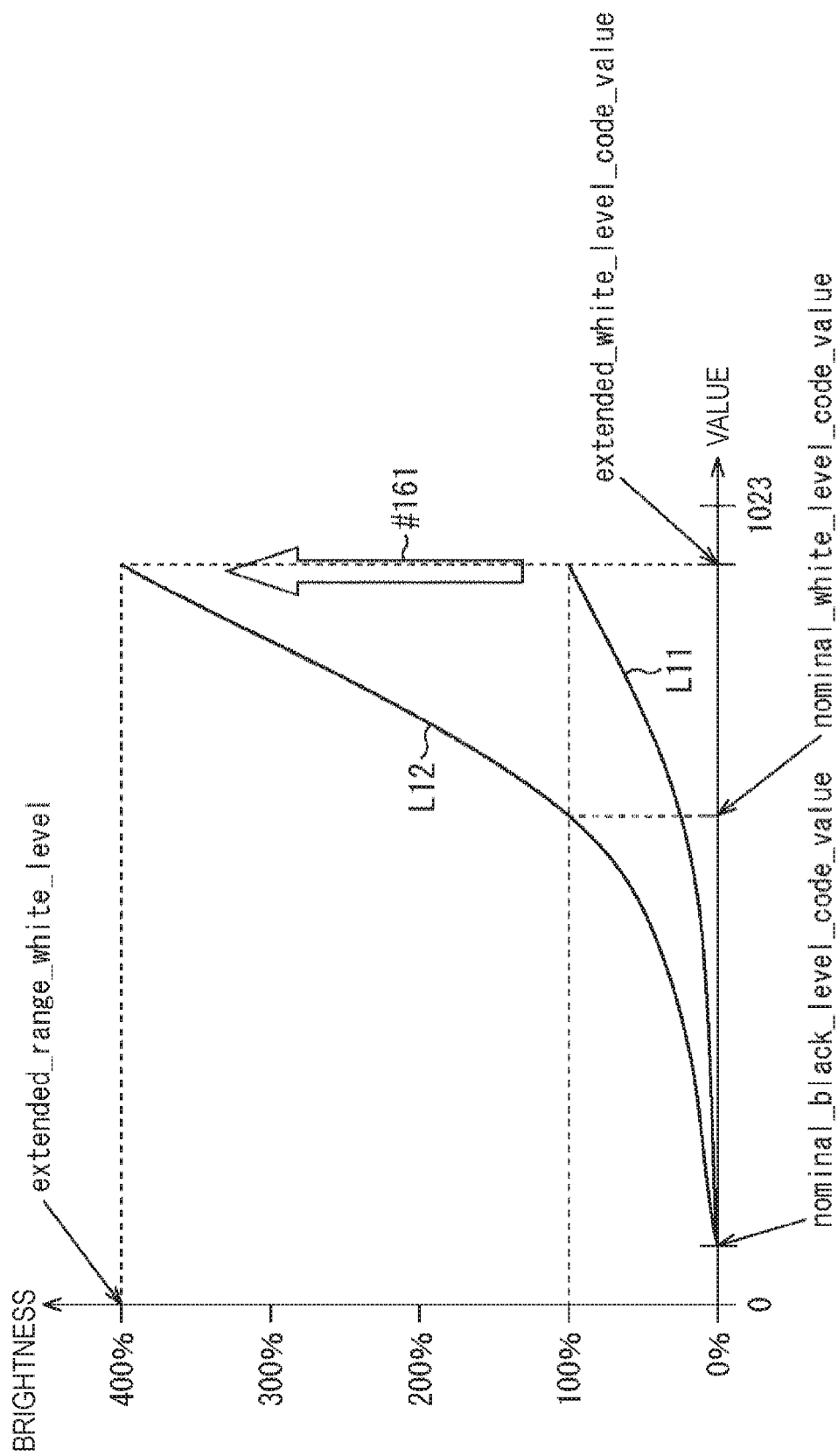
FIG. 12 is a diagram illustrating an example of each pieces of information included in the HDR information.

FIG. 12 is a diagram illustrating an example of each pieces of information included in the HDR information.

The axis of abscissas in FIG. 12 represents pixel values of the RGB. When the bit length is 10 bits, each pixel value is a value in the rage of 0-1023. The axis of ordinates in FIG. 12 represents brightness. Curve L11 represents the relationship between the pixel value and the brightness of a monitor with a standard brightness. The dynamic range of the monitor with a standard brightness is 0-100%.

The ref_screen_luminance_white represents the brightness (cd/m$^2$) of the monitor that is to be the standard. The extended_range_white_level represents the maximum value of the brightness of the dynamic range after extension. In the case of FIG. 12, 400 is set as the value of the extended_range_white_level.

The nominal_black_level_code_value represents the pixel value of black (brightness 0%), and the nominal_white_level_code_value represents the pixel value of white (brightness 100%) in a monitor having a standard brightness. The extended_white_level_code value represents the pixel value of white in the dynamic range after extension.

In the case of FIG. 12, as illustrated by hollow arrow #161, the dynamic range of 0-100% is extended to a dynamic range of 0-400% in accordance with the value of the extended_range_white_level. Furthermore, a pixel value corresponding to the brightness of 400% is designated by the extended_white_level_code_value.

The brightness characteristic of the HDR video is represented by curve L12 in which the values of the nominal_black_level_code_value, the nominal_white_level_code_value, and the extended_white_level_code_value are 0%, 100%, and 400%, respectively.

As described above, with the Tone mapping information in which 4 is set as the value of the tone_map_model_id, the brightness characteristic of the master HDR video is represented and is transmitted to the reproduction device 2 from the recording device 1.

<3. BD Format>

Herein, description of a BD-ROM format will be given.

[Data Management Structure]

Figure 13:
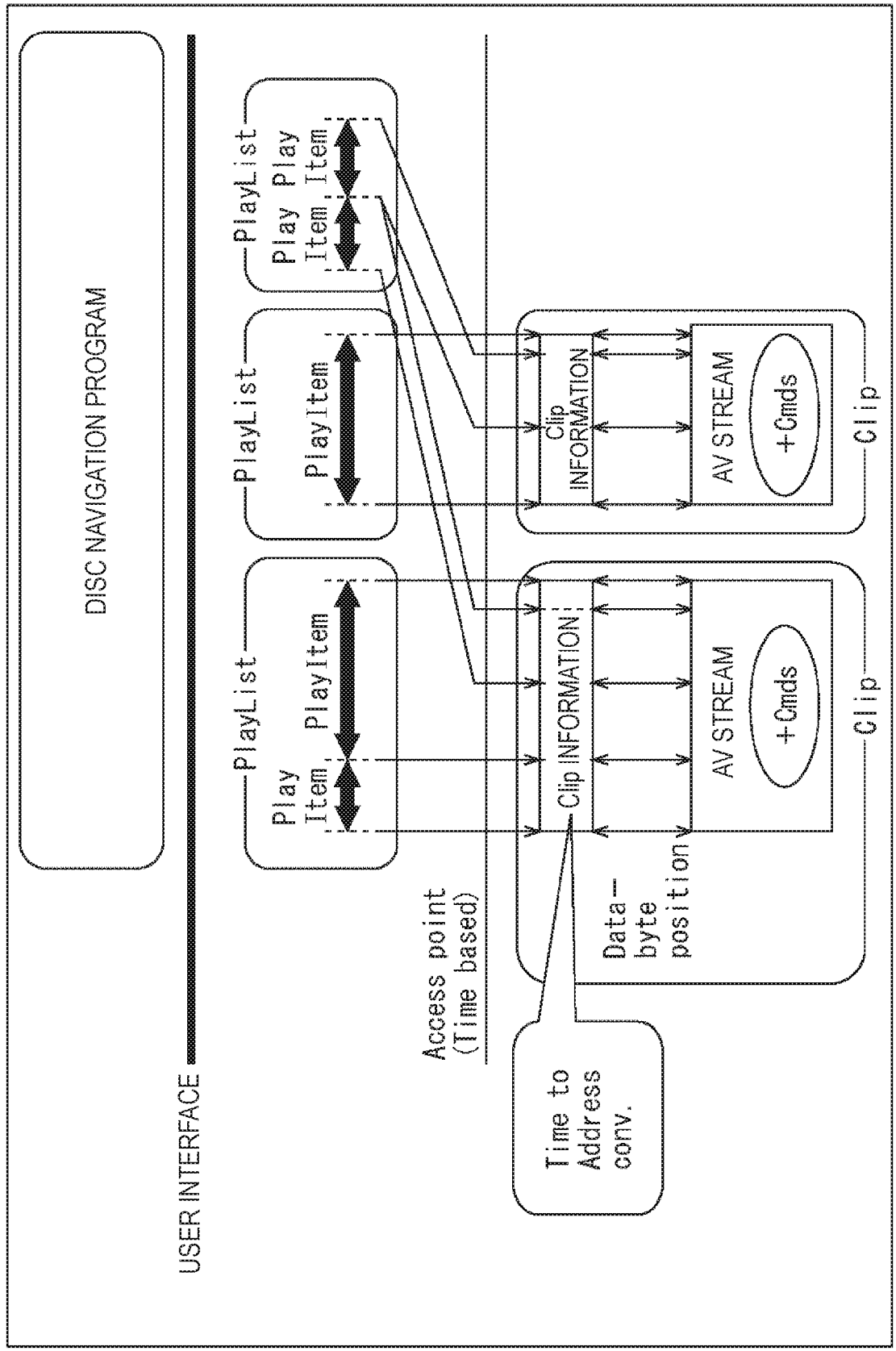
FIG. 13 is a diagram illustrating an example of a management structure of an AV stream in BD-ROM format.

FIG. 13 is a diagram illustrating an example of a management structure of an AV stream in BD-ROM format.

The management of the AV stream including the HEVC stream is performed using two layers, namely, PlayList and Clip. The AV stream may, in some cases, be recorded not only on an optical disc 11 but also in a local storage of the reproduction device 2.

A pair of a single AV stream and Clip Information, which is information associated with the AV stream, is managed as a single object. A pair of the AV stream and the Clip Information is referred to as a Clip.

The AV stream is developed on a time axis and an access point of each Clip is, mainly, designated in the PlayList with a time stamp. The Clip Information is used to, for example, find the address to start decoding in the AV stream.

The PlayList is a group of reproduction sections of the AV stream. A single reproduction section in the AV stream is referred to as a PlayItem. The PlayItem is expressed by a pair of an IN point and an OUT point in the reproduction section on the time axis. As illustrated in FIG. 13, the PlayList is configured of a single or a plurality of PlayItems.

The first PlayList from the left in FIG. 13 is configured of two PlayItems, and with the two PlayItems, reference is made to a former portion and a latter portion of the AV stream included in the Clip on the left side.

The second PlayList from the left is configured of a single PlayItem, and with the PlayItem, reference is made to the entire AV stream included in the Clip on the right side.

The third PlayList from the left is configured of two PlayItems, and with the two PlayItems, reference is made to a certain portion of the AV stream included in the Clip on the left side and a certain portion of the AV stream included in the Clip on the right side.

For example, when the PlayItem on the left side included in the first PlayList from the left is designated as a target to be reproduced by a disc navigation program, reproduction of the former portion of the AV stream included in the clip on the left side, which the PlayItem refers to, is performed. As described above, the PlayList is used as reproduction management information for managing the reproduction of the AV stream.

In the PlayList, a reproduction path formed of a line of one or more PlayItems is referred to as a Main Path. Furthermore, in the PlayList, a reproduction path that runs parallel to the Main Path and that is formed of a line of one or more SubPlayItems is referred to as a Sub Path.

Figure 14:
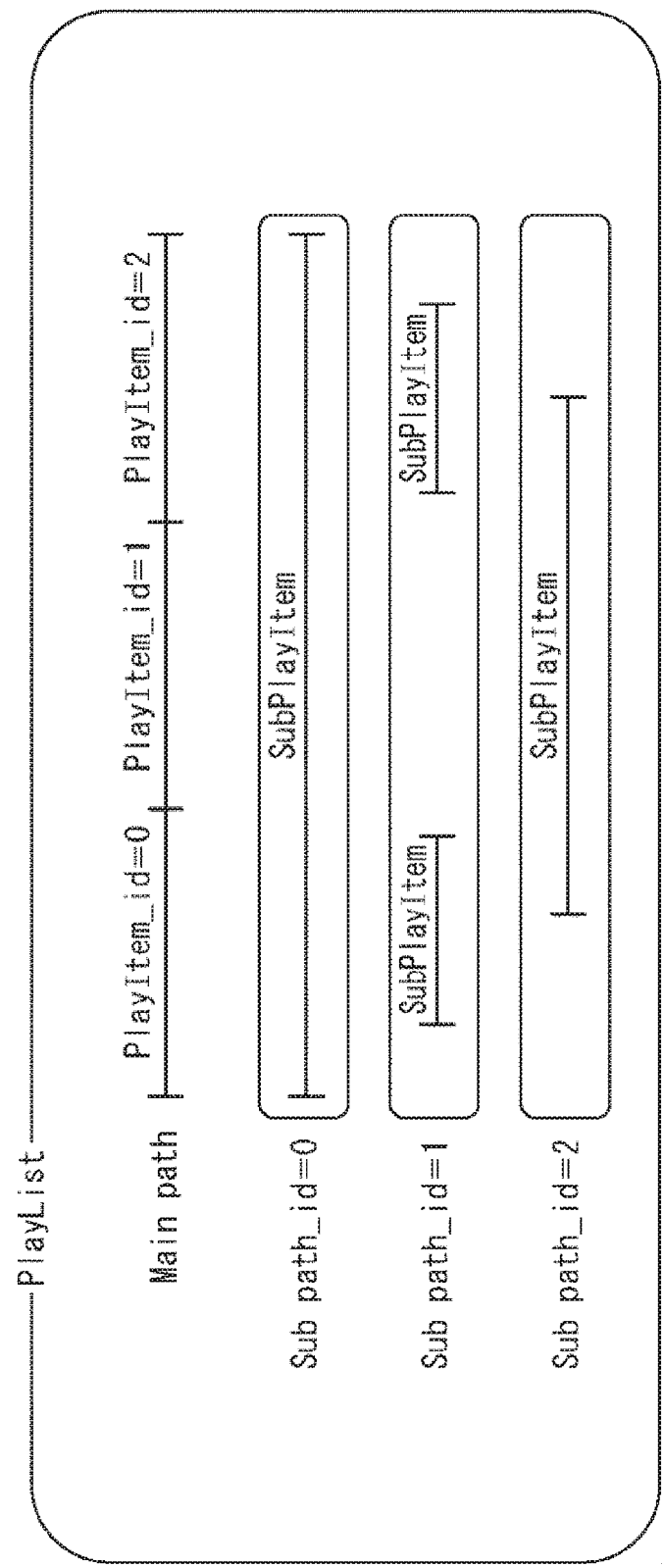
FIG. 14 is a diagram illustrating a structures of Main Path and Sub Paths.

FIG. 14 is a diagram illustrating structures of the Main Path and the Sub Paths.

A PlayList includes a single Main Path and one or more Sub Paths. The PlayList in FIG. 14 is formed of a line of three PlayItems including a single Main Path and three Sub Paths.

The PlayItems configuring the Main Path are each set with an ID in order from the top. The Sub Pathes are also set with IDs, namely, Subpath_id=0, Subpath_id=1, and Subpath_id=2, in order from the top.

In the example in FIG. 14, a single SubPlayItem is included in the Sub Path of SubPath_id=0, and two SubPlayItems are included in the Sub Path of SubPath_id=1. Furthermore, a single SubPlayItem is included in the Sub Path of SubPath_id=2.

The AV stream that a single PlayItem refers to at least includes a video stream (a main image data). The AV stream may include one or more audio streams that are reproduced at the same timing (in synchronization) with the video stream included in the AV stream or may not include any audio stream.

The AV stream may include one or more streams of bitmap caption data (presentation graphics (PG)) that are reproduced in synchronization with the video stream included in the AV stream or may not include any stream of caption data.

The AV stream may include one or more streams of interactive graphics (IG) that are reproduced in synchronization with the video stream included in the AV stream file or may not include any stream of interactive graphics. The IG stream is used for displaying graphics such as a button that is operated by the user.

In the AV stream referred to by a single PlayItem, an video stream and an audio steam, a PG stream, and an IG stream that synchronize with the video steam are multiplexed.

Furthermore, one SubPlayItem refers to a video steam, an audio stream, a PG stream, and the like that are different from the streams of the AV stream referred to by the PlayItem.

As described above, the reproduction of the AV stream including the HEVC stream is performed using the PlayList and the Clip Information. The PlayList and the Clip Information including the information related to the reproduction of the AV stream will be referred to as Data Base information, as appropriate.

[Directory Structure]

Figure 15:
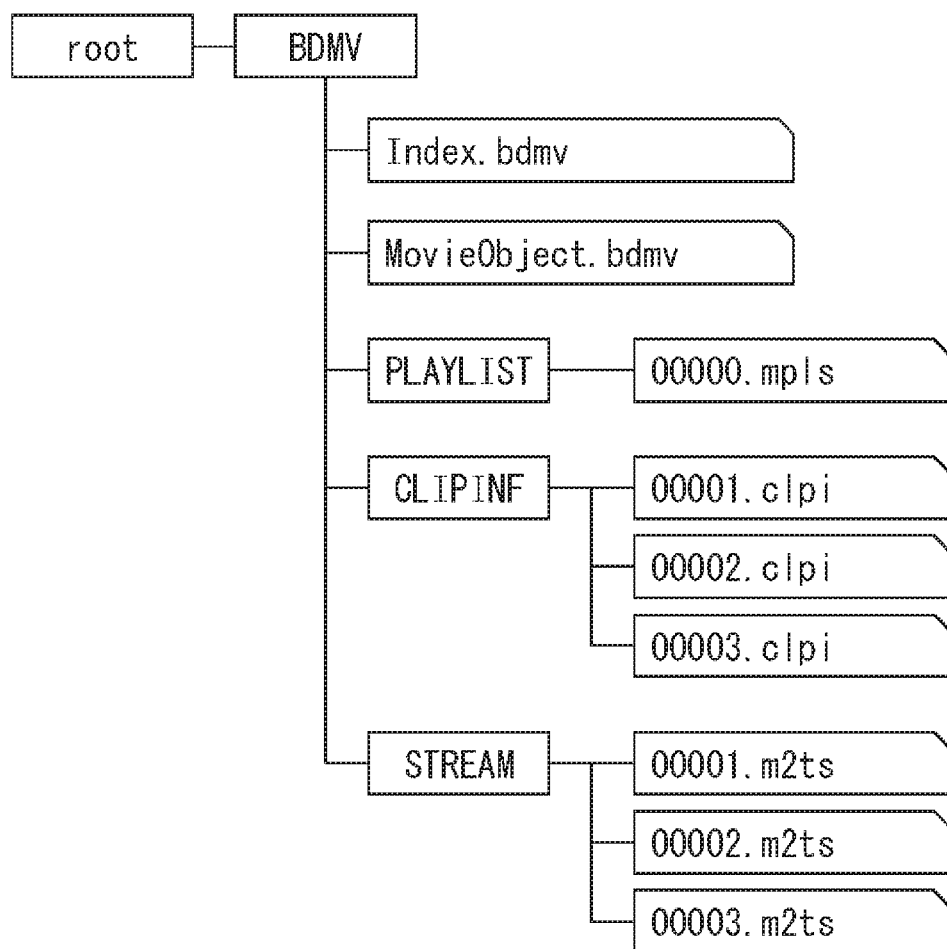
FIG. 15 is a diagram illustrating an example of a management structure of a file.

FIG. 15 is a diagram illustrating a structure in which the file that is recorded in the optical disc 11 is managed.

Each of the files that is recorded on the optical disc 11 is managed in a hierarchical manner with the directory structure. A single root directory is created on the optical disc 11.

A BDMV directory is located under the root directory;

An Index file that is a file set with a name "Index.bdmv" and a MovieObject file that is a file set with a name "MovieObject.bdmv" are stored under the BDMV directory.

A PLAYLIST directory, a CLIPINF directory, a STREAM directory, and the like are provided under the BDMV directory.

The PLAYLIST directory stores PlayList files in which PlayLists are described. Each PlayList is named with a combination of a five-digit number and an extension ".mpls". One of the PlayList files illustrated in FIG. 15 is set with a file name of "00000.mpls".

The CLIPINF directory stores Clip Information files. Each Clip Information file is named with a combination of a five-digit number and an extension ".clpi". The three Clip Information files in FIG. 15 are set with file names of "00001.clpi", "00002.clpi", and "00003.clpi".

Stream files are stored in the STREAM directory. Each stream file is named with a combination of a five-digit number and an extension ".m2ts". The three stream files in FIG. 15 are set with file names of "00001.m2ts", "00002.m2ts", and "00003.m2ts".

The Clip Information file and the stream file that have the same five-digit numbers set in the file names are files that constitute a single Clip. When reproducing the stream file "00001.m2ts", the Clip Information file "00001.clpi" is used, and when reproducing the stream file "00002.m2ts", the Clip Information file "00002.clpi" is used. As will be described later, information related to HDR video processing is included in the Clip Information file used to reproduce the AV stream including the HEVC stream.
[Syntax of Each File]

Herein, main descriptions of the syntax of each file will be described.

FIG. 16 is a diagram illustrating syntax of the PlayList file.

The PlayList file is stored in the PLAYLIST directory in FIG. 15 and is a file that is set with the extension "mpls".

AppInfoPlayList ( ) stores parameters that is related to the reproduction control of the PlayList, such as a reproduction restriction.

PlayList ( ) stores parameters related to the Main Path and the Sub Path.

PlayListMark ( ) stores mark information of the PlayList, in other words, the PlayListMark ( ) stores information related to marks that are jump destinations (jump points) in an user operation, a command, or the like commanding a chapter jump.

FIG. 17 is a diagram illustrating syntax of the Clip Information file.

The Clip Information file is stored in the CLIPINF directory in FIG. 15 and is a file that is set with the extension "clpi".

ClipInfo ( ) stores information, such as information representing the type of AV stream configuring the Clip, information representing the recording rate of the AV stream, and the like.

SequenceInfo ( ) includes information representing, on the time axis, the position of the source packet configuring the AV stream, information representing the displayed clock time, and the like.

ProgramInfo ( ) includes information related to the PID of the AV stream configuring the Clip, information related to coding of the AV stream, and the like.

FIG. 18 is a diagram illustrating syntax of the ProgramInfo ( ) in FIG. 17.

Number_of_program_sequences represents the number of program sequences described in the ProgramInfo ( ). A program sequence is constituted by a line of source packets constituting a program.

SPN_program_sequence_start[i] represents the source packet number at the head of the program sequence.

StreamCodingInfo includes information related to coding of the AV stream configuring the Clip.

FIG. 19 is a diagram illustrating syntax of the StreamCodingInfo in FIG. 18.

Stream_coding_type represents the coding method of an elementary stream included in the AV stream. For example, in the StreamCodingInfo of the Clip Information used for reproduction of the HEVC stream, a value representing that the coding method is HEVC is set as stream_coding_type.

Video_format represents the video scanning method. In the video_format used to reproduce the HEVC stream, a value representing a 4K scanning method such as 2160p (2160 line progressive) is set as stream_coding_type.

Frame_rate represents the frame rate of the video stream.

Aspect_ratio represents the aspect ratio of the video.

Cc_flag is a one-bit flag and represents whether closed caption data is included in the video stream.

HDR_flag is a one-bit flag and represents whether an HDR video is recorded as a master. For example, HDR_flag=1 represents that recoding of an HDR video as a master is being performed. Furthermore, HDR_flag=0 represents that recoding of an STD video as a master is being performed.

Mode_flag is a one-bit flag and represents the recording mode of the HEVC stream. The mode_flag becomes valid when HDR_flag=1. For example, mode_flag=1 represents that the recording mode is mode-i. Furthermore, mode_flag=0 represents that the recording mode is mode-ii.

As described above, the Clip Information includes a flag representing whether the HEVC stream included in the AV stream in which reproduction is performed using the Clip Information is a stream in which the master is the HDR video, and a flag representing the recording mode of the HEVC stream.

By referring to the flag included in the Clip Information, the reproduction device 2 is capable of specifying whether the master video is an HDR video without actually analyzing the HEVC stream.

<4. Configuration of Each Device>

Herein, a configuration of each device will be described.
[Configuration of Recording Device 1]

Figure 20:
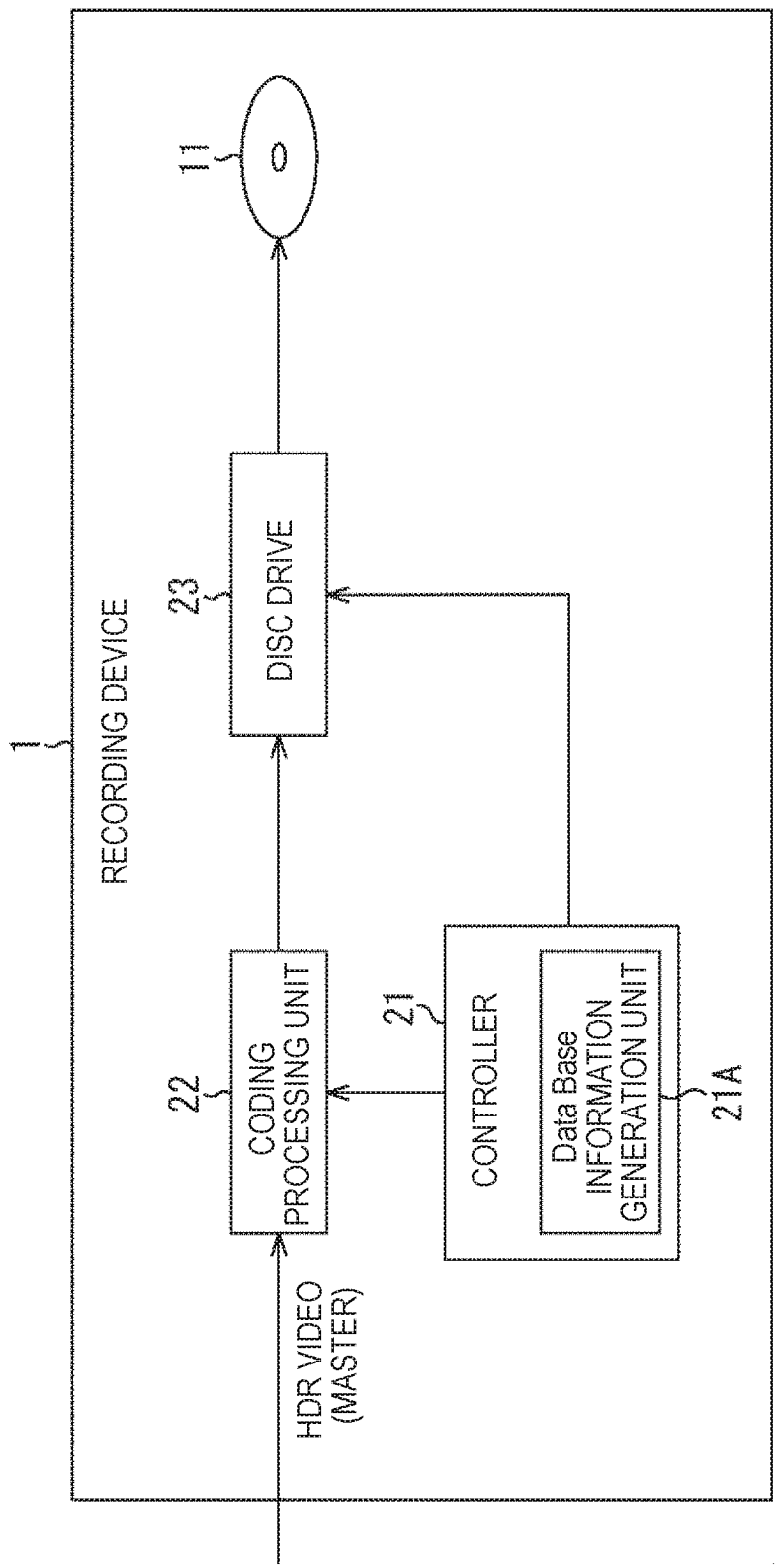
FIG. 20 is a block diagram illustrating an exemplary configuration of a recording device.

FIG. 20 is a block diagram illustrating an exemplary configuration of the recording device 1.

The recording device 1 includes a controller 21, a coding processing unit 22, and a disc drive 23. The master HDR video is input to the coding processing unit 22.

The controller 21 includes a central processing unit (CPU), a read-only memory (ROM), and a random access memory (RAM). The controller 21 executes a predetermined program and controls the overall operation of the recording device 1.

In the controller 21, a Data Base information generation unit 21A is implemented by executing a predetermined program. The Data Base information generation unit 21A generates a PlayList and a Clip that are Data Base information and outputs the PlayList and the Clip to the disc drive 23.

The coding processing unit 22 performs coding of the master HDR video. The coding processing unit 22 outputs the HEVC stream, which has been obtained by coding the master HDR video, to the disc drive 23.

The disc drive 23 records a file that stores the PlayList and the Clip Information supplied from the controller 21 and the HEVC stream supplied from the coding processing unit 22 on the optical disc 11 according to the directory structure in FIG. 15.

Figure 21:
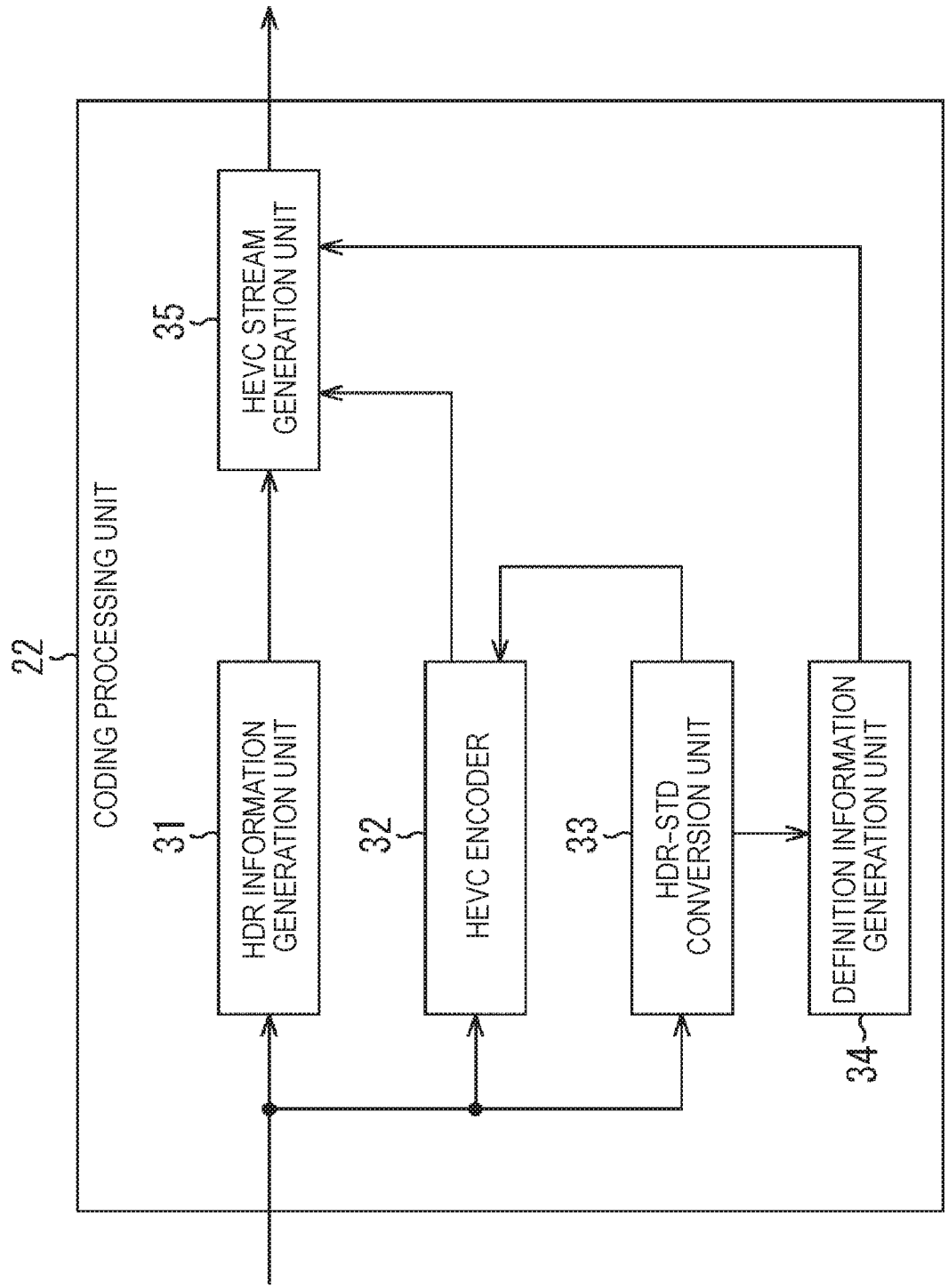
FIG. 21 is a block diagram illustrating an exemplary configuration of an coding processing unit in FIG. 20.

FIG. 21 is a block diagram illustrating an exemplary configuration of the coding processing unit 22 in FIG. 20.

The coding processing unit 22 includes an HDR information generation unit 31, an HEVC encoder 32, an HDR-STD conversion unit 33, a definition information generation unit 34, and an HEVC stream generation unit 35.

The HDR information generation unit 31 detects the brightness of the input master HDR video and generates HDR information including each of the pieces of information that have been described while referring to FIG. 12. The HDR information generation unit 31 outputs the generated HDR information to the HEVC stream generation unit 35.

When the recording mode is mode-i, the HEVC encoder 32 performs coding of the input master HDR video with HEVC. Furthermore, when the recording mode is mode-ii, the HEVC encoder 32 performs coding of the STD video, which has been supplied from the HDR-STD conversion unit 33, with HEVC. The HEVC encoder 32 outputs the coded data of the HDR video or the coded data of the STD video to the HEVC stream generation unit 35.

The HDR-STD conversion unit 33 converts the input master HDR video to an STD video. The conversion by the HDR-STD conversion unit 33 is performed, as appropriate, in accordance with a conversion parameter input by the author. The HDR-STD conversion unit 33 outputs information representing the correlation between an input data, which is the RGB signal of the HDR video, and an output data, which is the RGB signal of the STD video, to the definition information generation unit 34.

Figure 22:
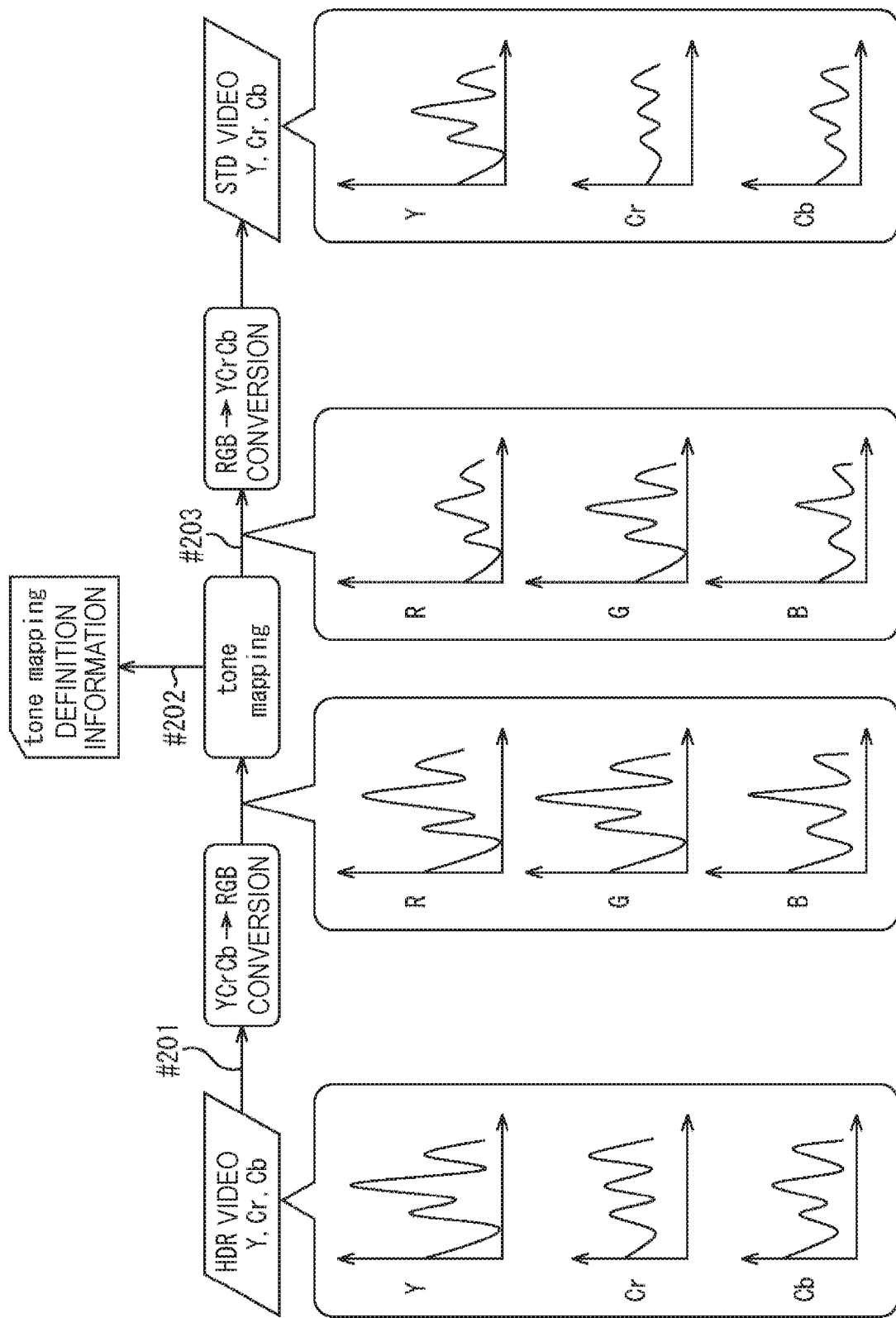
FIG. 22 is a diagram illustrating an example of signal processing performed by an HDR-STD conversion unit.

FIG. 22 is a diagram illustrating an example of signal processing performed by the HDR-STD conversion unit 33.

As illustrated at the end of arrow #201, the HDR-STD conversion unit 33 converts an YCrCb signal of the input master HDR video to an RGB signal, and performs conversion (tone mapping) of each RGB signal to the corresponding RGB signal of the STD video.

The HDR-STD conversion unit 33 outputs information representing the correlation between the RGB signal of the HDR video, which is an input data, and the RGB signal of the STD video, which is an output data, to the definition information generation unit 34. As illustrated at the end of arrow #202, the information output to the definition information generation unit 34 is used to generate the tone mapping definition information.

Furthermore, as illustrated at the end of #203, the HDR-STD conversion unit 33 converts the RGB signal of the STD video to an YCrCb signal and outputs the YCrCb signal.

Figure 23:
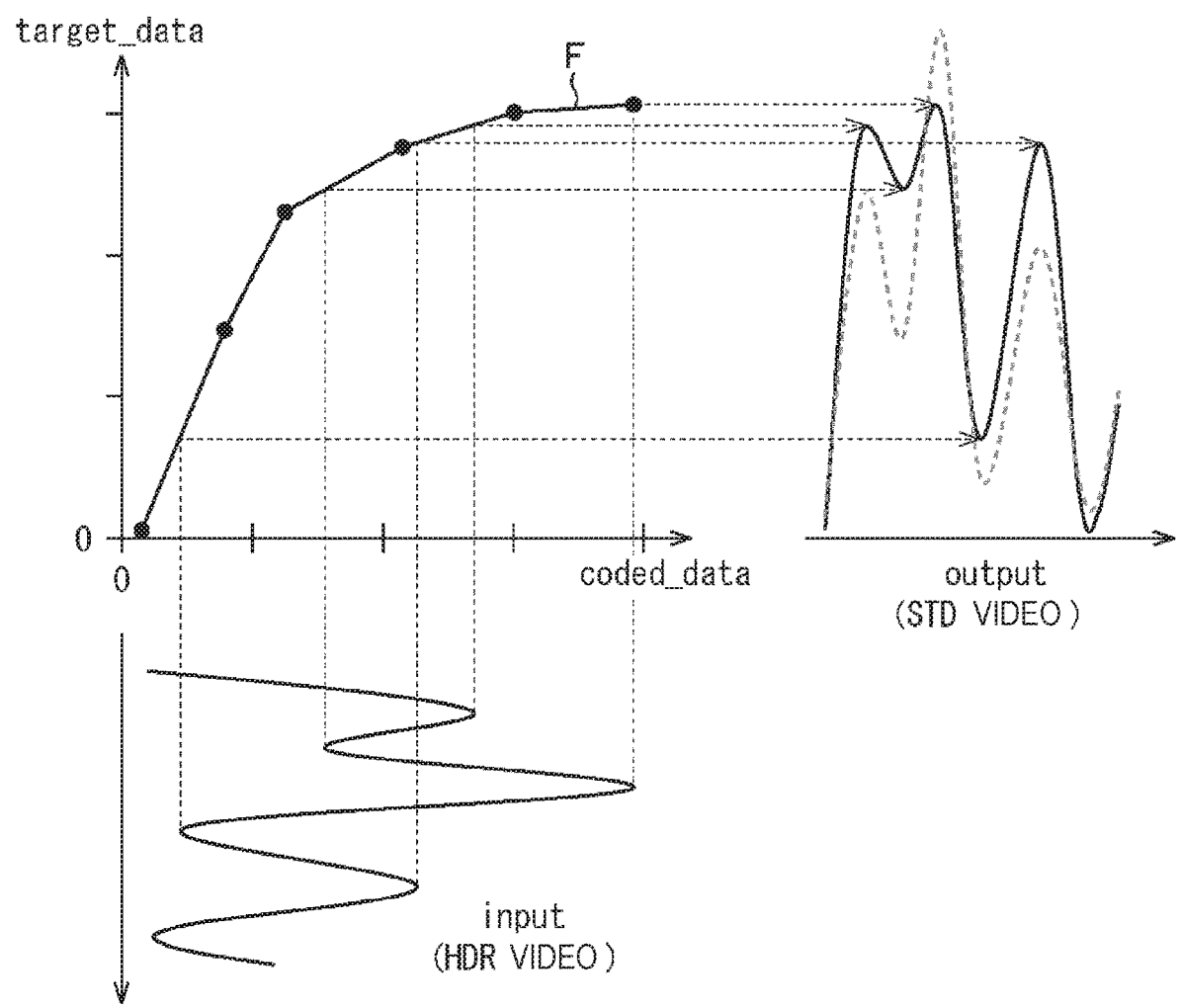
FIG. 23 is a diagram illustrating an example of tone mapping.

FIG. 23 is a diagram illustrating an example of tone mapping.

As illustrated in FIG. 23, for example, the RGB signal of the HDR video is converted to the RGB signal of the STD video by compressing the high brightness components and by extending the intermediate and low brightness components. Information expressing a function F that correlates the RGB signal of the HDR video and the RGB signal of the STD video is, as illustrated in FIG. 23, generated by the definition information generation unit 34. Note that the function F illustrated in FIG. 23 is the Tone mapping information of tone_map_model_id=3 that draws a relationship between the coded_data and the target_data with a polygonal line function that have been described while referring to FIG. 11.

Returning back to the description of FIG. 21, when the recording mode is mode-ii, the HDR-STD conversion unit 33 outputs the STD video that has been obtained by converting the HDR video to the HEVC encoder 32.

On the basis of the information supplied from the HDR-STD conversion unit 33, the definition information generation unit 34 generates tone mapping definition information for HDR-STD conversion.

For example, when tone_map_model_id=0 is used, the definition information generation unit 34 generates Tone mapping information including the values min_value and max_value in FIG. 9 as tone mapping definition information for HDR-STD conversion.

Furthermore, when tone_map_model_id=2 is used, the definition information generation unit 34 generates Tone mapping information including start_of_coded_interval[i] in FIG. 10 as tone mapping definition information for HDR-STD conversion.

Furthermore, when tone_map_model_id=3 is used, the definition information generation unit 34 generates Tone mapping information including coded_pivot_value[i] and target_pivot_value[i], the numbers of which are designated by the num_pivots in FIG. 11, as tone mapping definition information for HDR-STD conversion.

In accordance with the recording mode, the HEVC stream generation unit 35 sets the same value to the Tone mapping information including HDR information supplied from the HDR information generation unit 31 and to the tone_map_id of the Tone mapping information including the tone mapping definition information supplied from the definition information generation unit 34. Furthermore, the HEVC stream generation unit 35 inserts, as SEI, the Tone mapping information including the HDR information and the Tone mapping information including the tone mapping definition information into the coded data and generates the HEVC stream. The HEVC stream generation unit 35 outputs the generated HEVC stream to the disc drive 23.

[Configuration of Reproduction Device 2]

Figure 24:
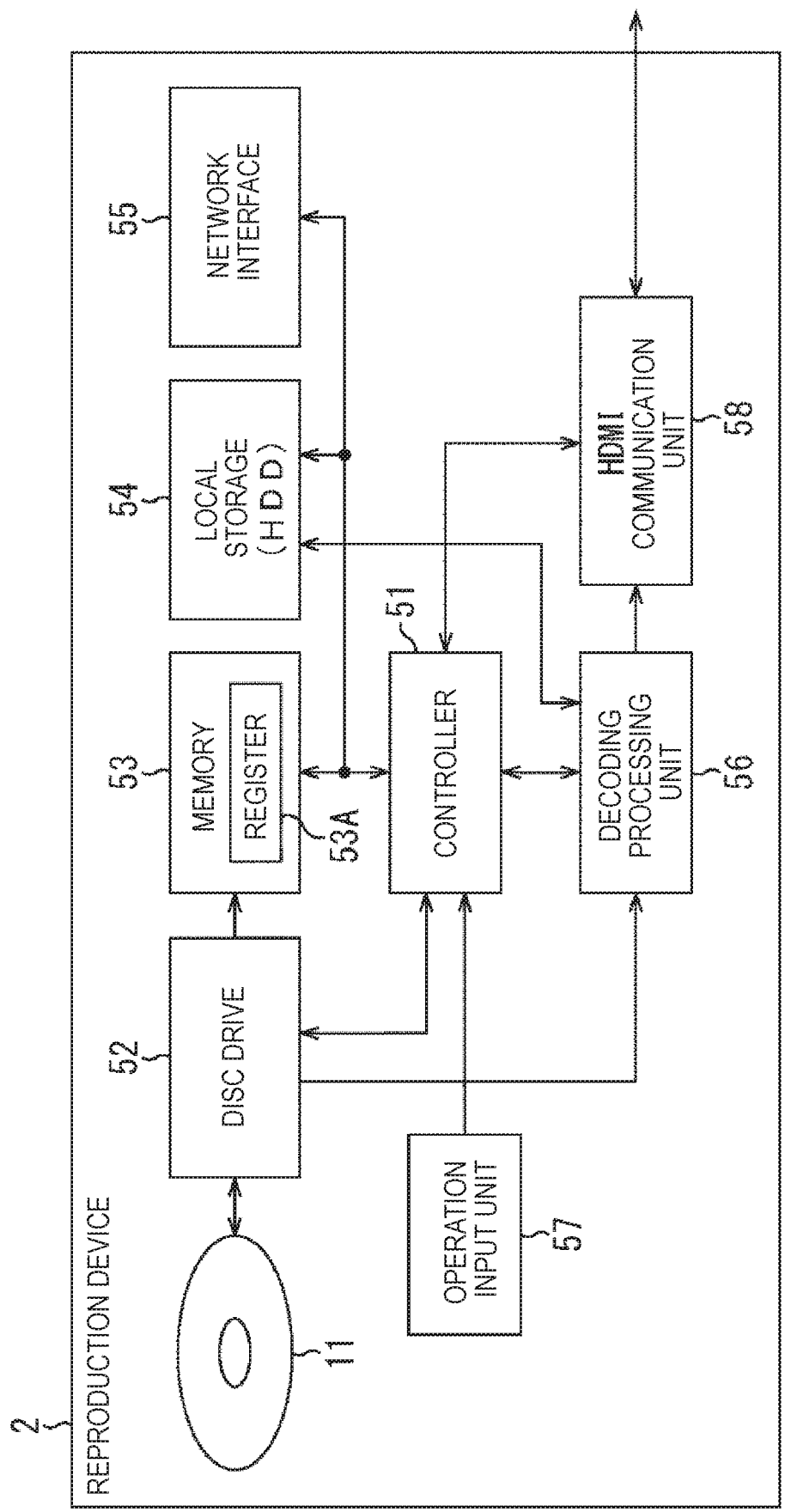
FIG. 24 is a block diagram illustrating an exemplary configuration of a reproduction device.

FIG. 24 is a block diagram illustrating an exemplary configuration of the reproduction device 2.

The reproduction device 2 includes a controller 51, a disc drive 52, a memory 53, a local storage 54, a network interface 55, a decoding processing unit 56, an operation input unit 57, and an HDMI communication unit 58.

The controller 51 includes a CPU, a ROM, and a RAM. The controller 51 executes a predetermined program and controls the overall operation of the reproduction device 2.

The disc drive 52 reads out data from the optical disc 11 and outputs the read out data to the controller 51, the memory 53, or the decoding processing unit 56. For example, the disc drive 52 outputs the Data Base information read out from the optical disc 11 to the controller 51 and outputs an HEVC stream to the decoding processing unit 56.

The memory 53 stores data that is needed by the controller 51 to execute various processing. A register 53A that is a player status register (PSR) is formed in the memory 53. Various information that the reproduction device 2, which is the BD Player, refers to when reproducing the optical disc 11 is stored in the register 53A.

The local storage 54 includes, for example, a hard disk drive (HDD). A stream and the like downloaded from a server is recorded in the local storage 54.

The network interface 55 communicates with the server through a network such as the Internet and supplies the data downloaded from the server to the local storage 54.

The decoding processing unit 56 decodes the HEVC stream supplied from the disc drive 52 and outputs the data of the HDR video or the STD video to the HDMI communication unit 58. When the decoding processing unit 56 outputs the HDR video, the HDR information is output to the HDMI communication unit 58 together with the data of the HDR video.

The operation input unit 57 includes input devices such as a button, a key, and a touch panel and a receiving section that receives a signal such as an infrared signal that is transmitted from a predetermined remote commander. The operation input unit 57 detects the operation of the user and supplies a signal that represents the details of the detected operation to the controller 51.

The HDMI communication unit 58 performs communication with the display device 3 through the HDMI cable 4. For example, the HDMI communication unit 58 acquires information related to the performance of the monitor included in the display device 3 and outputs the information to the controller 51. Furthermore, the HDMI communication unit 58 outputs the data of the HDR video or the STD video, which has been supplied from the decoding processing unit 56, to the display device 3.

Figure 25:
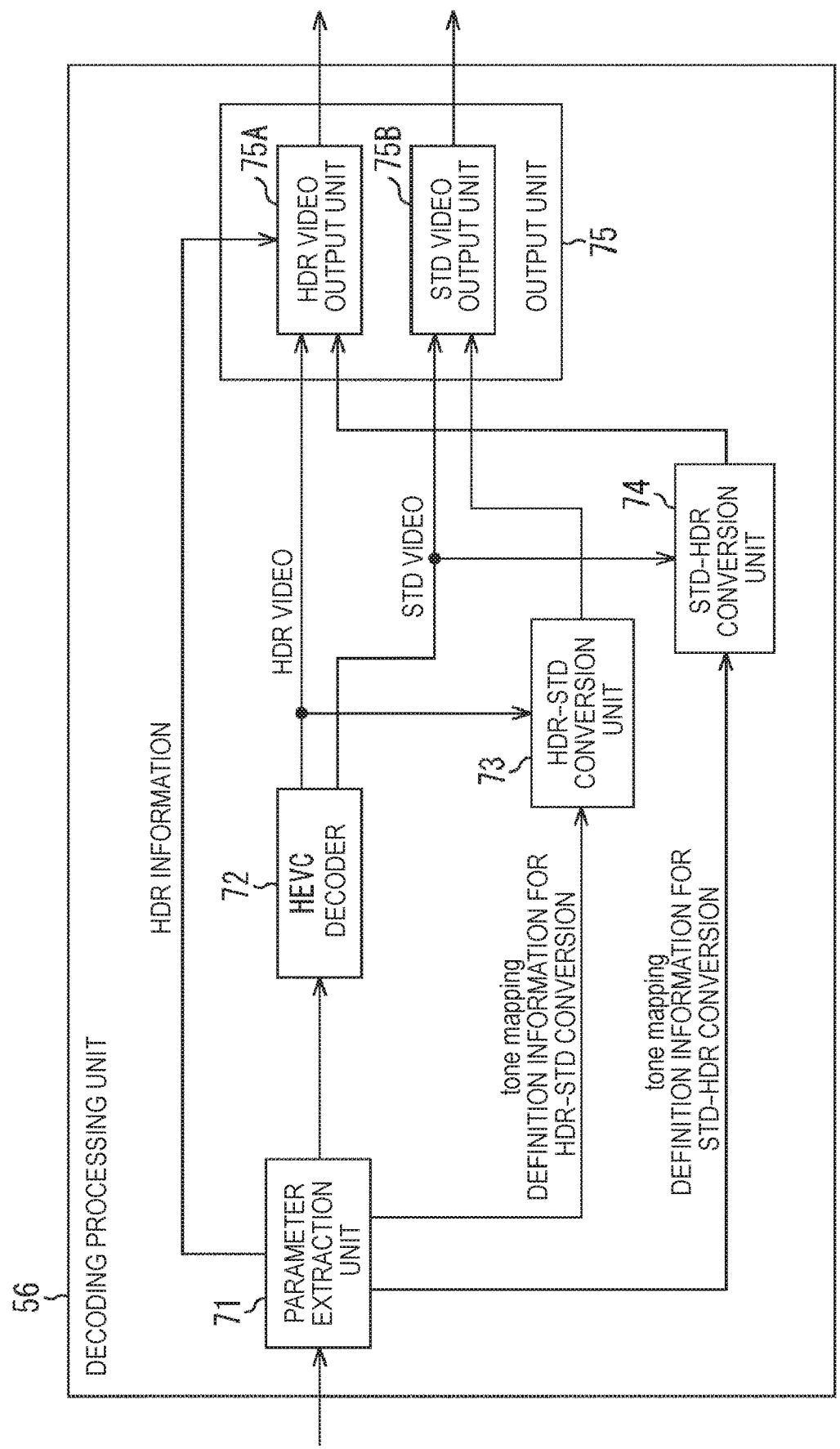
FIG. 25 is a block diagram illustrating an exemplary configuration of a decoding processing unit in FIG. 24.

FIG. 25 is a block diagram illustrating an exemplary configuration of the decoding processing unit 56 in FIG. 24.

The decoding processing unit 56 includes a parameter extraction unit 71, an HEVC decoder 72, an HDR-STD conversion unit 73, an STD-HDR conversion unit 74, and an output unit 75. The output unit 75 includes an HDR video output unit 75A and an STD video output unit 75B.

The HEVC stream read out from the disc drive 52 is input to the parameter extraction unit 71. For example, the information representing the recording mode that is specified by mode_flag included in the Clip Information, and information that is related to the performance of the monitor included in the display device 3 and that is specified by information acquired from the display device 3 are supplied to the decoding processing unit 56 from the controller 51.

The parameter extraction unit 71 extracts HDR information and tone mapping definition information from the SEI of the HEVC stream. For example, when the recording mode is mode-i and when an HDR video is output to the display device 3, the parameter extraction unit 71 outputs the HDR information to the HDR video output unit 75A. Furthermore, when the recording mode is mode-i and when an STD video is output to the display device 3, the parameter extraction unit 71 outputs tone mapping definition information for HDR-STD conversion to the HDR-STD conversion unit 73.

On the other hand, when the recording mode is mode-ii and when an HDR video is output to the display device 3, the parameter extraction unit 71 outputs the HDR information to the HDR video output unit 75A and also outputs tone mapping definition information for STD-HDR conversion to the STD-HDR conversion unit 74. When the recording mode is mode-ii and when an STD video is output to the display device 3, the extracted HDR information and tone mapping definition information are not used.

Furthermore, the parameter extraction unit 71 outputs the coded data included in the HEVC stream to the HEVC decoder 72.

The HEVC decoder 72 decodes the coded data of the HEVC supplied from the parameter extraction unit 71. When the recording mode is mode-i, the HEVC decoder 72 outputs the HDR video, which has been obtained by decoding, to the HDR-STD conversion unit 73 and the HDR video output unit 75A. Furthermore, when the recording mode is mode-ii, the HEVC decoder 72 outputs the STD video, which has been obtained by decoding, to the STD-HDR conversion unit 74 and the STD video output unit 75B.

The HDR-STD conversion unit 73 converts the HDR video, which has been supplied from the HEVC decoder 72, to an STD video on the basis of the tone mapping definition information for HDR-STD conversion supplied from the parameter extraction unit 71. The HDR-STD conversion unit 73 outputs the STD video obtained by conversion to the STD video output unit 75B.

The STD-HDR conversion unit 74 converts the STD video supplied from the HEVC decoder 72 to an HDR video on the basis of the tone mapping definition information for STD-HDR conversion supplied from the parameter extraction unit 71. The STD-HDR conversion unit 74 outputs the HDR video obtained by conversion to the HDR video output unit 75A.

When outputting the HDR video to the display device 3, the HDR video output unit 75A of the output unit 75 outputs the HDR video supplied from the HEVC decoder 72 or the HDR video supplied from the STD-HDR conversion unit 74, together with the HDR information supplied from the parameter extraction unit 71.

When outputting the STD video to the display device 3, the STD video output unit 75B outputs the STD video supplied from the HEVC decoder 72 or the STD video supplied from the HDR-STD conversion unit 73.

The data output from the HDR video output unit 75A and the STD video output unit 75B is transmitted to the display device 3 by the HDMI communication unit 58.

[Configuration of Display Device 3]

Figure 26:
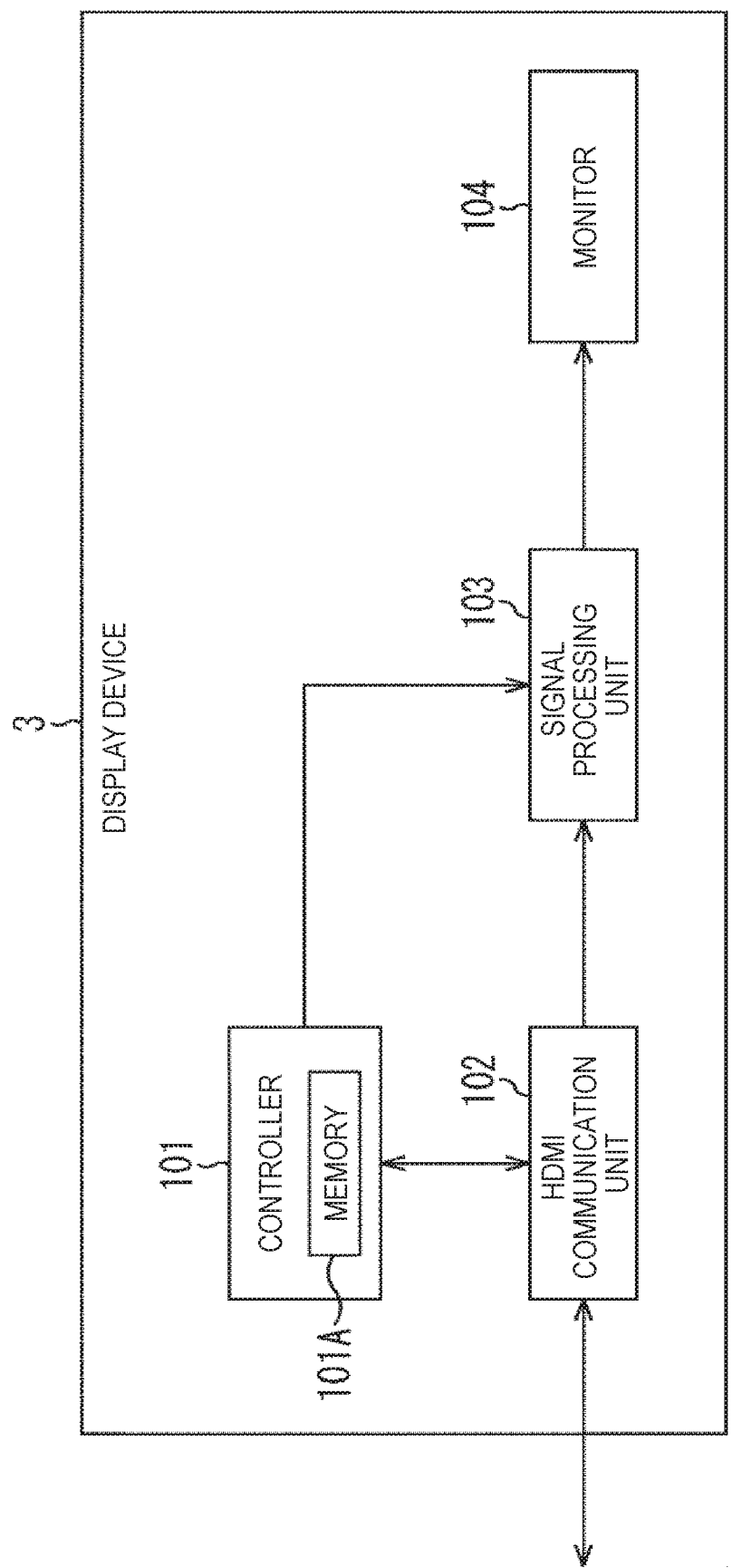
FIG. 26 is a block diagram illustrating an exemplary configuration of a display device.

FIG. 26 is a block diagram illustrating an exemplary configuration of the display device 3.

The display device 3 includes a controller 101, an HDMI communication unit 102, a signal processing unit 103, and a monitor 104. The controller 101 includes a memory 101A.

The controller 101 includes a CPU, a ROM, and a RAM. The controller 101 executes a predetermined program and controls the overall operation of the display device 3.

For example, the controller 101 makes the memory 101A store extended display identification data (EDID) that represents the performance of the monitor 104 and performs management. When performing authentication between the reproduction device 2, the controller 101 outputs the EDID that is stored in the memory 101A to the HDMI communication unit 102 and transmits the EDID to the reproduction device 2. On the basis of the EDID, the reproduction device 2 specifies the performance of the monitor 104 of the display device 3.

The HDMI communication unit 102 performs communication with the reproduction device 2 through the HDMI cable 4. The HDMI communication unit 102 receives video data transmitted from the reproduction device 2 and outputs the data to the signal processing unit 103. Furthermore, the HDMI communication unit 102 transmits the EDID supplied from the controller 101 to the reproduction device 2.

The signal processing unit 103 performs processing on the video data supplied from the HDMI communication unit 102 and displays an image on the monitor 104.

<5. Operation of Each Device>

Herein, an operation of each device having the above-described configuration will be described.

[Recording Processing]

Referring first to the flowchart in FIG. 27, recording processing of the recording device 1 will be described. The processing in FIG. 27 starts when the master HDR video is input to the recording device 1.

In step S1, the controller 21 of the recording device 1 determines whether the recording mode is mode-i. The recording mode is set by the author, for example.

When it is determined that the recording mode is mode-i in step S1, in step S2, the coding processing unit 22 performs coding processing in mode-i. The HEVC stream generated by the coding processing in mode-i is supplied to the disc drive 23.

On the other hand, when it is determined that the recording mode is mode-ii in step S1, in step S3, the coding processing unit 22 performs coding processing in mode-ii. The HEVC stream generated by the coding processing in mode-ii is supplied to the disc drive 23.

In step S4, the Data Base information generation unit 21A performs Data Base information generation processing. The PlayList file and the Clip Information file generated by the Data Base information generation processing are supplied to the disc drive 23.

In step S5, the disc drive 23 records the PlayList file, the Clip Information file, and the stream file that stores the HEVC stream on the optical disc 11. Subsequently, the processing is ended.

Referring next to the flowchart in FIG. 28, the coding processing in mode-i performed in step S2 in FIG. 27 will be described.

In step S11, the HDR information generation unit 31 of the coding processing unit 22 detects the brightness of the master HDR video and generates HDR information.

In step S12, the HEVC encoder 32 performs coding on the master HDR video by HEVC and generates coded data of the HDR video.

In step S13, the HDR-STD conversion unit 33 converts the input master HDR video to an STD video. Information representing the correlation between an input data, which is the RGB signal of the HDR video, and an output data, which is the RGB signal of the STD video, is supplied to the definition information generation unit 34.

In step S14, on the basis of the information supplied from the HDR-STD conversion unit 33, the definition information generation unit 34 generates tone mapping definition information for HDR-STD conversion.

In step S15, the HEVC stream generation unit 35 sets an ID for mode-i to the Tone mapping information including the HDR information generated by the HDR information generation unit 31 and to the tone_map_id of the Tone mapping information including the tone mapping definition information generated by definition information generation unit 34. Furthermore, the HEVC stream generation unit 35 inserts the Tone mapping information including the HDR information and the Tone mapping information including the tone mapping definition information in the coded data and generates an HEVC stream. Subsequently, the process returns to step S2 in FIG. 27 and the processing thereafter is performed.

Figure 29:
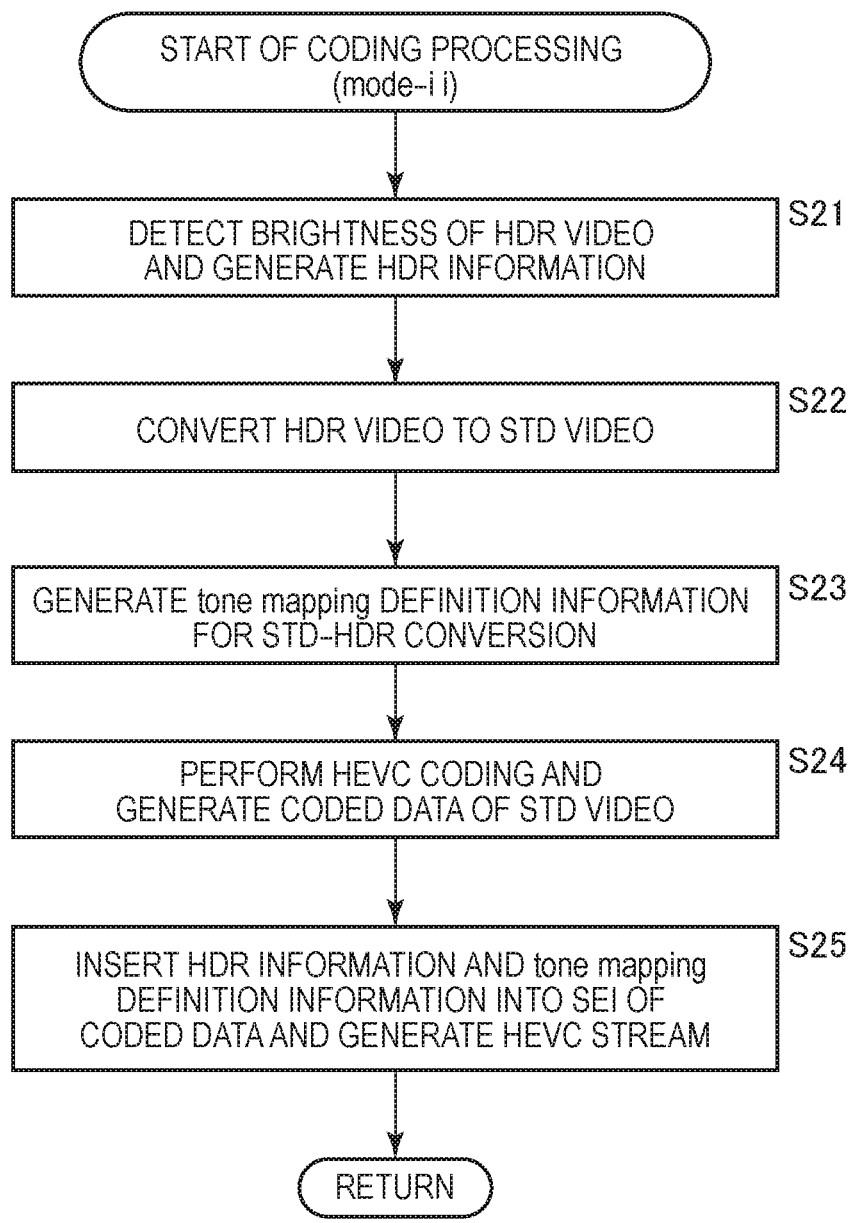
FIG. 29 is a flowchart illustrating coding processing in mode-ii performed in step S3 in FIG. 27.

Referring next to the flowchart in FIG. 29, the coding processing in mode-ii performed in step S3 in FIG. 27 will be described.

In step S21, the HDR information generation unit 31 of the coding processing unit 22 detects the brightness of the master HDR video and generates HDR information.

In step S22, the HDR-STD conversion unit 33 converts the input master HDR video to an STD video. Information representing the correlation between an input data, which is the RGB signal of the HDR video, and an output data, which is the RGB signal of the STD video, is supplied to the definition information generation unit 34.

In step S23, on the basis of the information supplied from the HDR-STD conversion unit 33, the definition information generation unit 34 generates tone mapping definition information for STD-HDR conversion.

In step S24, the HEVC encoder 32 performs, by HEVC, coding on the STD video obtained by converting the master HDR video and generates coded data of the STD video.

In step S25, the HEVC stream generation unit 35 sets an ID for mode-ii to the Tone mapping information including the HDR information generated by the HDR information generation unit 31 and to the tone_map_id of the Tone mapping information including the tone mapping definition information generated by definition information generation unit 34. Furthermore, the HEVC stream generation unit 35 inserts the Tone mapping information including the HDR information and the Tone mapping information including the tone mapping definition information in the coded data and generates an HEVC stream. Subsequently, the process returns to step S3 in FIG. 27 and the processing thereafter is performed.

Figure 30:
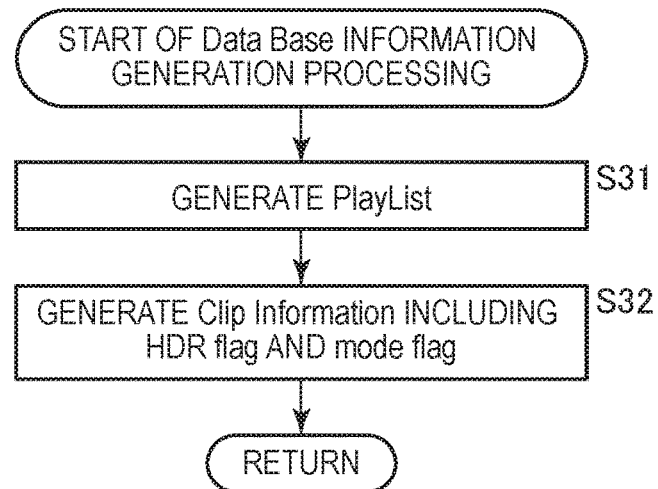
FIG. 30 is a flowchart illustrating Data Base information generation processing performed in step S4 in FIG. 27.

Referring next to the flowchart in FIG. 30, the Data Base information generation processing performed in step S4 in FIG. 27 will be described.

In step S31, the Data Base information generation unit 21A of the controller 21 generates a PlayList including various information described while referring to FIG. 16. The PlayList that the Data Base information generation unit 21A generates includes information relating to a PlayItem that designates the HEVC stream as a reproduction section.

In step S32, the Data Base information generation unit 21A generates Clip Information including the HDR_flag and the mode_flag in the StreamCodingInfo of the ProgramInfo ( ). In the present example, since the master video is an HDR video, the Data Base information generation unit 21A sets 1 that represents that the master video is an HDR video as a value of the HDR_flag.

Figure 27:
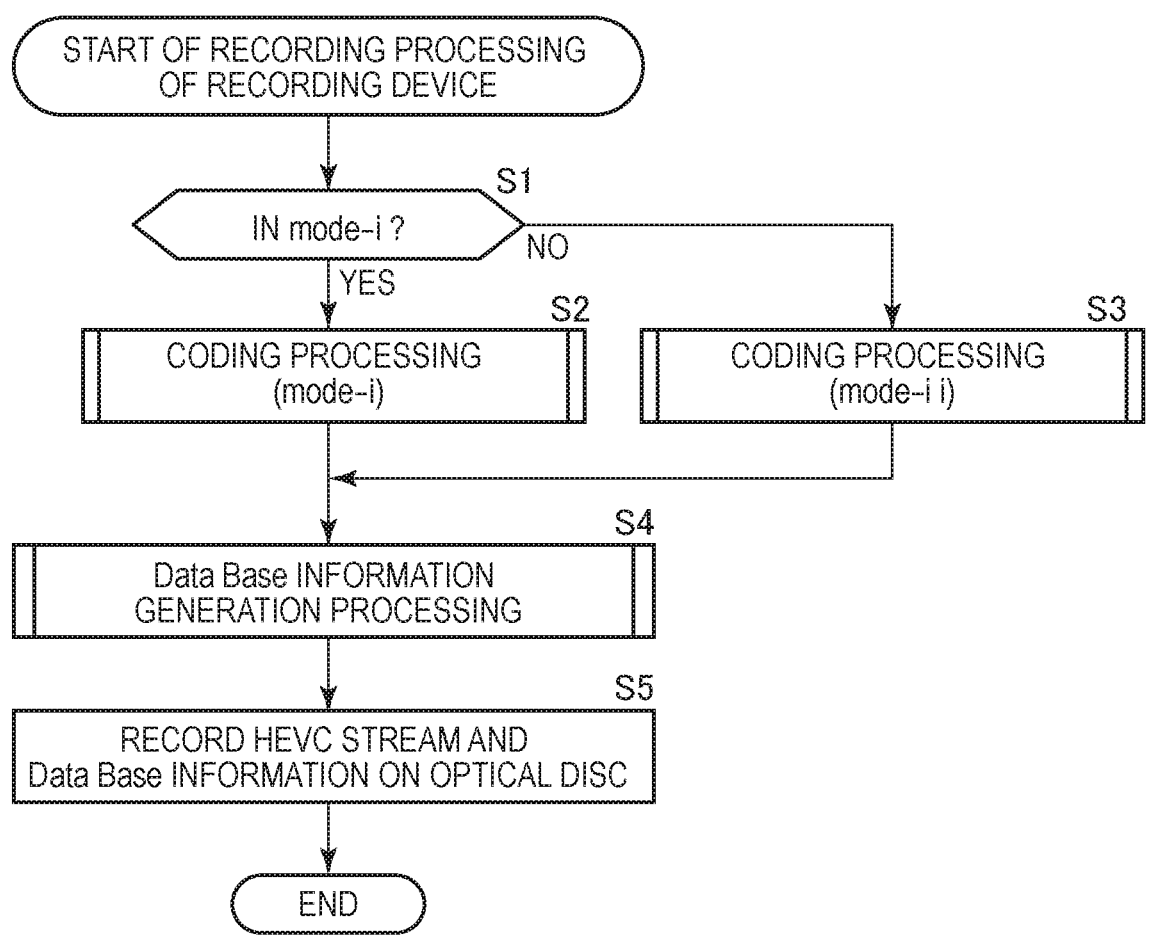
FIG. 27 is a flowchart illustrating recording processing of the recording device.
Figure 28:
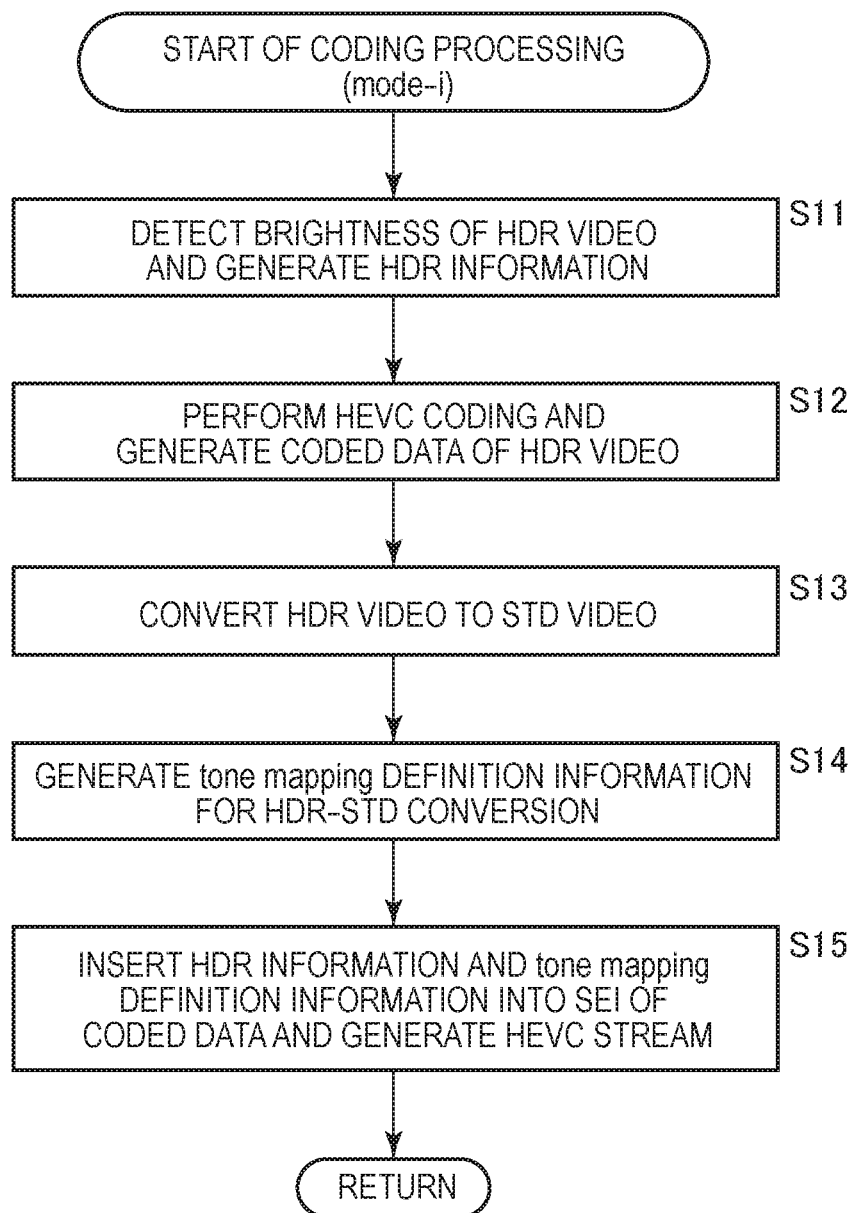
FIG. 28 is a flowchart illustrating coding processing in mode-i performed in step S2 in FIG. 27.

Furthermore, in step S2 in FIG. 27, when the coding processing is performed in mode-i, the Data Base information generation unit 21A sets 1 that represents that the recording mode is mode-i as a value of the mode_flag. On the other hand, in step S3 in FIG. 27, when the coding processing is performed in mode-ii, the Data Base information generation unit 21A sets 0 that represents that the recording mode is mode-ii as a value of the mode_flag. Subsequently, the process returns to step S4 in FIG. 27 and the processing thereafter is performed.

In the recording device 1, the HEVC stream and the Data Base information generated with the above processing are recorded on the optical disc 11.

[Reproduction Processing]

Figure 31:
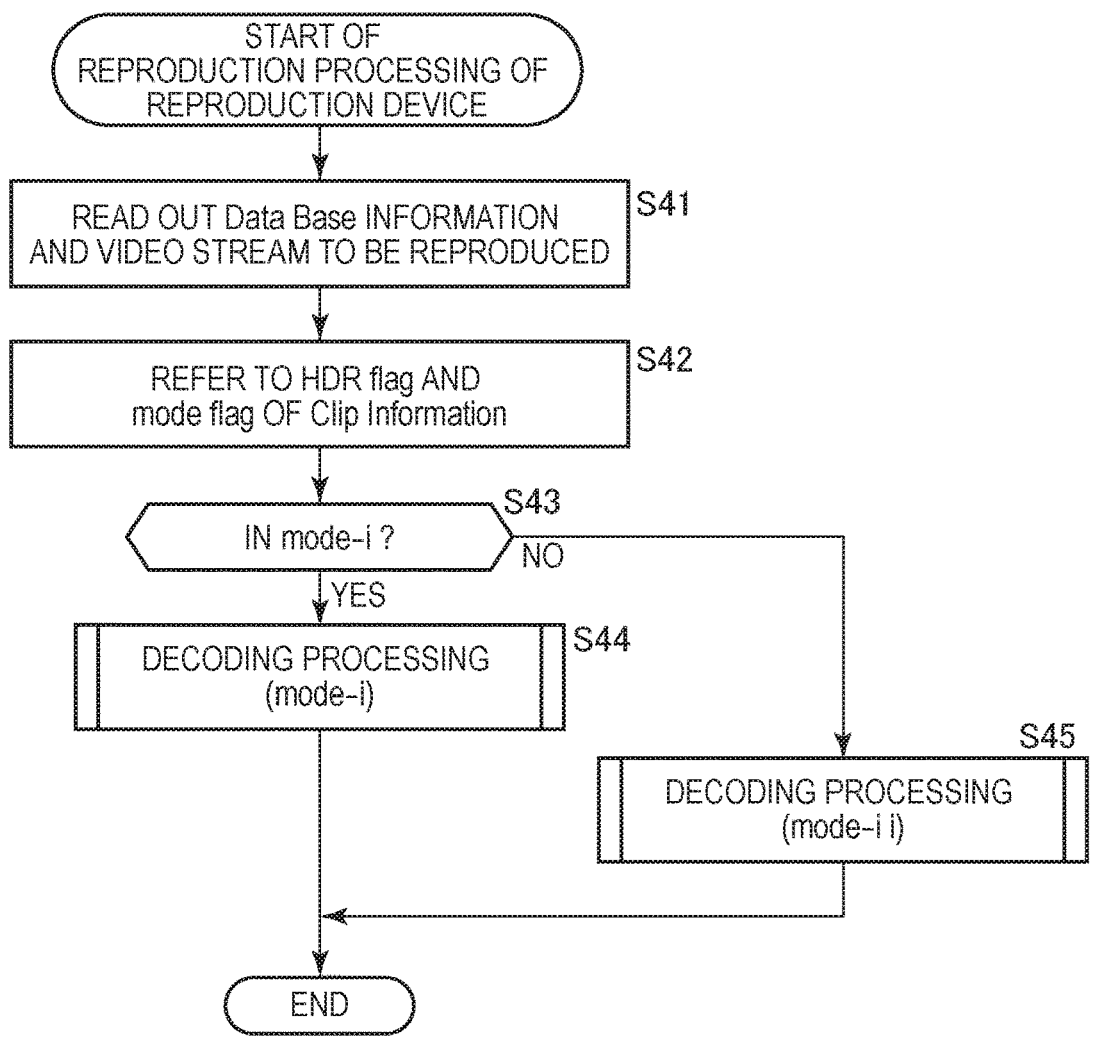
FIG. 31 is a flowchart illustrating reproduction processing of the reproduction device.

Referring next to the flowchart in FIG. 31, reproduction processing of the reproduction device 2 will be described.

At a predetermined timing such as when starting reproduction of the optical disc 11, the controller 51 of the reproduction device 2 controls the HDMI communication unit 58 and communicates with the display device 3 to read out the EDID from the memory 101A of the display device 3. The controller 51 stores the information representing the performance of the monitor included in the display device 3 in the register 53A and performs management.

In step S41, the controller 51 controls the disc drive 52 and reads out the PlayList and the Clip Information, which are Data Base information, from the optical disc 11. Furthermore, on the basis of the information included in the PlayList, the controller 51 specifies the HEVC stream to be reproduced and controls the disc drive 52 to read out the AV stream including the specified HEVC stream from the optical disc 11.

In step S42, the controller 51 refers to the HDR_flag and the mode_flag included in the Clip Information. In the present example, the HDR_flag is set with a value that represents that recording of the HDR video as a master is being performed. With the above, the reproduction device 2 is brought into a state in which reproduction of the HDR video or the STD video obtained by converting the HDR video can be performed.

In step S43, the controller 51 determines whether the recording mode is mode-i on the basis of the value of the mode_flag.

When it is determined that the recording mode is mode-i in step S43, in step S44, the decoding processing unit 56 performs decoding processing in mode-i.

On the other hand, when it is determined that the recording mode is mode-ii in step S43, in step S45, the decoding processing unit 56 performs decoding processing in mode-ii.

After the decoding processing is performed in step S44 or step S45, the process is ended.

Note that, herein, while the determination on whether the recording mode is mode-i is made on the basis of the value of the mode_flag, the determination may be made on the basis of the tone_map_id of the Tone mapping information inserted into the HEVC stream.

Referring next to the flowchart in FIG. 32, the decoding processing in mode-i performed in step S44 in FIG. 31 will be described.

In step S61, the parameter extraction unit 71 of the decoding processing unit 56 extracts HDR information and tone mapping definition information from the SEI of the HEVC stream. The parameter extraction unit 71 outputs the coded data of the HEVC included in the HEVC stream to the HEVC decoder 72.

In step S62, the HEVC decoder 72 decodes the coded data of the HEVC and outputs the HDR video obtained by decoding to the HDR-STD conversion unit 73 and the HDR video output unit 75A.

In step S63, on the basis of the information stored in the register 53A, the controller 51 determines whether the monitor included in the display device 3 is an HDR monitor. As described above, information related to the performance of the monitor included in the display device 3 is stored in the register 53A on the basis of the EDID of the HDMI read out from the display device 3.

When it is determined that the monitor included in the display device 3 is an HDR monitor in step S63, in step S64, the HDR video output unit 75A outputs the HDR video supplied from the HEVC decoder 72 together with the HDR information supplied from the parameter extraction unit 71.

On the other hand, when it is determined that tire monitor included in the display device 3 is not an HDR monitor but is an STD monitor in step S63, in step S65, the HDR-STD conversion unit 73 converts the HDR video supplied from the HEVC decoder 72 to an STD video on the basis of the tone mapping definition information for HDR-STD conversion supplied from the parameter extraction unit 71.

In step S66, the STD video output unit 75B outputs the STD video obtained by performing conversion in the HDR-STD conversion unit 73.

In step S67, after the HDR video has been output in step S64 or after the STD video has been output in step S66, the controller 51 determines whether the reproduction is to be ended.

When it is determined in step S67 that the reproduction is not to be ended, the controller 51 returns the process to step S61 and performs repetition of the above processing. When it is determined in step S67 that the reproduction is to be aided, the process returns to step S44 in FIG. 31 and the processing thereafter is performed.

Referring next to the flowchart in FIG. 33, the decoding processing in mode-ii performed in step S45 in FIG. 31 will be described.

In step S81, the parameter extraction unit 71 of the decoding processing unit 56 extracts HDR information and tone mapping definition information from the SEI of the HEVC stream. The parameter extraction unit 71 outputs the coded data of the HEVC included in the HEVC stream to the HEVC decoder 72.

In step S82, the HEVC decoder 72 decodes the coded data of the HEVC and outputs the STD video obtained by decoding to the STD-HDR conversion unit 74 and the STD video output unit 75B.

In step S83, on the basis of the information stored in the register 53A, the controller 51 determines whether the monitor included in the display device 3 is an HDR monitor.

When it is determined that the monitor included in the display device 3 is an HDR monitor in step S83, in step S84, the STD-HDR conversion unit 74 converts the STD video supplied from the HEVC decoder 72 to an HDR video on the basis of the tone mapping definition information for STD-HDR conversion supplied from the parameter extraction unit 71.

In step S85, the HDR video output unit 75A outputs the HDR video, which has been obtained by conversion with the STD-HDR conversion unit 74, together with the HDR information supplied from the parameter extraction unit 71.

On the other hand, when it is determined that tire monitor included in the display device 3 is an STD monitor in step S83, in step S86, the STD video output unit 75B outputs the STD video supplied from the HEVC decoder 72.

In step S87, after the HDR video has been output in step S85 or after the STD video has been output in step S86, the controller 51 determines whether the reproduction is to be ended.

When it is determined in step S87 that the reproduction is not to be ended, the controller 51 returns the process to step S81 and performs repetition of the above processing. When it is determined in step S87 that the reproduction is to be aided, the process returns to step S45 in FIG. 31 and the processing thereafter is performed.

[Display Processing]

Figure 34:
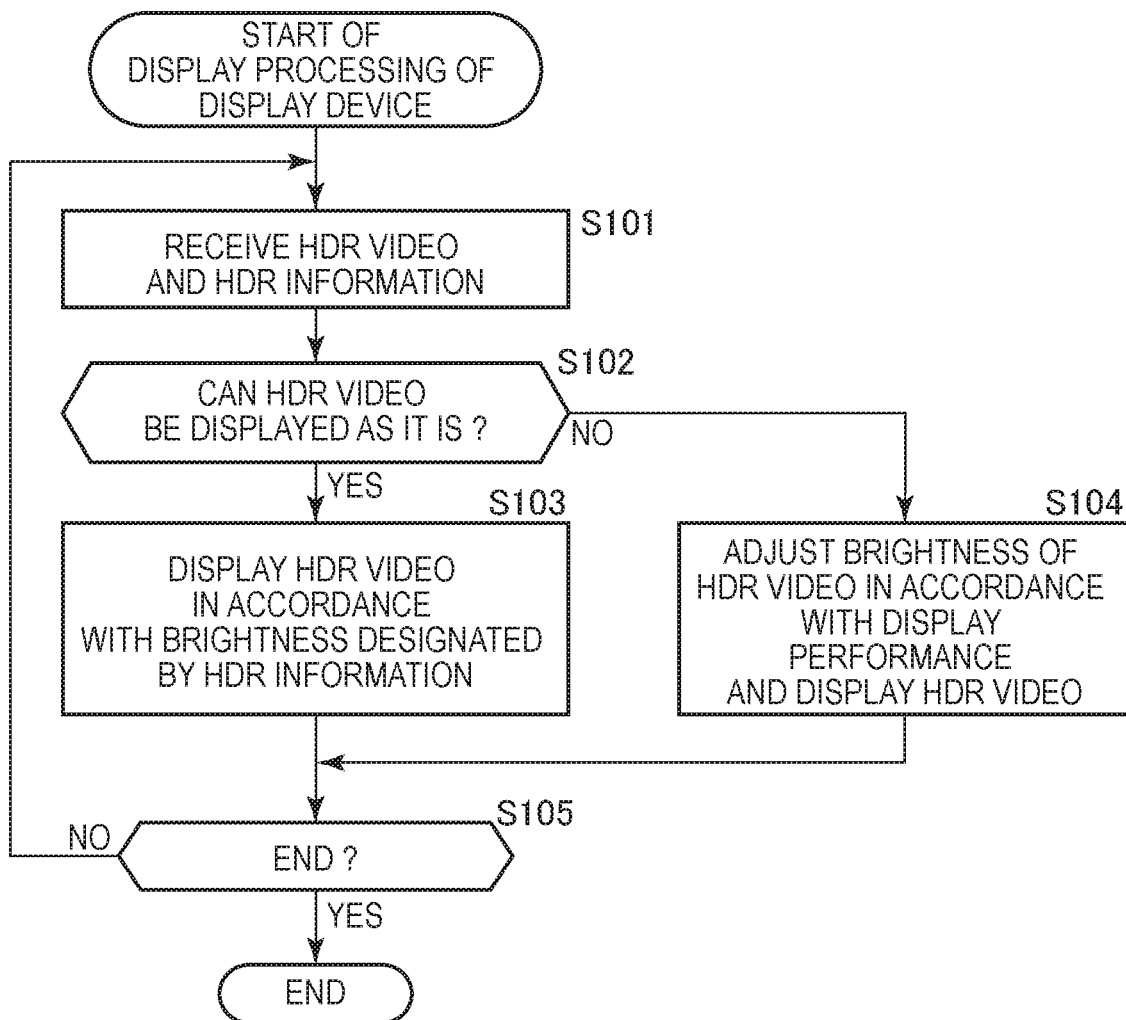
FIG. 34 is a flowchart illustrating display processing of the display device.

Referring next to the flowchart in FIG. 34, display processing of the display device 3 will be described.

Herein, a case in which the monitor 104 included in the display device 3 is an HDR monitor will be described. An HDR video to which HDR information is added is transmitted to the display device 3 including an HDR monitor from the reproduction device 2.

In step S101, the HDMI communication unit 102 of the display device 3 receives the HDR video and the HDR information transmitted from the reproduction device 2.

In step S102, the controller 101 refers to the HDR information and determines whether the HDR video transmitted from the reproduction device 2 can be displayed as it is. The HDR information includes information of the master HDR video, that is, information representing the brightness characteristic of the HDR video transmitted from the reproduction device 2. The determination in step S102 is performed by comparing the brightness characteristic of the HDR video specified by the HDR information and the display performance of the monitor 104 with each other.

For example, in a case in which the dynamic range of the HDR video specified by the HDR information is 0-400% and the dynamic range of the monitor 104 is 0-500% (500 cd/m$^2$ assuming that the brightness of 100% is 100 cd/m$^2$, for example), it is determined that the HDR video can be displayed as it is. On the other hand, in a case in which the dynamic range of the HDR video specified by the HDR information is 0-400% and the dynamic range of the monitor 104 is 0-300%, it is determined that the HDR video cannot be displayed as it is.

When it is determined that the HDR video can be displayed as it is in step S102, in step S103, the signal processing unit 103 displays an image of the HDR video on the monitor 104 in accordance with the brightness designated by the HDR information. For example, in a case in which the brightness characteristic drawn by the curve L12 in FIG. 12 is designated by the HDR information, each of the pixel values expresses a brightness in the range of 0-400% that is drawn by the curve L12.

On the other hand, when it is determined that the HDR video cannot be displayed as it is in step S102, in step S104, the signal processing unit 103 adjusts the brightness in accordance with the display performance of the monitor 104 and displays an image of the HDR video, the brightness of which has been adjusted, on the monitor 104. For example, in a case in which the brightness characteristic drawn by the curve L12 in FIG. 12 is designated by the HDR information and when the dynamic range of the monitor 104 is 0-300%, compression is performed so that each of the pixel values expresses the brightness in the range of 0-300%.

After the image of the HDR video has been displayed in step S103 or in step S104, in step S105, the controller 101 determines whether the display is to be ended and when it is determined that the display is not to be ended, processing from step S101 and after is repeated. When determination is made to end the display in step S105, the controller 101 ends the processing.

With the above sequential processing, the recording device 1 can record the master HDR video on the optical disc 11 as it is and have the reproduction device 2 perform reproduction so that the image of the HDR video is displayed on the display device 3.

Furthermore, the recording device 1 can convert the master HDR video to an STD video, record the STD video on the optical disc 11, and have the reproduction device 2 restore the STD video into an HDR video so that the image of the HDR video is displayed on the display device 3.

When reproducing the HDR video, by enabling the brightness characteristic of the master HDR video to be designated with the HDR information, the author of the content is capable of displaying an image of the HDR video at an intended brightness.

<6. Modifications>
[Storing Position of Flag]

While it has been described above that the HDR_flag and the mode_flag are stored in the Clip Information, the HDR_flag and the mode_flag may be stored in the PlayList.

A First Example of Storing Position

FIG. 35 is a diagram illustrating an example of syntax of the AppInfoPlayList ( ) included in the PlayList file in FIG. 16.

As it has been described above, the AppInfoPlayList ( ) stores parameters that is related to the reproduction control of the PlayList, such as a reproduction restriction. In the example in FIG. 35, the HDR_flag and the mode_flag are described continuously after MVC_Base_view_R_flag.

As described above, the HDR_flag and the mode_flag may be described in the AppInfoPlayList ( ) of the PlayList file.

A Second Example of Storing Position

FIG. 36 is a diagram illustrating syntax of PlayList ( ) included in the PlayList file in FIG. 16.

Number_of_PlayItems represents the number of PlayItems in the PlayList. In the case of the example in FIG. 14, the number of PlayItems is three. The PlayItem_ids are each allocated with a number as its value, in the order of appearance of the PlayItem ( ) in the PlayList, starting from 0.

Number_of_SubPaths represents the number of Sub Paths in the PlayList. In the case of the example in FIG. 14, the number of Sub Paths is three. The SubPath_ids are each allocated with a number as its value, in the order of appearance of the SubPath ( ) in the PlayList, starting from 0.

As illustrated in FIG. 36, in the PlayList, the PlayItem ( ) is described the number of times that corresponds to the number of the PlayItems, and the SubPath ( ) is described the number of times that corresponds to the number of the Sub Paths.

FIG. 37 is a diagram illustrating syntax of the PlayItem ( ) in FIG. 36.

Clip_Information_file_name[0] represents the name of the Clip Information file of the Clip to which the PlayItem refers. Clip_codec_identifier[0] represents the codec system of the Clip.

IN_time represents the start position of the reproduction section of the PlayItem and OUT_time represents the end position. UO_mask_table ( ), PlayItem_random_access_mode, still_mode are included after the OUT_time.

Information of the AV stream to which the PlayItem refers is included in STN_table ( ). In a case in which there is a Sub Path that is reproduced in association with the PlayItem, the AV steam information that the SubPlayItem, which constitutes the Sub Path, refers to is also included.

FIG. 38 is a diagram illustrating syntax of the STN_table ( ) in FIG. 37.

Number_of_video_stream_entries represents the number of video streams that are entered (registered) in the STN_table ( ). Number_of_audio_stream_entries represents the number of streams of the first audio stream that is entered in the STN_table ( ). Number_of_audio_stream2_entries represents the number of streams of the second audio stream that is entered in the STN_table ( ).

Number_of_PG_textST_stream_entries represents the number of PG_textST streams entered in the STN_table ( ). PG_textST stream is a presentation graphics (PG) stream and a text caption file (textST) that are run-length coded bitmap captions. Number_of_IG_stream_entries represents the number of interactive graphics (IG) streams that is entered in the STN_table ( ).

Stream_entry ( ) and stream_attributes ( ) that are information of each of the video streams, the first video stream, the second video stream, the PG_textST stream and the IG stream are described in the STN_table ( ). PID of the stream is included in the stream_entry ( ), and attribute information of the stream is included in the stream_attributes ( ).

FIG. 39 is a diagram illustrating an example of a description related to the video stream, which is a description in the description of the stream_attributes ( ) in FIG. 38.

In the example of the stream_attributes ( ) in FIG. 39, stream_coding_type, video_format, and frame_rate are described as the attribute information of the video stream and the HDR_flag and the mode_flag are described after that. Note that the stream_coding_type represents the coding method of the video stream and the video_format represents the video format. The frame_rate represents the frame rate of the video.

As described above, the HDR_flag and the mode_flag may be described in the STN_table ( ) of the PlayList file.

The HDR_flag and the mode_flag may be described in a position in the PlayList file other than the AppInfoPlayList ( ) and the STN_table ( ). In a similar manner, the HDR_flag and the mode_flag may be described in a position in the Clip Information file other than the StreamCodingInfo described while referring to FIG. 19.

The positions where the HDR_flag and the mode_flag are described are optional, such as one of the HDR_flag and the mode_flag being described in the Clip Information file and the other being described in the PlayList file.

[PSR]

FIG. 40 is a diagram illustrating an example of an allocation of the PSR.

As described above, the register 53A of the reproduction device 2 is used as a PSR. On the BD, each PSR is allocated with a PSR number defining the intended use of the relevant PSR.

HDR_capability_flag is stored in PSR29 that is a PSR with a PSR number of 29. For example, the value of the HDR_capability_flag of the PSR29 being 1 represents that the reproduction device 2 supports reproduction of an HDR video. Furthermore, the value of the HDR_capability_flag of the PSR29 being 0 represents that the reproduction device 2 does not support reproduction of an HDR video.

For example, when an optical disc in which the value of the HDR_flag of the Clip Information is set to 1 is inserted, in other words, when an optical disc that have recorded a master HDR video is inserted, the HDR_capability_flag is referred to by the controller 51 that executes the disc navigation program. When the value of the HDR_capability_flag is set to 0, a message that requests a display device supporting the processing of the HDR video to be connected to the reproduction device 2 is displayed.

PSR25 that is a PSR with a PSR number of 25 is used as a PSR to record the information representing the correspondence of the connected monitor to an HDR video. In such a case, the information representing the performance of the monitor included in the display device 3, which is represented by the EDID acquired from the display device 3, is stored in the PSR25.

For example, HDR_display_capability_flag and information representing the brightness specification are stored in the PSR25 for HDR Display Capability. The value of the HDR_display_capability_flag being 1 represents that the connected monitor is capable of displaying an HDR video. Furthermore, the value of the HDR_display_capability_flag being 0 represents that the connected monitor is not capable of displaying an HDR video.

For example, information representing the extent of brightness, in percent, that can be displayed is stored as information representing the brightness specification.

Rather than using the PSR25 for HDR Display Capability, the PSR23 that is a PSR for Display Capability may store information representing the HDR_display_capability_flag and the brightness specification.

<7. Exemplary Case in which Brightness is Adjusted on Reproduction Device Side>

In the above description, when the HDR video that has been transmitted from the reproduction device 2 cannot be displayed as it is, the display device 3 itself adjusted the brightness; however, the adjustment of the brightness of the HDR video may be performed by the reproduction device 2. The display device 3 will be receiving an HDR video whose brightness has been adjusted by the reproduction device 2 and will be displaying an image of the HDR video.

[Signal Processing in Mode-i]

Figure 41:
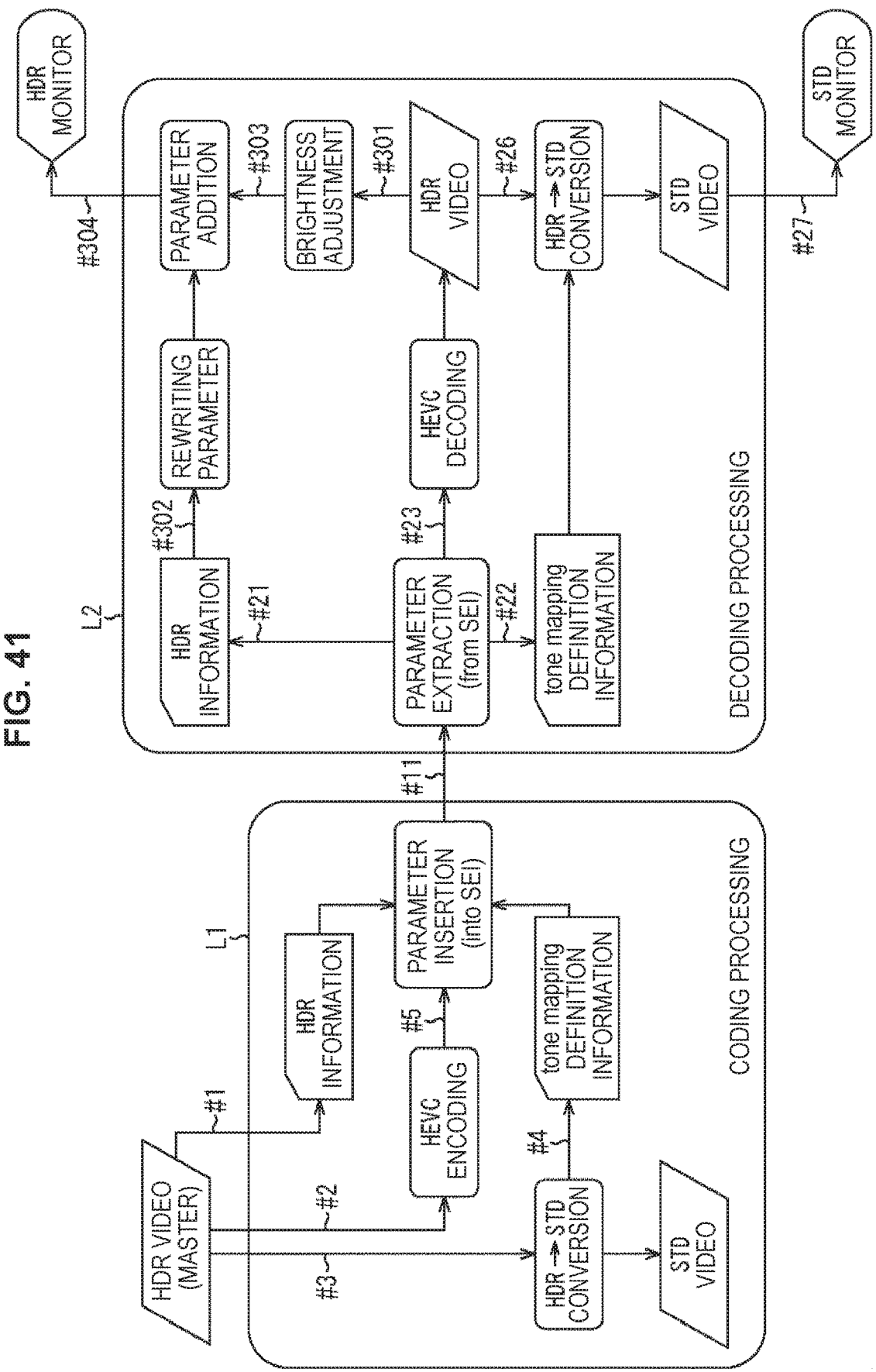
FIG. 41 is a diagram illustrating an example of signal processing in mode-i in a case in which an adjustment of a brightness of an HDR video is performed on a reproduction device side.

FIG. 41 is a diagram illustrating an example of signal processing in mode-i in a case in which the adjustment of the brightness of the HDR video is performed by the reproduction device 2.

Among the processing illustrated in FIG. 41, the processing performed by the recording device 1 and the processing related to the output of the STD video performed by the reproduction device 2 are the same as the processing described while referring to FIG. 2. Redundant descriptions will be appropriately omitted. It is assumed that the HDR_display_capability_flag described above and the information representing the brightness specification are stored in the register 53A of the reproduction device 2.

The reproduction device 2 reads out the HEVC stream from the optical disc 11 and, as illustrated at the ends of arrows #21 and #22, extracts the HDR information and the tone mapping definition information from the SEI of the HEVC stream.

Furthermore, as illustrated at the end of arrow #23, the reproduction device 2 decodes the coded data of the HEVC.

As illustrated at the end of arrow #301, when the display device 3 includes an HDR monitor but cannot display the HDR video as it is, the reproduction device 2 adjusts the brightness of the HDR video obtained by decoding the coded data.

For example, when the dynamic range of the HDR video represented by the HDR information is 0-400% and when it is represented that the dynamic range of the monitor 104 is 0-300% from the information representing the brightness specification stored in the register 53A, the reproduction device 2 performs adjustment of the brightness. In the above case, the brightness of each pixel value is compressed to the range of 0-300%.

When the brightness of the HDR video is adjusted, as illustrated at the end of arrow #302, the reproduction device 2 rewrites the HDR information. The HDR information after the rewriting becomes information representing the brightness characteristic of the HDR video on which the adjustment of the brightness has been performed.

As illustrated at the end of arrow #303, the reproduction device 2 adds the HDR information to the data of the HDR video on which the adjustment of the brightness has been performed and, as illustrated at the end of arrow #304, outputs the data to the display device 3.

[Signal Processing in Mode-ii]

Figure 42:
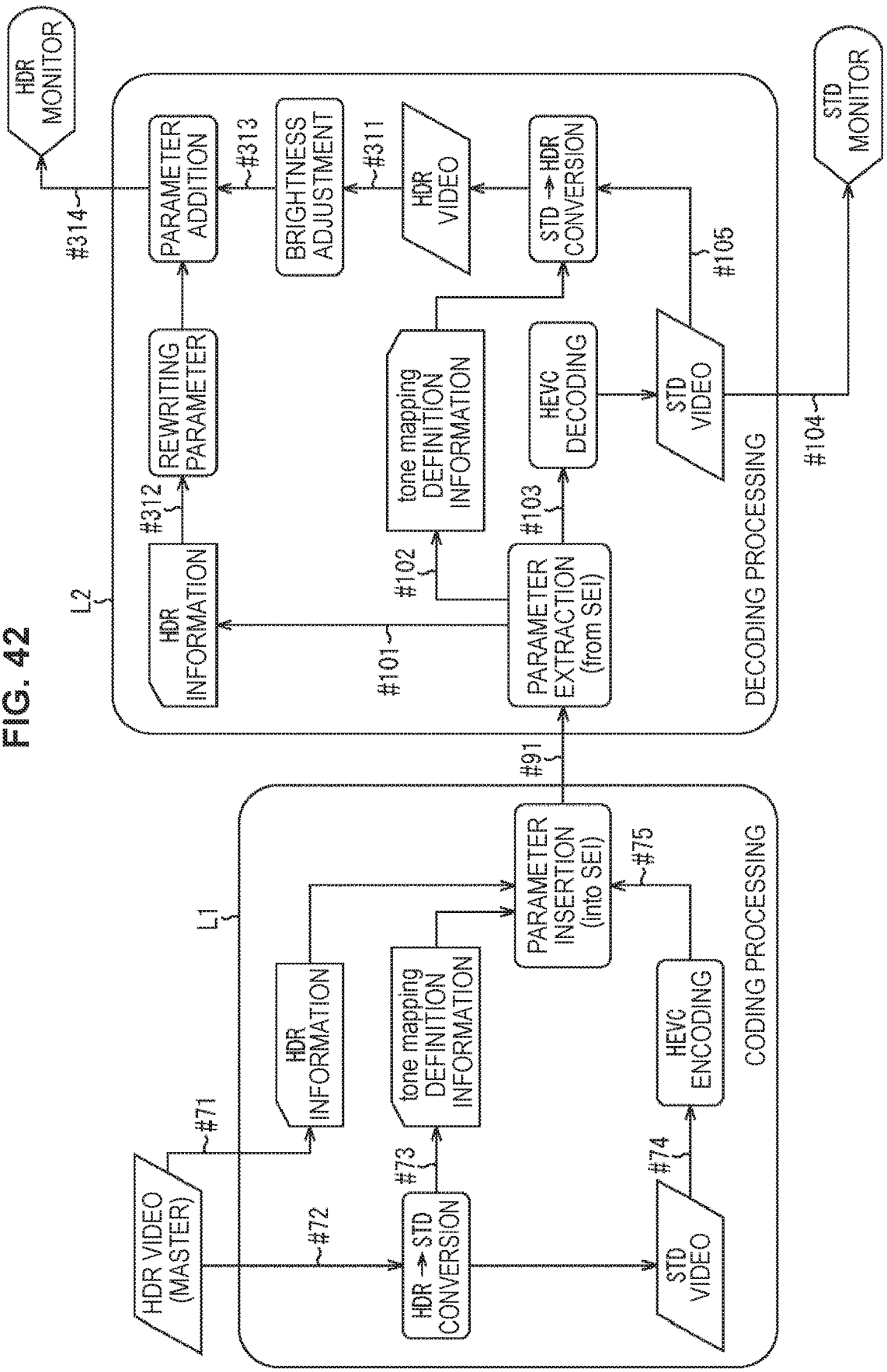
FIG. 42 is a diagram illustrating an example of signal processing in mode-ii in a case in which an adjustment of the brightness of the HDR video is performed on a reproduction device side.

FIG. 42 is a diagram illustrating an example of signal processing in mode-ii in a case in which the adjustment of the brightness of the HDR video is performed by the reproduction device 2.

Among the processing illustrated in FIG. 42, the processing performed by the recording device 1 and the processing related to the output of the STD video performed by the reproduction device 2 are the same as the processing described while referring to FIG. 4. Redundant descriptions will be appropriately omitted.

The reproduction device 2 reads out the HEVC stream from the optical disc 11 and, as illustrated at the ends of arrows #101 and #102, extracts the HDR information and the tone mapping definition information from the SEI of the HEVC stream.

Furthermore, as illustrated at the end of arrow #103, the reproduction device 2 decodes the coded data of the HEVC. As illustrated at the end of arrow #105, when the display device 3 includes an HDR monitor, the reproduction device 2 converts the STD video, which has been obtained by decoding the coded data, to an HDR video by using the tone mapping definition information for STD-HDR conversion extracted from the HEVC stream.

As illustrated al the end of arrow #311, when the display device 3 includes an HDR monitor but cannot display the HDR video as it is, the reproduction device 2 adjusts the brightness of the HDR video and as illustrated at the end of arrow #312, rewrites the HDR information.

As illustrated at the end of arrow #313, the reproduction device 2 adds the HDR information to the data of the HDR video on which the adjustment of the brightness has been performed and, as illustrated at the end of arrow #314, outputs the data to the display device 3.

As described above, when the adjustment of the brightness of the HDR video is performed by the reproduction device 2, the HDR information is rewritten so as to represent the brightness characteristic after the adjustment and is transmitted together with the data of the HDR video to the display device 3.

On the basis of the HDR information, the display device 3 recognizes that the HDR video is going to be transmitted, and the display device 3 is capable of displaying the image of the HDR video on the monitor 104 in accordance with the brightness designated by the HDR information after the rewriting.

[Configuration of Reproduction Device 2]

Figure 43:
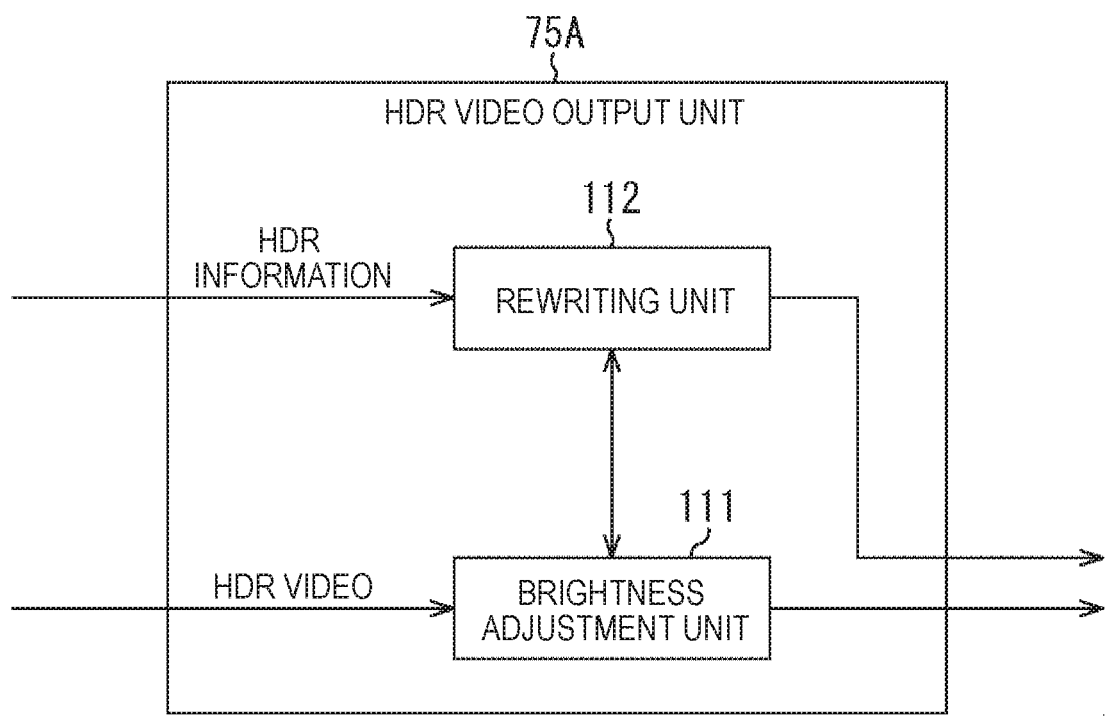
FIG. 43 is a block diagram illustrating an exemplary configuration of an HDR video output unit in FIG. 25.

FIG. 43 is a block diagram illustrating an exemplary configuration of the HDR video output unit 75A in FIG. 25.

The HDR video output unit 75A includes a brightness adjustment unit 111 and a rewriting unit 112. The HDR video supplied from the HEVC decoder 72 or the STD-HDR conversion unit 74 is input to the brightness adjustment unit 111. Furthermore, the HDR information supplied from the parameter extraction unit 71 is input to the rewriting unit 112.

The brightness adjustment unit 111 adjusts the brightness of the HDR video and outputs the HDR video on which the adjustment of the brightness has been performed.

On the basis of the result of the adjustment by the brightness adjustment unit 111, the rewriting unit 112 rewrites the HDR information so as to represent the brightness characteristic on which the adjustment has been performed. The HDR information that has been rewritten is added to the HDR video on which the adjustment of the brightness has been performed and is transmitted to the display device 3.

[Decoding Processing of Reproduction Device 2]

Herein, referring to the flowchart in FIG. 44, the decoding processing in mode-i performed in step S44 in FIG. 31 will be described. In the processing in FIG. 44, the adjustment of the brightness of the HDR video is appropriately performed.

Figure 32:
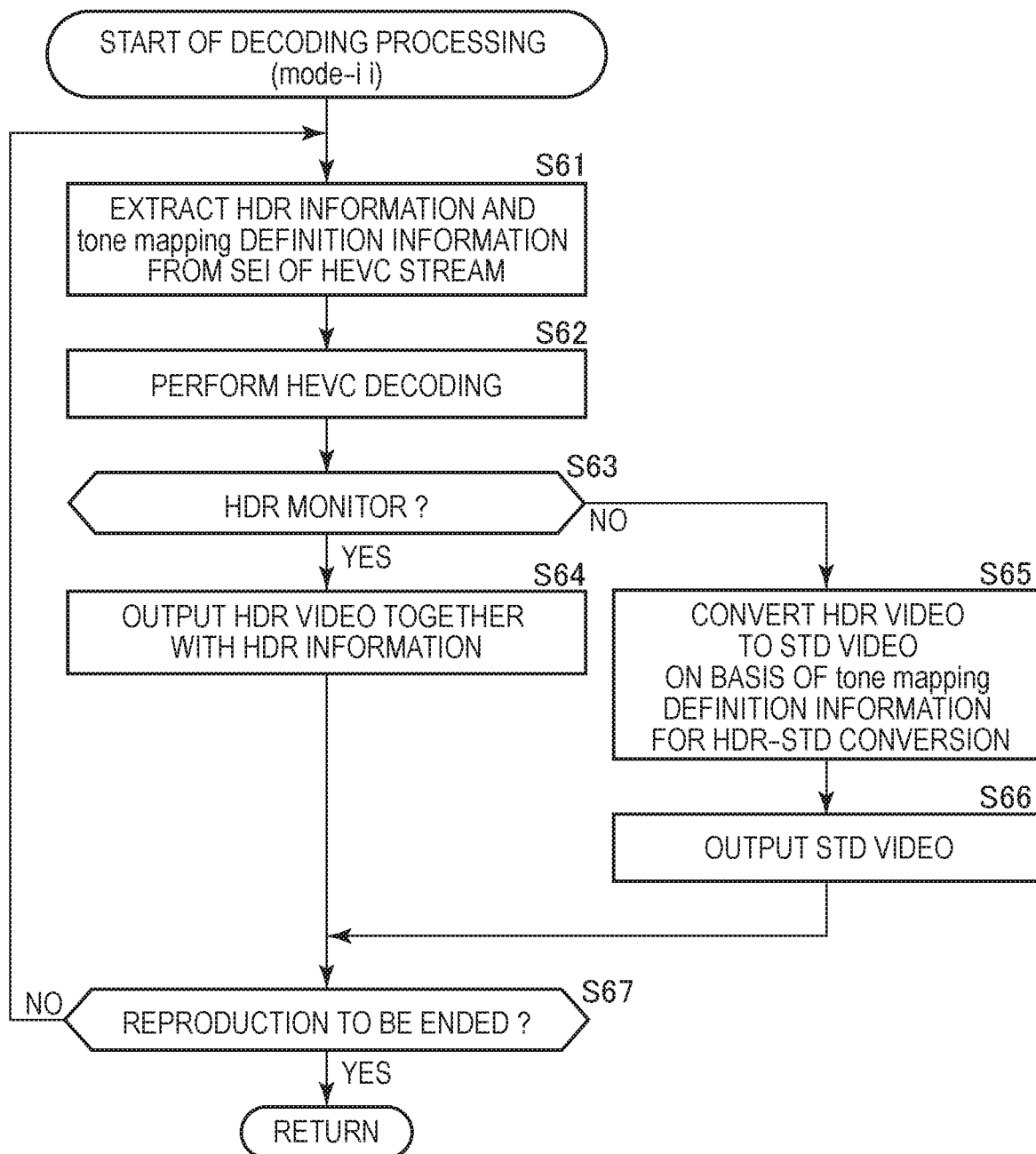
FIG. 32 is a flowchart illustrating the decoding processing in mode-i performed in step S44 in FIG. 31.
Figure 44:
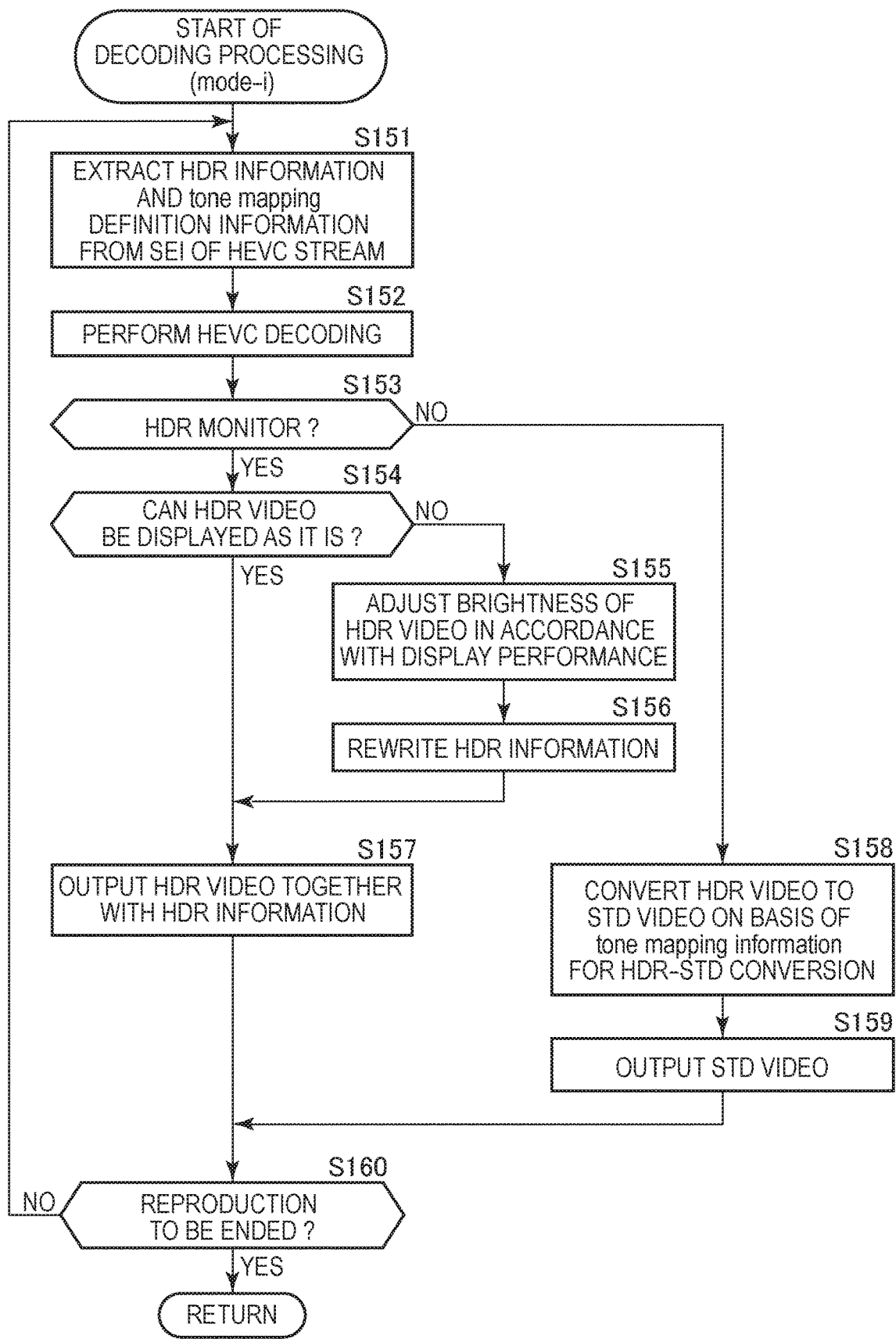
FIG. 44 is a flowchart illustrating the decoding processing in mode-i performed in step S44 in FIG. 31.

Among the processing illustrated in FIG. 44, the processing of steps S151 to S153 and S158 to S160 is the same as the processing of steps S61 to S63 and S65 to S67 of FIG. 32, respectively. Redundant descriptions will be appropriately omitted.

In step S151, the parameter extraction unit 71 of the decoding processing unit 56 extracts HDR information and tone mapping definition information from the SEI of the HEVC stream.

In step S152, the HEVC decoder 72 decodes the coded data of the HEVC and outputs the HDR video obtained by the decoding.

In step S153, the controller 51 determines whether the monitor included in the display device 3 is an HDR monitor.

When it is determined in step S153 that the monitor included in the display device 3 is an HDR monitor, in step S154, the controller 51 determines whether the HDR video can be displayed as it is on the monitor 104 of the display device 3.

When it is determined in step S154 that the HDR video cannot be displayed as it is, in step S155, the brightness adjustment unit 111 of the HDR video output unit 75A adjusts, in accordance with the display performance of the monitor 104, the brightness of the HDR video that has been decoded by the HEVC decoder 72.

In step S156, the rewriting unit 112 performs rewriting of the HDR information on the basis of the result of the adjustment of the brightness.

In step S157, the HDR video output unit 75A outputs the HDR video, on which adjustment of the brightness has been performed, together with the HDR information, which has been rewritten.

When it is determined in step S154 that the HDR video can be displayed as it is, the processing of steps S155 and S156 is skipped. In the above case, in step S157, the HDR video output unit 75A outputs the HDR video, which has been decoded by the HEVC decoder 72, together with the HDR information, which has been extracted by the parameter extraction unit 71.

Determination of whether the reproduction is to be ended is made in step S160, and when determination is made that the reproduction is to be ended, the processing is aided. Subsequently, the process returns to step S44 in FIG. 31 and the processing thereafter is performed.

Referring next to the flowchart in FIG. 45, the decoding processing in mode-ii performed in step S45 in FIG. 31 will be described. In the processing in FIG. 45, the adjustment of the brightness of the HDR video is appropriately performed.

Figure 33:
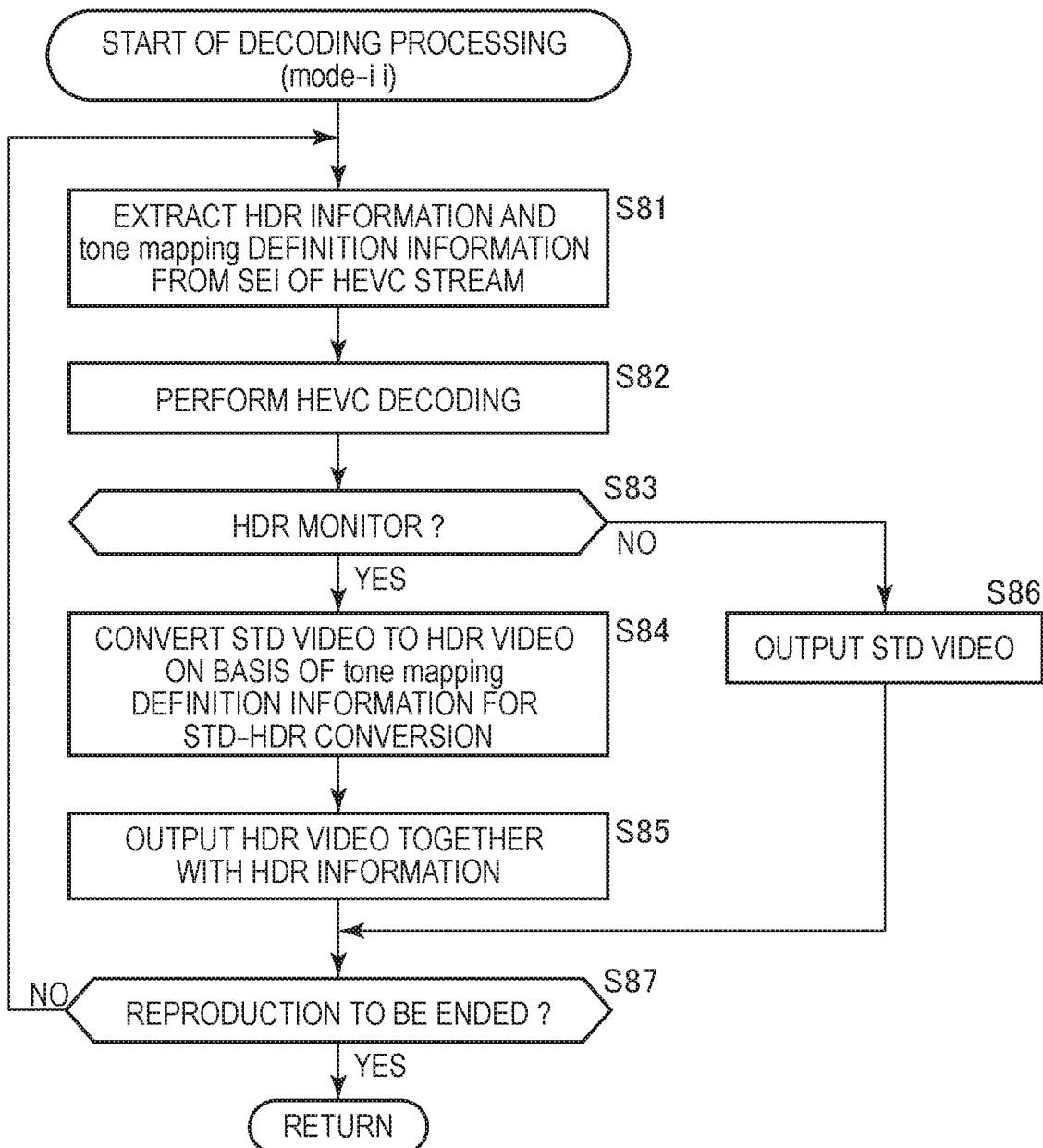
FIG. 33 is a flowchart illustrating the decoding processing in mode-ii performed in step S45 in FIG. 31.
Figure 45:
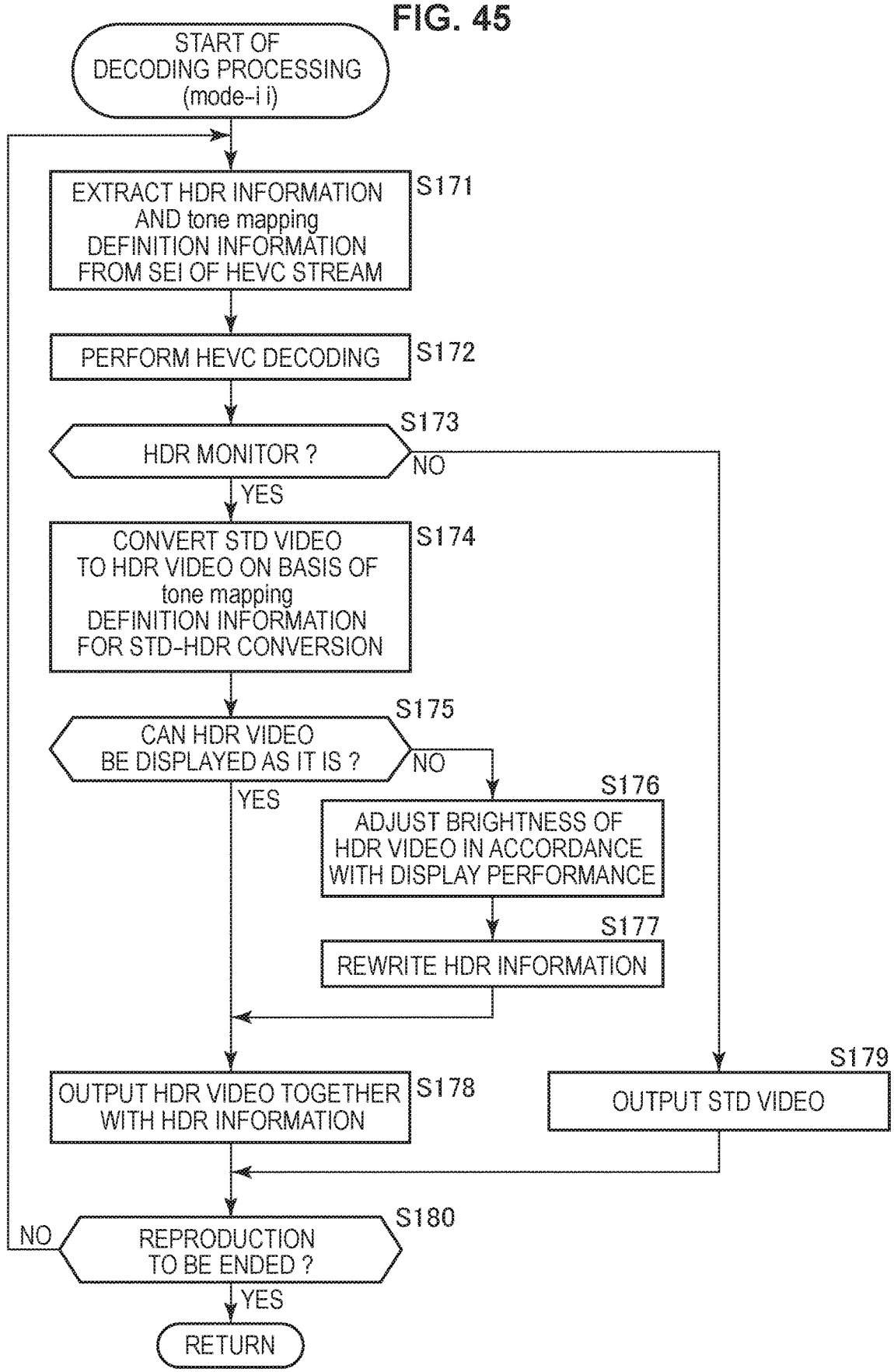
FIG. 45 is a flowchart illustrating the decoding processing in mode-ii performed in step S45 in FIG. 31.

Among the processing illustrated in FIG. 45, the processing of steps S171 to S174, S179, and S180 is the same as the processing of steps S81 to S84, S86, and S87 of FIG. 33, respectively. Redundant descriptions will be appropriately omitted.

In step S171, the parameter extraction unit 71 of the decoding processing unit 56 extracts HDR information and tone mapping definition information from the SEI of the HEVC stream.

In step S172, the HEVC decoder 72 decodes the coded data of the HEVC and outputs the STD video obtained by the decoding.

In step S173, the controller 51 determines whether the monitor included in the display device 3 is an HDR monitor.

When it is determined that the monitor included in the display device 3 is an HDR monitor in step S173, in step S174, the STD-HDR conversion unit 74 converts the decoded STD video to an HDR video on the basis of the tone mapping definition information for STD-HDR conversion.

In step S175, the controller 51 determines whether the HDR video obtained by converting the STD video can be displayed as it is on the monitor 104 of the display device 3.

When it is determined in step S175 that the HDR video cannot be displayed as it is, in step S176, the brightness adjustment unit 111 of the HDR video output unit 75A adjusts, in accordance with the display performance of the monitor 104, the brightness of the HDR video that has been obtained by converting the STD video.

In step S177, the rewriting unit 112 performs rewriting of the HDR information on the basis of the result of the adjustment of the brightness.

In step S178, the HDR video output unit 75A outputs the HDR video, on which adjustment of the brightness has been performed, together with the HDR information, which has been rewritten.

When it is determined in step S175 that the HDR video can be displayed as it is, the processing of steps S176 and S177 is skipped. In the above case, in step S178, the HDR video output unit 75A outputs the HDR video, which has been obtained by converting the STD video, together with the HDR information, which has been extracted by the parameter extraction unit 71.

Determination of whether the reproduction is to be ended is made in step S180, and when determination is made to end the reproduction, die processing is ended. Subsequently, the process returns to step S45 in FIG. 31 and the processing thereafter is performed.

[Display Processing of Display Device 3]

Referring next to the flow chart in FIG. 46, display processing of the display device 3 will be described.

Figure 46:
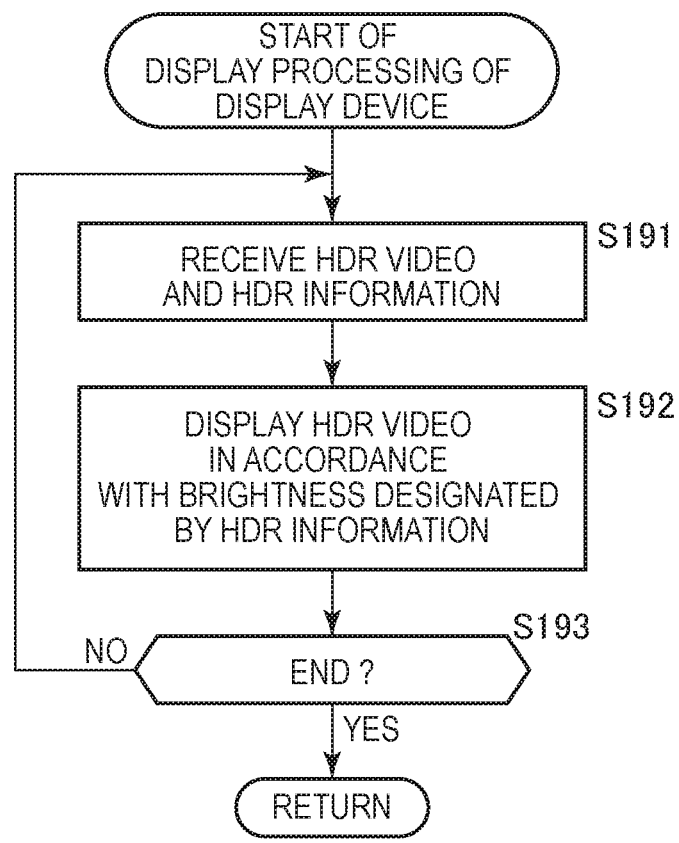
FIG. 46 is a flowchart illustrating the display processing of the display device.

The processing in FIG. 46 is performed after the processing in FIG. 44 or FIG. 45 performed by the reproduction device 2. Together with the HDR information, the original HDR video on which no adjustment of the brightness has been performed or the HDR video on which adjustment of the brightness has been performed are transmitted from the reproduction device 2 to the display device 3 including an HDR monitor.

In step S191, the HDMI communication unit 102 of the display device 3 receives the HDR video and the HDR information transmitted from the reproduction device 2.

In step S192, the signal processing unit 103 displays an image of the HDR video on the monitor 104 in accordance with the brightness designated by the HDR information.

In step S193, the controller 101 determines whether the display is to be ended and when it is determined that the display is not to be ended, processing from step S191 and after is repeated. When determination is made to end the display in step S193, the controller 101 ends the processing.

As described above, when the adjustment of the brightness is performed by the reproduction device 2, the display device 3 does not have to determine whether the HDR video that has been sent from the reproduction device 2 can be displayed as it is. Furthermore, the display device 3 itself does not have to adjust the brightness of the HDR video.

When the adjustment of the brightness of the HDR video is required, the user of the reproduction device 2 may be allowed to set whether to perform the adjustment of the brightness on the reproduction device 2 side or on the display device 3 side.

Alternatively, the display device 3 may notify the reproduction device 2 whether the adjustment of the brightness is performed on the reproduction device 2 side or on the display device 3 side, and in accordance with the notification, the processing that is performed in the reproduction device 2 may be switched. For example, when the display device 3 has a function of adjusting the brightness of the HDR video, a notification is made that the adjustment of the brightness is to be performed on the display device 3 side, and when the display device 3 has no function of adjusting the brightness of the HDR video, a notification is made that the adjustment of the brightness is to be performed on the reproduction device 2 side.

When notified from the display device 3 that the adjustment of the brightness is to be performed on the reproduction device 2 side, the reproduction device 2 performs, as the decoding processing, the processing in FIG. 44 or FIG. 45. Furthermore, when notified from the display device 3 that the adjustment of the brightness is to be performed on the display device 3 side, the reproduction device 2 performs, as the decoding processing, the processing in FIG. 32 or FIG. 33.

There are cases in which the parameters used in the adjustments are different between the adjustment of the brightness performed by the reproduction device 2 and the adjustment of the brightness performed by the display device 3. In the above case, it is considered that, from the viewpoint of image quality, it is desirable that the adjustment of the brightness is performed by the display device 3 that includes the monitor 104 and that is capable of performing adjustment that suits the characteristic of the monitor 104 in a greater manner.

By having the display device 3 select whether to perform the adjustment of the brightness on the reproduction device 2 side or on the display device 3 side, it will be possible to display the HDR video with a fine image quality. It is possible to perform the selection between performing the adjustment of the brightness on the reproduction device 2 side or on the display device 3 side on the basis of an user operation. For example, when the user instructs display of the menu screen by operating a remote control or a button provided on a body of the display device 3, the controller 101 of the display device 3 controls, for example, the signal processing unit 103 such that the menu screen including items related to the configuration of the HDR video is displayed on the monitor 104. When an item related to the configuration of the HDR video is selected, a screen used for selecting whether to perform the adjustment of the brightness on the reproduction device 2 side or on the display device 3 side is displayed, and the user will be selecting either one. By transmitting the information representing the selected content of the user to the reproduction device 2 through the HDMI cable 4, the display device 3 notifies whether to perform the adjustment of the brightness of the HDR video on the reproduction device 2 side or on the display device 3 side to the reproduction device 2.

The notification of whether to perform the adjustment of the brightness of the HDR video on the reproduction device 2 side or on the display device 3 side can be achieved by using the EDID of the HDMI.

<8. Exemplary Application to HDMI>
[HDR EDID and HDR InfoFrame]

Figure 47:
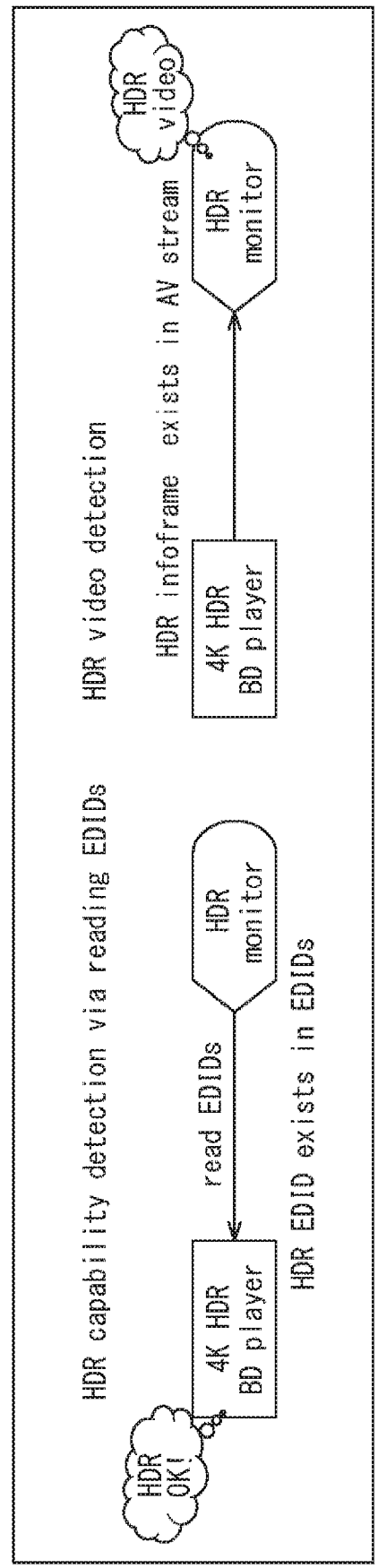
FIG. 47 is a diagram illustrating an example of a recognition on the basis of information transmitted and received through HDMI.

FIG. 47 is a diagram illustrating an example of a recognition on the basis of information transmitted and received through the HDMI.

As illustrated on the left side in FIG. 47, the reproduction device 2 that is a BD player supporting processing of an HDR video with a 4K resolution reads out the EDIDs that are stored in the memory 101A of the display device 3. A plurality of EDIDs, such as an EDID representing the performance of the monitor 104 of the display device 3, are stored in the memory 101A of the display device 3.

When an HDR EDID is included in the EDIDs read out from the display device 3, the reproduction device 2 recognizes that the display device 3 is a device including an HDR monitor and that an HDR video can be output to the display device 3. The HDR EDID includes information related to the output of the HDR video. A notification of whether to perform the adjustment of the brightness of the HDR video on the reproduction device 2 side or on the display device 3 side is performed using the HDR EDID.

As illustrated on the right side in FIG. 47, the reproduction device 2 adds HDR InfoFrame to the data of each frame of the HDR video output to the display device 3. In the HDMI standard, InfoFrame is added to each frame of the video. Information related to the specification of the video, such as information on whether the video data is of an RGB data or of an YCbCr data, information representing the aspect ratio, and the like is included in the InfoFrame of the video.

The HDR InfoFrame is an InfoFrame including the information relating to the specification of the HDR video. Transmission of the HDR information representing the brightness characteristic of the HDR video is performed using the HDR InfoFrame. The reproduction device 2 outputs the data of the HDR video, to which the HDR InfoFrame has been added, to the display device 3.

When the HDR InfoFrame is added to the video data that has been transmitted from the reproduction device 2, the display device 3 recognizes that the video data transmitted from the reproduction device 2 is data of an HDR video. Subsequently, the display device 3 displays an image of the HDR video on the HDR monitor.

Figure 48:
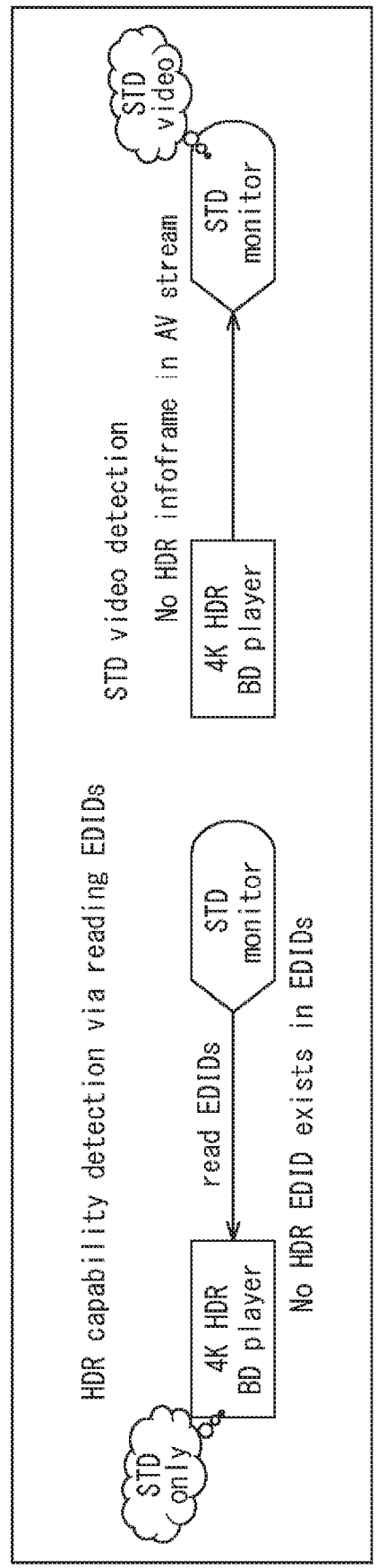
FIG. 48 is a diagram illustrating another example of the recognition on the basis of the information transmitted and received through the HDMI.

FIG. 48 is a diagram illustrating another example of a recognition on the basis of information transmitted and received through the HDMI.

As illustrated on the left side in FIG. 48, when an HDR EDID is not included in the EDIDs read out from the display device 3, the reproduction device 2 recognizes that the display device 3 is a device that does not include an HDR monitor. In such a case, the reproduction device 2 will be outputting only the data of the STD video to the display device 3. No HDR InfoFrame is added to the data of the STD video that the reproduction device 2 outputs.

On the other hand, as illustrated on the right side in FIG. 48, when no HDR InfoFrame is added to the video data that has been transmitted from the reproduction device 2, the display device 3 recognizes that the video data transmitted from the reproduction device 2 is data of an STD video. Subsequently, the display device 3 displays an image of the STD video on the STD monitor.

As described above, transmission of the HDR information from the reproduction device 2 to the display device 3 can be performed using the InfoFrame of the HDMI. Furthermore, the notification from the display device 3 to the reproduction device 2 on whether to perform the adjustment of the brightness of the HDR video on the reproduction device 2 side or on the display device 3 side can be performed using the EDID of the HDMI.

FIG. 49 is a diagram illustrating an example of the HDR EDID.

Information representing the maximum brightness of the monitor, information representing the maximum extension level, and raw/cooked flag-1 are included in the HDR EDID. The raw/cooked flag-1 represents whether to output the HDR video in a raw manner or to output the HDR video after, if needed, adjusting the brightness of the HDR video.

The value of the raw/cooked flag-1 being 1 represents that the HDR video is to be output in a raw manner, in other words, it represents that the display device 3 is requesting the HDR video to be output without performing any adjustment of the brightness on the reproduction device 2 side. When the value of the raw/cooked flag-1 is 1, even if the dynamic range of the HDR video exceeds the display performance of the monitor 104, the reproduction device 2 outputs the HDR video without performing any adjustment of the brightness.

For example, if provided with a function for adjusting the brightness of the HDR video, the display device 3 sets the value of the raw/cooked flag-1 to 1.

Furthermore, the value of the raw/cooked flag-1 being 0 represents that the display device 3 is requesting the HDR video to be output after, if required, performing adjustment of the brightness of the HDR video on the reproduction device 2 side. When the value of the raw/cooked flag-1 is 0 and when the dynamic range of the HDR video exceeds the display performance of the monitor 104, the reproduction device 2 adjusts the brightness of the HDR video in accordance with the display performance of the monitor 104 and outputs the HDR video on which the adjustment has been performed.

For example, if not provided with any function for adjusting the brightness of the HDR video, the display device 3 sets the value of the raw/cooked flag-1 to 0.

The decoding processing in FIG. 32 or FIG. 33, in which the adjustment of the brightness is not performed on the reproduction device 2 side but is performed on the display device 3 side, corresponds to the processing in which the value of the raw/cooked flag-1 is 1. Furthermore, the decoding processing in FIG. 44 or FIG. 45, in which the adjustment of the brightness is performed on the reproduction device 2 side, corresponds to the processing in which the value of the raw/cooked flag-1 is 0.

Hereinafter, as appropriate, the output in which the reproduction device 2 outputs the HDR video in a raw manner is referred to as a raw output. Furthermore, the output after the reproduction device 2 has, if required, performed adjustment of the brightness of the HDR video is referred to as a cooked output.

FIG. 50 is a diagram illustrating an example of the HDR InfoFrame.

The HDR InfoFrame includes ref_screen_luminance_white, extended_range_white_level, nominal_black_level_code_value, nominal_white_level_code_value, extended_white_level_code_value and raw/cooked flag-2 that are parameters of the HDR information.

Furthermore, the HDR InfoFrame includes raw/cooked flag-2, as well. The raw/cooked flag-2 represents whether the HDR video that is output is a raw HDR video on which no adjustment of the brightness has been performed or is an HDR video on which the adjustment of the brightness has been performed.

The value of the raw/cooked flag-2 being 1 represents that the HDR video that is output is a raw HDR video on which no adjustment of the brightness has been performed on the reproduction device 2 side. For example, when the value of the raw/cooked flag-1 included in the HDR EDID is 1, the reproduction device 2 adds the HDR InfoFrame in which the value of the raw/cooked flag-2 is set to 1 to the data of the HDR video and outputs the data of the HDR video.

Furthermore, the value of the raw/cooked flag-2 being 0 represents that the HDR video that is output is an HDR video on which the adjustment of the brightness has been performed. For example, when the value of the raw/cooked flag-1 included in the HDR EDID is 0 and the dynamic range of the HDR video exceeds the display performance of the monitor 104, the reproduction device 2 performs adjustment of the brightness and sets the value of the raw/cooked flag-2 to 0. The reproduction device 2 adds the HDR InfoFrame in which the value of the raw/cooked flag-2 is set to 0 to the data of the HDR video on which adjustment of the brightness has been performed and outputs the data of the HDR video.

In the decoding processing in FIG. 32 or FIG. 33 in which the adjustment of the brightness is not performed on the reproduction device 2 side, the value of the raw/cooked flag-2 of the HDR InfoFrame is set to 1. Furthermore, in the decoding processing in FIG. 44 or FIG. 45 in which the adjustment of the brightness is, in some cases, performed on the reproduction device 2 side, the value of the raw/cooked flag-2 of the HDR InfoFrame may, in some cases, be set to 0.

[Processing of Reproduction Device 2 and Display Device 3]

Herein, processing of the reproduction device 2 and the display device 3 in which the HDR EDID and the HDR InfoFrame are used will be described.

Figure 51:
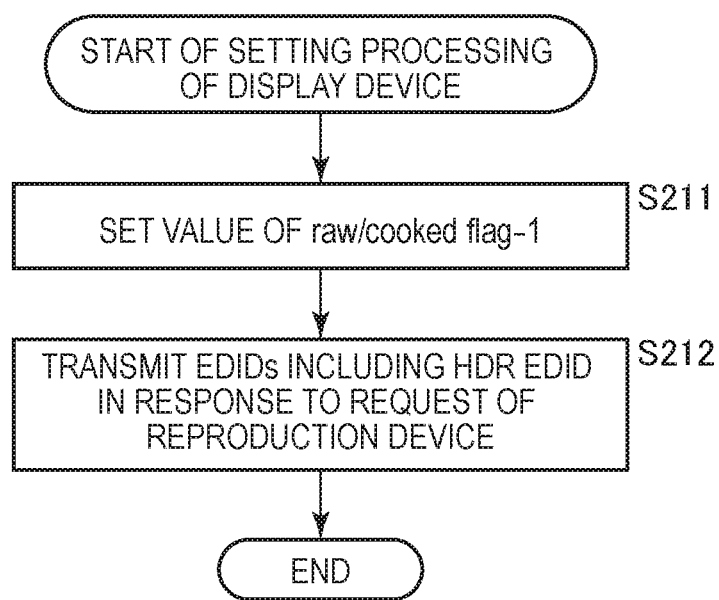
FIG. 51 is a flowchart illustrating setting processing of the HDR EDID of the display device.

Referring first to the flow chart in FIG. 51, processing of the display device 3 that sets the HDR EDID will be described.

In step S211, the controller 101 of the display device 3 sets the value of the raw/cooked flag-1 to 1 or 0, and stores, in the memory 101A, the HDR EDID that includes the information representing the maximum brightness of the monitor, the information representing the maximum extension level, and the raw/cooked flag-1.

In step S212, in accordance with the request from the reproduction device 2, the HDMI communication unit 102 reads out a plurality of EDIDs including the HDR EDID from the memory 101A and transmits the plurality of EDIDs to the reproduction device 2.

Figure 52:
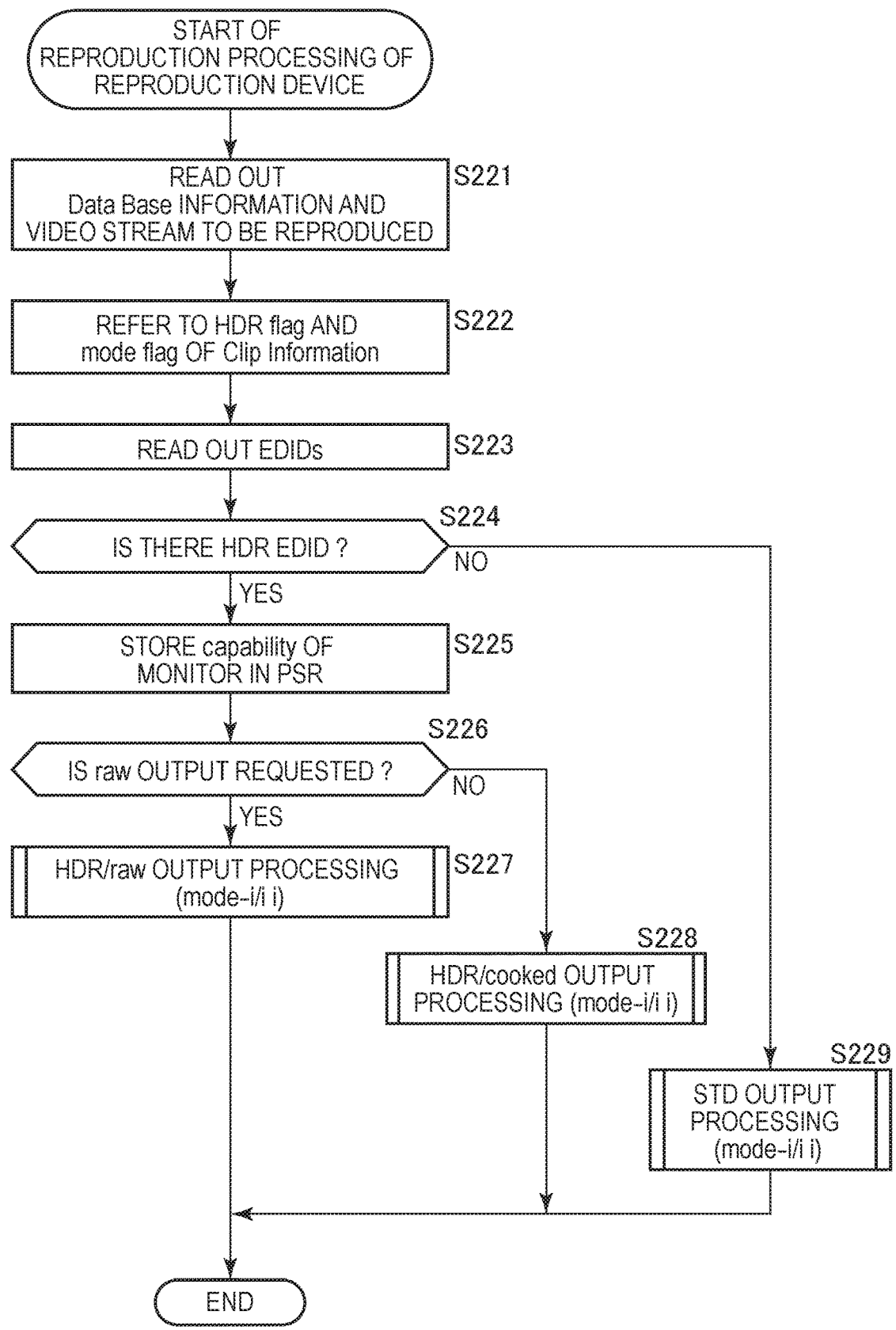
FIG. 52 is a flowchart illustrating the reproduction processing of the reproduction device.

Referring next to the flowchart in FIG. 52, the reproduction processing of the reproduction device 2 will be described next. For example, the processing in FIG. 52 is started after the processing in FIG. 51 has been performed in the display device 3.

In step S221, the controller 51 controls the disc drive 52 and reads out the PlayList and the Clip Information that are Data Base information from the optical disc 11. Furthermore, on the basis of the information included in the PlayList, the controller 51 specifies the HEVC stream to be reproduced and controls the disc drive 52 to read out the AV stream including the specified HEVC stream from the optical disc 11.

In step S222, the controller 51 refers to the HDR_flag and the mode_flag included in the Clip Information. In the present example, the HDR_flag is set with a value that represents that recording of the HDR video as a master is being performed.

In step S223, the controller 51 controls the HDMI communication unit 58 and reads out the EDIDs from the display device 3. A request to read out the EDIDs is made to the HDMI communication unit 102 of the reproduction device 2 from the HDMI communication unit 58, and the plurality of EDIDs that have been transmitted in response to the request are acquired by the HDMI communication unit 58.

In step S224, the controller 51 determines whether an HDR EDID is included in the EDIDs that have been read out from the display device 3.

When it is determined in step S224 that an HDR EDID is included, the controller 51 recognizes that an HDR video can be output to the display device 3 and in step S225, stores the information representing the display performance of the monitor 104 in the register 53A. For example, the controller 51 stores, in the PSR25, information representing the maximum brightness of the monitor and the information representing the maximum extension level that are included in the HDR EDID and that serve as information representing the brightness specification of the monitor. Furthermore, the controller 51 sets a value representing that the monitor 104 is capable of displaying an HDR video in the HDR_display_capability_flag of the PSR25.

In step S226, the controller 51 determines whether a raw output is requested from the display device 3 on the basis of the raw/cooked flag-1 included in the HDR EDID. In the case of the example described above, when the value of the raw/cooked flag-1 is 1, the controller 51 determines that a raw output is requested, and when 0, determines that a cooked output is requested.

When it is determined in step S226 that the raw output is requested, in step S227, the controller 51 performs HDR/raw output processing that is processing that performs a raw output of the HDR video.

When it is determined in step S226 that the raw output is not requested, in step S228, the controller 51 performs HDR/cooked output processing that is processing that performs a cooked output of the HDR video.

On the other hand, when it is determined in step S224 that the HDR EDID is not included, in step S229, the controller 51 performs STD output processing that is processing that performs output of an STD video. The output destination of the STD video with the STD output processing will be a display device that is different from the display device 3 and that does not include an HDR monitor.

After the video data is output in step S227, S228, or S229, the process is ended.

Figure 53:
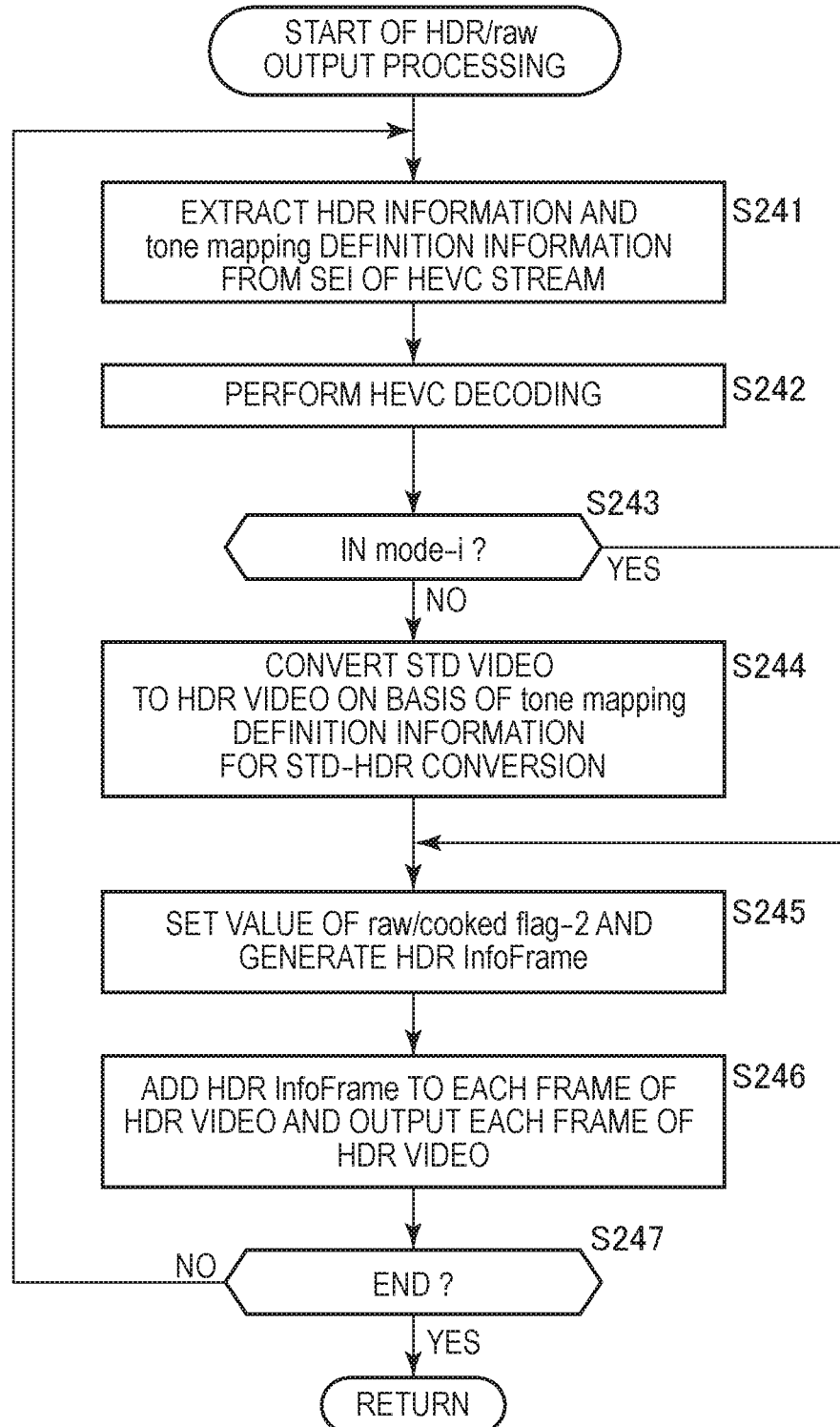
FIG. 53 is a flowchart illustrating HDR/raw output processing performed in step S227 in FIG. 52.

Referring next to the flowchart in FIG. 53, the HDR/raw output processing performed in step S227 in FIG. 52 will be described.

In step S241, the parameter extraction unit 71 of the decoding processing unit 56 extracts HDR information and tone mapping definition information from the SEI of the HEVC stream. The parameter extraction unit 71 outputs the coded data of the HEVC included in the HEVC stream to the HEVC decoder 72.

In step S242, the HEVC decoder 72 decodes the coded data of the HEVC. When the recording mode is mode-i, the data of the HDR video obtained by decoding the coded data is supplied to the HDR video output unit 75A. Furthermore, when the recording mode is mode-ii, the data of the STD video obtained by decoding the coded data is supplied to the STD-HDR conversion unit 74.

In step S243, the controller 51 determines whether the recording mode is mode-i on the basis of the value of the mode_flag.

When it is determined that the recording mode is mode-ii in step S243, in step S244, the STD-HDR conversion unit 74 converts the STD video supplied from the HEVC decoder 72 to an HDR video on the basis of the tone mapping definition information for STD-HDR conversion supplied from the parameter extraction unit 71. When it is determined in step S243 that the recording mode is mode-i, the processing of step S244 is skipped.

In step S245, the HDR video output unit 75A sets the raw/cooked flag-2 to a value of 1 that represents that the HDR video is a raw HDR video in which no adjustment of the brightness has been performed. Furthermore, the HDR video output unit 75A generates an HDR InfoFrame that includes each parameter of the HDR information, which has been extracted by the parameter extraction unit 71, and the raw/cooked flag-2.

In step S246, the HDR video output unit 75A adds the HDR InfoFrame to the data of each frame of the HDR video and outputs the data to the display device 3.

In step S247, the controller 51 determines whether the reproduction is to be ended and when it is determined that the reproduction is not to be ended the process returns to step S241 and the above processing is executed repeatedly. When it is determined in step S247 that the reproduction is to be ended, the process returns to step S227 in FIG. 52 and the processing thereafter is performed.

Figure 54:
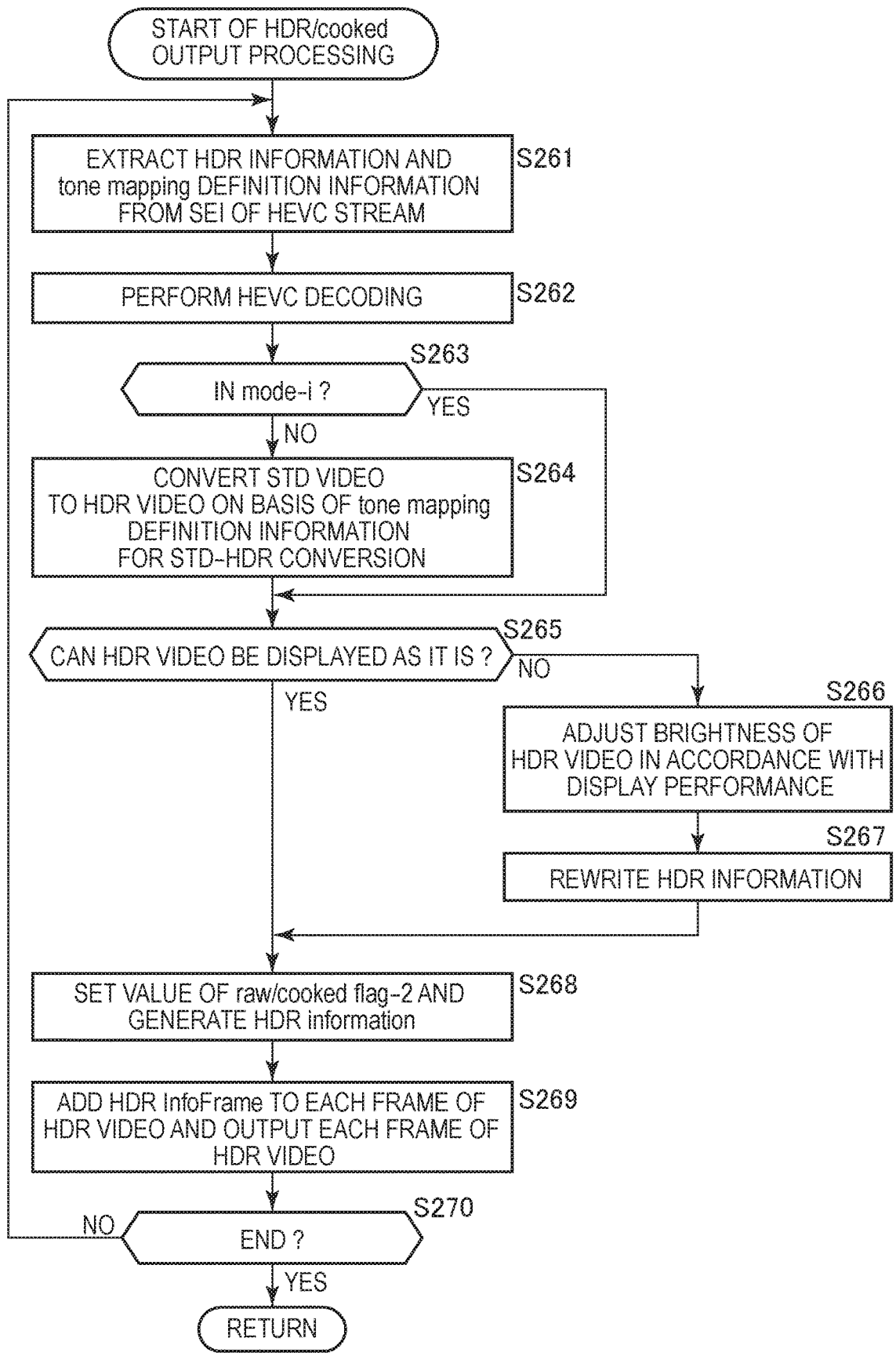
FIG. 54 is a flowchart illustrating HDR/cooked output processing performed in step S228 in FIG. 52.

Referring next to the flowchart in FIG. 54, the HDR/cooked output processing performed in step S228 in FIG. 52 will be described.

In step S261, the parameter extraction unit 71 of the decoding processing unit 56 extracts HDR information and tone mapping definition information from the SEI of the HEVC stream. The parameter extraction unit 71 outputs the coded data of the HEVC included in the HEVC stream to the HEVC decoder 72.

In step S262, the HEVC decoder 72 decodes the coded data of the HEVC. When the recording mode is mode-i, the data of the HDR video obtained by decoding the coded data is supplied to the HDR video output unit 75A. Furthermore, when the recording mode is mode-ii, the data of the STD video obtained by decoding the coded data is supplied to the STD-HDR conversion unit 74.

In step S263, the controller 51 determines whether the recording mode is mode-i on the basis of the value of the mode_flag.

When it is determined that the recording mode is mode-ii in step S263, in step S264, the STD-HDR conversion unit 74 converts the STD video supplied from the HEVC decoder 72 to an HDR video on the basis of the tone mapping definition information for STD-HDR conversion supplied from the parameter extraction unit 71. When it is determined in step S263 that the recording mode is mode-i, the processing of step S264 is skipped.

In step S265, the controller 51 compares the brightness characteristic of the HDR video represented by the HDR information and the performance of the monitor 104 represented by the information included in the HDR EDID with each other and determines whether the HDR video can be displayed on the monitor 104 as it is.

When it is determined in step S265 that the HDR video cannot be displayed as it is, in step S266, the brightness adjustment unit 111 of the HDR video output unit 75A adjusts the brightness of the HDR video in accordance with the display performance of the monitor 104.

In step S267, the rewriting unit 112 performs rewriting of the HDR information on the basis of the result of the adjustment of the brightness. When it is determined in step S265 that the HDR video can be displayed as it is, the processing of steps S266 and S267 is skipped.

In step S268, the HDR video output unit 75A sets a predetermined value to the raw/cooked flag-2 and generates an HDR InfoFrame including each parameter of the HDR information.

For example, when the brightness of the HDR video is not adjusted, the HDR video output unit 75A sets the value to 1 that represents the above to the raw/cooked flag-2 and generates the HDR InfoFrame including the raw/cooked flag-2 and each parameter of the HDR information that has been extracted by the parameter extraction unit 71.

On the other hand, when the brightness of the HDR video is adjusted, the HDR video output unit 75A sets the value to 0 that represents the above to the raw/cooked flag-2 and generates the HDR InfoFrame including the raw/cooked flag-2 and each parameter of the HDR information on which rewriting has been performed.

In step S269, the HDR video output unit 75A adds the HDR InfoFrame to the data of each frame of the HDR video and outputs the data to the display device 3.

In step S270, the controller 51 determines whether the reproduction is to be ended and when it is determined that the reproduction is not to be ended, the process returns to step S261 and the above processing is executed repeatedly. When it is determined in step S270 that the reproduction is to be ended, the process returns to step S228 in FIG. 52 and the processing thereafter is performed.

Figure 55:
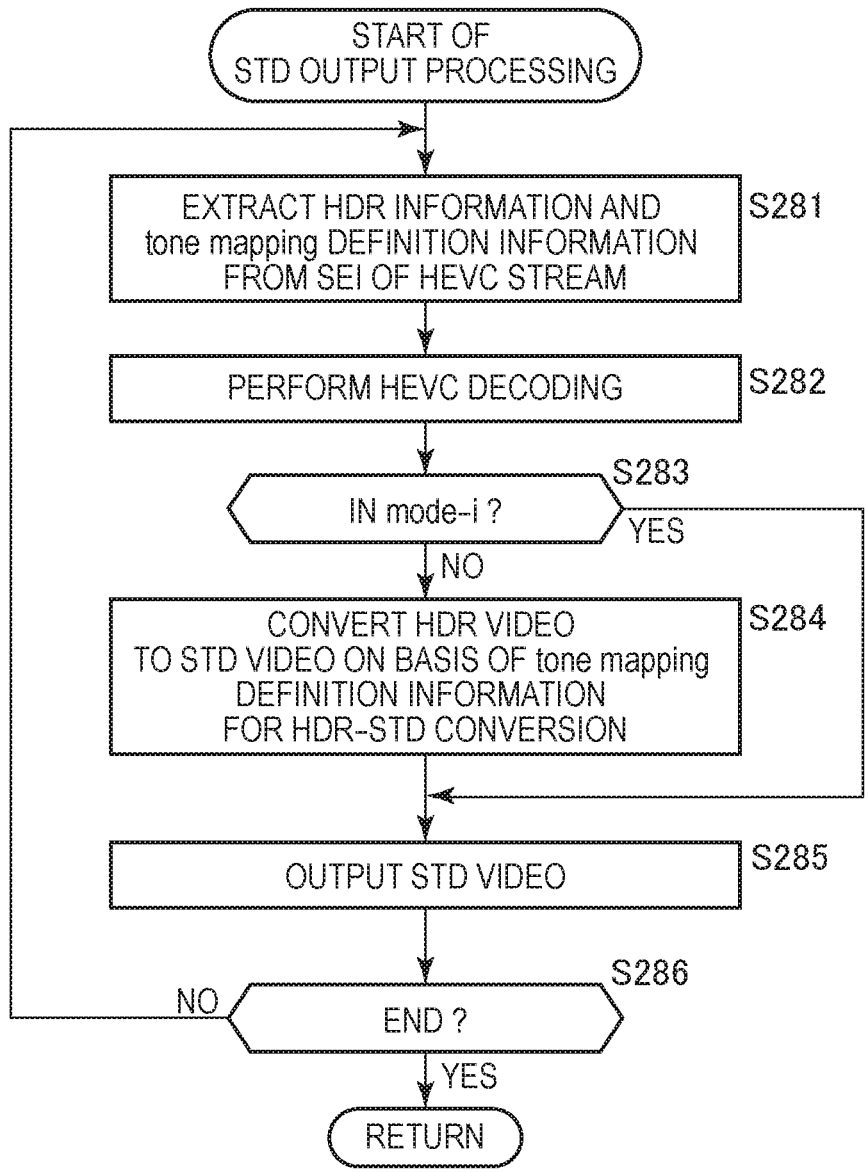
FIG. 55 is a flowchart illustrating STD output processing performed in step S229 in FIG. 52.

Referring next to the flowchart in FIG. 55, the STD output processing performed in step S229 in FIG. 52 will be described.

As described above, the processing in FIG. 55 is processing in which the video data is output to the display device that is different from the display device 3 and that does not include an HDR monitor.

In step S281, the parameter extraction unit 71 of the decoding processing unit 56 extracts HDR information and tone mapping definition information from the SEI of the HEVC stream. The parameter extraction unit 71 outputs the coded data of the HEVC included in the HEVC stream to the HEVC decoder 72.

In step S282, the HEVC decoder 72 decodes the coded data of the HEVC. When the recording mode is mode-i, the data of the HDR video obtained by decoding the coded data is supplied to the HDR-STD conversion unit 73. Furthermore, when the recording mode is mode-ii, the data of the STD video obtained by decoding the coded data is supplied to the STD video output unit 75B.

In step S283, the controller 51 determines whether the recording mode is mode-i on the basis of the value of the mode_flag.

When it is determined that the recording mode is mode-i in step S283, in step S284, the HDR-STD conversion unit 73 converts the HDR video supplied from the HEVC decoder 72 to an STD video on the basis of the tone mapping definition information for HDR-STD conversion supplied from the parameter extraction unit 71. When it is determined in step S283 that the recording mode is mode-ii, the processing of step S284 is skipped.

In step S285, the STD video output unit 75B outputs the STD video supplied from the HEVC decoder 72 or the STD video supplied from the HDR-STD conversion unit 73.

In step S286, the controller 51 determines whether the reproduction is to be ended and when it is determined that the reproduction is not to be ended, the process returns to step S281 and the above processing is executed repeatedly. When it is determined in step S286 that the reproduction is to be ended, the process returns to step S229 in FIG. 52 and the processing thereafter is performed.

Figure 56:
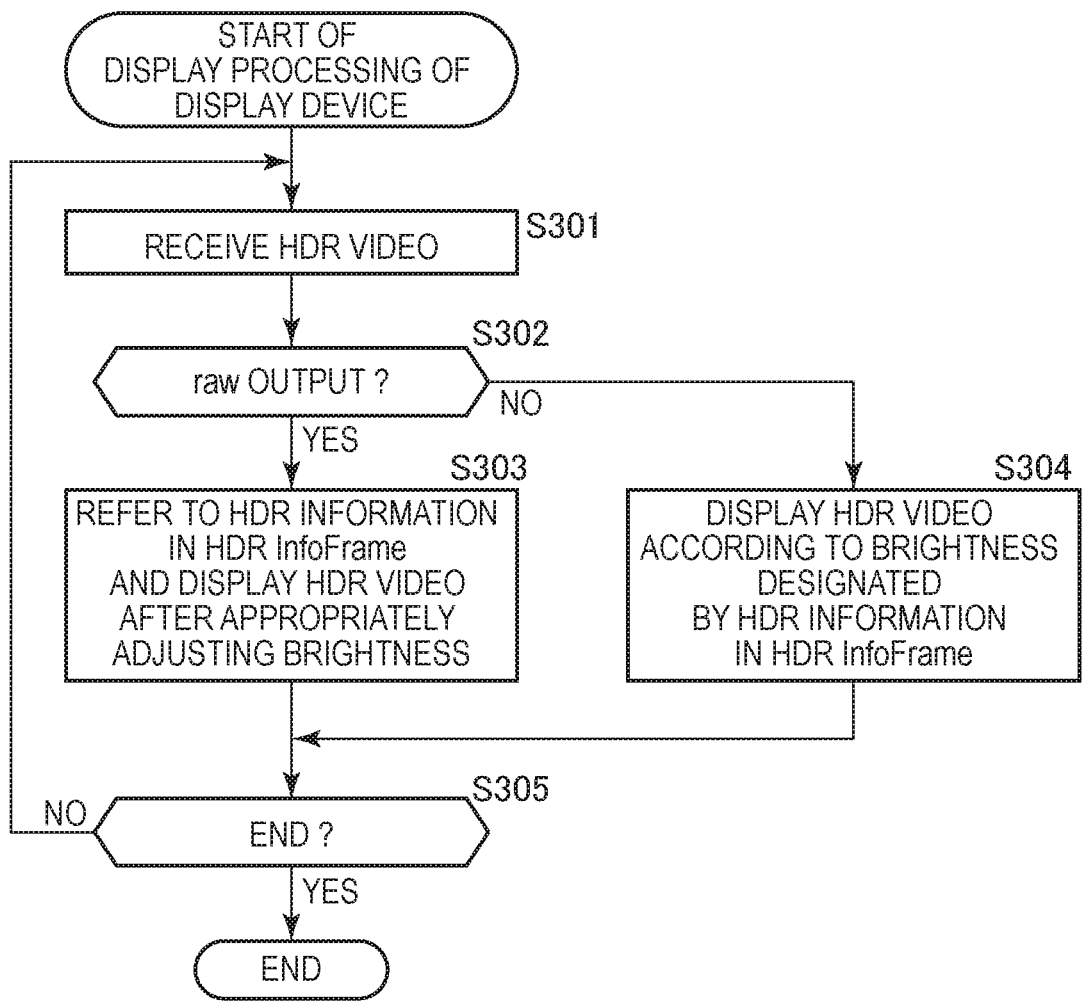
FIG. 56 is a flowchart illustrating the display processing of the display device.

Referring next to the flowchart in FIG. 56, display processing of the display device 3 will be described.

HDR InfoFrame is added to the video data transmitted by the reproduction device 2 to the display device 3 including an HDR monitor. On the basis of the HDR InfoFrame, the controller 101 of the display device 3 recognizes that the video data transmitted from the reproduction device 2 is data of an HDR video.

In step S301, the HDMI communication unit 102 of the display device 3 receives the data of the HDR video transmitted from the reproduction device 2. HDR InfoFrame is added to the data of each frame of the HDR video.

In step S302, on the basis of the raw/cooked flag-2 included in the HDR InfoFrame, the controller 101 determines whether the data of the HDR video is data on which raw output has been performed.

When 1 is set as the value of the raw/cooked flag-2, the controller 101 determines that the data of the HDR video is data on which raw output has been performed. Furthermore, when 0 is set as the value of the raw/cooked flag-2, the controller 101 determines that the data of the HDR video is data on which cooked output has been performed.

When it is determined in step S302 that the data of the HDR video is data on which raw output has been performed, in step S303, the signal processing unit 103 refers to the HDR information included in the HDR InfoFrame. When the dynamic range of the HDR video exceeds the display performance of the monitor 104, the signal processing unit 103 adjusts the brightness of the HDR video as appropriate and displays, on the monitor 104, the image of the HDR video on which adjustment has been performed.

On the other hand, when it is determined in step S302 that the data of the HDR video is data on which cooked output has been performed, in step S304, the signal processing unit 103 displays the image of the HDR video on the monitor 104 in accordance with the HDR information included in the InfoFrame.

After the image of the HDR video has been displayed in step S303 or in step S304, in step S305, the controller 101 determines whether the display of the HDR video is to be ended and when it is determined not to end the display, processing from step S301 and after is repeated. When determination is made to end the display in step S305, the controller 101 ends the processing.

With the above-described sequential processing, the reproduction device 2 is capable of transmitting HDR information to the display device 3 by using the InfoFrame of the HDMI. Furthermore, by using the EDID of the HDMI, the display device 3 is capable of requesting on which side, that is, the reproduction device 2 side or the display device 3 side, the adjustment of the brightness of the HDR video is to be performed.

<9. Other Modifications>

Although the HDR information is added when transmitting the data of the HDR video from the reproduction device 2 to the display device 3, transmission may be performed without the addition of the HDR information.

Furthermore, a description has been given mainly of a case in which the reproduction device 2 is a BD player; however, a portable terminal may be equipped with the functions described above included in the reproduction device 2. In such a case, the portable terminal will be having the role as the reproduction device 2.

Furthermore, while the content that the reproduction device 2 reproduces is content that is recorded in a removable media, the above-described technology is applicable to a case in which the content distributed through a network is reproduced. In such a case, the reproduction device 2 receives content that has been transmitted from a server that is connected to a network such as the Internet and reproduces the content such that an HDR video is output to the display device 3.

[Exemplary Configuration of the Computer]

The sequential processing described above may be implemented by hardware or may be implemented by software. When implementing the sequential processing by software, a program constituting the software is installed from a program recording medium to a computer built into a dedicated hardware, a general-use personal computer, or the like.

Figure 57:
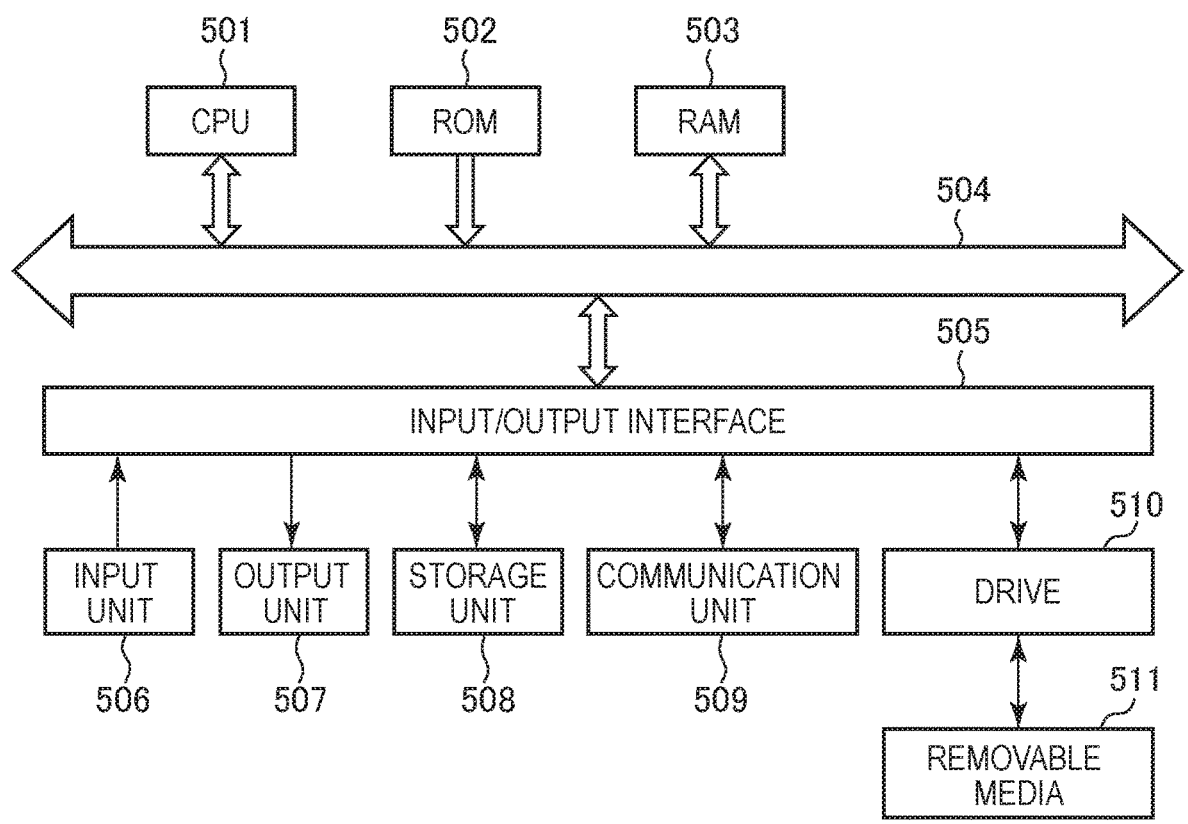
FIG. 57 is a block diagram illustrating an exemplary configuration of a computer.

FIG. 57 is a block diagram illustrating an exemplary hardware configuration of a computer that executes the sequential processing described above with a program.

A CPU 501, a ROM 502, and a RAM 503 are interconnected with a bus 504.

Furthermore, an input/output interface 505 is connected to the bus 504. An input unit 506 including a keyboard and a mouse and an output unit 507 including a loudspeaker are connected to the input/output interface 505. Furthermore, a storage unit 508 including a hard disk or a nonvolatile memory, a communication unit 509 including a network interface, and a drive 510 that drives the removable media 511 are connected to the input/output interface 505.

In the computer configured in the above manner, the sequential processing described above is performed by, for example, the CPU 501 loading the program stored in the storage unit 508 onto the RAM 503 through the input/output interface 505 and the bus 504 and executing the program.

The program executed by the CPU 501 is provided by recording the program in a removable media 511 for example, or through a wired or wireless transmission medium, such as a local area network, the Internet, digital broadcast, or the like, and is installed in the storage unit 508.

Note that the program executed by the computer may be a program in which the processing is performed in time sequence in the order described in the present description or may be program in which the processing is performed in a parallel manner or at a required timing such as when called.

The embodiment of the present technology is not limited to the above-described embodiment and various modifications can be made without departing from the scope of the present technology.

Note that in the present description, a system refers to an assembly of a plurality of components (a device, a module (parts), and the like) regardless of whether all of the components are in the same housing or not. Accordingly, a plurality of devices that are housed in different housings and that are connected to each other through a network, and a single device in which a plurality of modules are housed in a single housing are both a system.

[Exemplary Combination of Configurations]

The present technology can be configured in the following manner as well.

(1)

A reproduction device, including:

a readout unit configured to read out, from a recording medium that has recorded coded data of an extended video that is a video having a second brightness range that is wider than a first brightness range, brightness characteristic information that represents a brightness characteristic of the extended video, and brightness conversion definition information used when performing a brightness conversion of the extended video to a standard video that is a video having the first brightness range, the coded data, the brightness characteristic information, and the brightness conversion definition information;

a decoding unit configured to decode the coded data;

a conversion unit configured to convert the extended video obtained by decoding the coded data to the standard video on a basis of the brightness conversion definition information; and an output unit configured to output data of the extended video and the brightness characteristic information to a display device that is capable of displaying the extended video and configured to output data of the standard video to a display device that is not capable of displaying the extended video.

(2)

The reproduction device according to (1), wherein the brightness characteristic information and the brightness conversion definition information are inserted, as auxiliary information of the coded data, in a stream including the coded data and are recorded in the recording medium.

(3)

The reproduction device according to (2), wherein the coded data is coded data of an HEVC, and the brightness characteristic information and the brightness conversion definition information are each an SEI of an HEVC stream.

(4)

The reproduction device according to (3), wherein the brightness conversion definition information is first Tone mapping information in which either one of values 0, 2, and 3 is set as a value of a tone_map_model_id, and wherein the brightness characteristic information is second Tone mapping information in which 4 is set as the value of the tone_map_model_id.

(5)

The reproduction device according to (4), wherein the tone_map_model_id of the first Tone mapping information and the tone_map_model_id of the second Tone mapping information are each set with a same value representing a recording mode of the recording medium.

(6)

The reproduction device according to any of (1) to (5), wherein information related to reproduction of the coded data, the information including a flag representing whether a recording of the extended video as a master is being performed, is further recorded in the recording medium, and wherein when the flag represents that the recording of the extended video as the master is being performed, the decoding unit decodes the coded data.

(7)

The reproduction device according to (6), wherein the recording medium is a Blu-ray Disc, and wherein the flag is included in a Clip Information file serving as the information related to the reproduction.

(8)

The reproduction device according to (6), wherein the recording medium is a Blu-ray Disc, and wherein the flag is included in a PlayList file serving as the information related to the reproduction.

(9)

A reproduction method including:

a step of reading out, from a recording medium that has recorded coded data of an extended video that is a video having a second brightness range that is wider than a first brightness range, brightness characteristic information that represents a brightness characteristic of the extended video, and brightness conversion definition information used when performing a brightness conversion of the extended video to a standard video that is a video having the first brightness range, the coded data, the brightness characteristic information, and the brightness conversion definition information;

a step of decoding the coded data;

a step of converting the extended video obtained by decoding the coded data to the standard video on a basis of the brightness conversion definition information;

a step of outputting data of the extended video and the brightness characteristic information to a display device that is capable of displaying the extended video; and a step of outputting data of the standard video to a display device that is not capable of displaying the extended video.

(10)

A recording medium, wherein coded data of an extended video that is a video having a second brightness range that is wider than a first brightness range, brightness characteristic information that represents a brightness characteristic of the extended video, and brightness conversion definition information used when performing a brightness conversion of the extended video to a standard video that is a video having the first brightness range are recorded, and wherein a reproduction device that reproduces the recording medium executes processing of reading out the coded data, the brightness characteristic information, and the brightness conversion definition information from the recording medium, decoding the coded data, converting the extended video obtained by decoding the coded data to the standard video on a basis of the brightness conversion definition information, outputting data of the extended video and the brightness characteristic information to a display device that is capable of displaying the extended video, and outputting data of the standard video to a display device that is not capable of displaying the extended video.

(11)

A reproduction device, including:

a readout unit configured to read out, from a recording medium that has recorded coded data of a standard video that is obtained by performing a brightness conversion of an extended video that is a video having a second brightness range that is wider than a first brightness range, the standard video being a video having the first brightness range, brightness characteristic information that represents a brightness characteristic of the extended video, and brightness conversion definition information used when performing the brightness conversion of the standard video to the extended video, the coded data, the brightness characteristic information, and the brightness conversion definition information;

a decoding unit configured to decode the coded data;

a conversion unit configured to convert the standard video obtained by decoding the coded data to the extended video on a basis of the brightness conversion definition information; and an output unit configured to output data of the extended video and the brightness characteristic information to a display device that is capable of displaying the extended video and configured to output data of the standard video to a display device that is not capable of displaying the extended video.

(12)

The reproduction device according to (11), wherein the brightness characteristic information and the brightness conversion definition information are inserted, as auxiliary information of the coded data, in a stream including the coded data and are recorded in the recording medium.

(13)

The reproduction device according to (12), wherein the coded data is coded data of an HEVC, and the brightness characteristic information and the brightness conversion definition information are each an SEI of an HEVC stream.

(14)

The reproduction device according to (13), wherein the brightness conversion definition information is first Tone mapping information in which either one of values 0, 2, and 3 is set as a value of a tone_map_model_id, and wherein the brightness characteristic information is second Tone mapping information in which 4 is set as the value of the tone_map_model_id.

(15)

The reproduction device according to (14), wherein the tone_map_model_id of the first Tone mapping information and the tone_map_model_id of the second Tone mapping information are each set with a same value representing a recording mode of the recording medium.

(16)

The reproduction device according to any of (11) to (15), wherein information related to reproduction of the coded data, the information including a flag representing whether a recording of the extended video as a master is being performed, is further recorded in the recording medium, and wherein when the flag represents that the recording of the extended video as the master is being performed, the decoding unit decodes the coded data.

(17)

The reproduction device according to (16), wherein the recording medium is a Blu-ray Disc, and wherein the flag is included in a Clip Information file serving as the information related to the reproduction.

(18)

The reproduction device according to (16), wherein the recording medium is a Blu-ray Disc, and wherein the flag is included in a PlayList file serving as the information related to the reproduction.

(19)

A reproduction method including:

a step of reading out, from a recording medium that has recorded coded data of a standard video that is obtained by performing a brightness conversion of an extended video that is a video having a second brightness range that is wider than a first brightness range, the standard video being a video having the first brightness range, brightness characteristic information that indicates a brightness characteristic of the extended video, and brightness conversion definition information used when performing the brightness conversion of the standard video to the extended video, the coded data, the brightness characteristic information, and the brightness conversion definition information;

a step of decoding the coded data;

a step of converting the standard video obtained by decoding the coded data to the extended video on a basis of the brightness conversion definition information;

a step of outputting data of the extended video and the brightness characteristic information to a display device that is capable of displaying the extended video; and a step of outputting data of the standard video to a display device that is not capable of displaying the extended video.

(20)

A recording medium, wherein coded data of a standard video that is obtained by performing a brightness conversion of an extended video that is a video having a second brightness range that is wider than a first brightness range, the standard video being a video having the first brightness range, brightness characteristic information that represents a brightness characteristic of the extended video, and brightness conversion definition information used when performing the brightness conversion of the standard video to the extended video, are recorded, and wherein a reproduction device that reproduces the recording medium executes processing of reading out the coded data, the brightness characteristic information, and the brightness conversion definition information from the recording medium.

decoding the coded data, converting the standard video obtained by decoding the coded data to the extended video on a basis of the brightness conversion definition information, outputting data of the extended video and the brightness characteristic information to a display device that is capable of displaying the extended video, and outputting data of the standard video to a display device that is not capable of displaying the extended video.

REFERENCE SIGNS LIST 1 recording device
2 reproduction device
3 display device
11 optical disc
21 controller
21A Data Base information generation unit
22 coding processing unit
23 disc drive
31 HDR information generation unit
32 HEVC encoder
33 HDR-STD conversion unit
34 definition information generation unit
35 HEVC stream generation unit
51 controller
52 disc drive
53 memory
56 decoding processing unit
58 HDMI communication unit
71 parameter extraction unit
72 HEVC decoder
73 HDR-STD conversion unit
74 STD-HDR conversion unit
75 output unit

The invention claimed is:

1. A reproduction device, comprising:

circuitry configured to obtain brightness characteristic information in a picture of coded second video and the coded second video having a second brightness range, the second brightness range being wider than a first brightness range, decode the coded second video to obtain a second video, convert the second video to a first video having a brightness range different from the second brightness range, initiate outputting of data of the second video and the brightness characteristic information included in data of each frame to a display device capable of displaying the second video, and initiate outputting of data of the first video to a display device not capable of displaying the second video.

2. The reproduction device according to claim 1, wherein the brightness characteristic information comprises a reference screen luminance parameter.

3. The reproduction device according to claim 1, wherein the brightness characteristic information represents a brightness characteristic of the second video.

4. The reproduction device according to claim 1, wherein the first video is standard (STD) video and the second video is high dynamic range (HDR) video.

5. The reproduction device according to claim 1, wherein the circuitry is further configured to obtain brightness conversion information for use when performing a brightness conversion of the second video to the first video.

6. The reproduction device according to claim 1, wherein the data of each frame is HDMI InfoFrame.

7. The reproduction device according to claim 5, wherein the second video is converted to the first video based on the brightness conversion information.

8. The reproduction device according to claim 5, wherein the brightness characteristic information and the brightness conversion information are inserted, as auxiliary information of the coded second video data, in the picture of coded second video and are recorded in a recording medium prior to being obtained by the circuitry.

9. The reproduction device according to claim 8, wherein the coded second video data is coded data of High Efficiency Video Coding (HEVC), and the brightness characteristic information and the brightness conversion information are each included in supplemental enhancement information (SEI) of an HEVC stream.

10. The reproduction device according to claim 1, wherein the circuitry is further configured to obtain brightness capability information that corresponds to the second brightness range, from the display device capable of displaying the second video.

11. The reproduction device according to claim 1,
wherein information related to reproduction of the coded second video is recorded in a recording medium along with the brightness characteristic information and the coded second video, the information including a flag representing whether a recording of the second video as a master is being performed, and
wherein when the flag represents that the recording of the second video as the master is being performed, the circuitry decodes the coded second video.

12. The reproduction device according to claim 11,
wherein the recording medium is a Blu-ray Disc, and
wherein the flag is included in a PlayList file serving as the information related to the reproduction.

13. A reproduction method comprising:
obtaining brightness characteristic information in a picture of coded second video and the coded second video having a second brightness range, the second brightness range being wider than a first brightness range;
decoding the coded second video to obtain a second video;
converting the second video to a first video having a brightness range different from the second brightness range;
outputting data of the second video and the brightness characteristic information included in data of each frame, to a display device capable of displaying the second video; and
outputting data of the first video to a display device not capable of displaying the second video.

14. A non-transitory computer-readable medium having embodied thereon a program, which when executed by a computer causes the computer to execute a reproduction method, the method comprising:
obtaining brightness characteristic information in a picture of coded second video and the coded second video having a second brightness range, the second brightness range being wider than a first brightness range;
decoding the coded second video to obtain a second video;
converting the second video to a first video having a brightness range different from the second brightness range;
outputting data of the second video and the brightness characteristic information included in data of each frame, to a display device capable of displaying the second video; and
outputting data of the first video to a display device not capable of displaying the second video.

15. A display device, comprising:
an interface configured to output a brightness capability information of the display device to a reproduction device, and to receive video data and brightness characteristic information included in data of each frame from the reproduction device, wherein decoded video data is processed based on the brightness capability information by the reproduction device and the received video data is the processed decoded video data, and the brightness characteristic information represents a brightness characteristic; and
circuitry configured to control displaying of a video based on the received video data and the brightness characteristic information included in the data of each frame.

16. The display device according to 15,
wherein the brightness capability information indicates a brightness performance of the display device corresponds to high dynamic range (HDR).

17. The display device according to claim 15,
wherein the brightness characteristic information comprises a reference screen luminance parameter.

18. The display device according to claim 15,
wherein the circuitry is further configured to initiate a comparison of the brightness characteristic information and the brightness capability information, and initiate a determination to determine whether brightness of the received video data requires adjustment.

19. The display device according to claim 15,
wherein the interface is HDMI and the data of each frame is HDMI InfoFrame.

20. The display device according to claim 16,
wherein the brightness characteristic information comprises a reference screen luminance parameter.

21. The display device according to claim 16,
wherein the circuitry is further configured to initiate a comparison of the brightness characteristic information and the brightness capability information, and initiate a determination to determine whether brightness of the received video data requires adjustment.

22. A system comprising:
a reproduction device comprising circuitry configured to:
obtain brightness characteristic information in a picture of coded second video and the coded second video having a second brightness range, the second brightness range being wider than a first brightness range;
decode the coded second video to obtain a second video:
convert the second video to a first video having a brightness range different from the second brightness range;
initiate outputting of data of the second video and the brightness characteristic information included in data of each frame, to a display device capable of displaying the second video; and
initiate an outputting of data of the first video to a display device not capable of displaying the second video; and
a display device comprising:
an interface configured to output a brightness capability information of the display device to the reproduction device, and to receive the data of the second video and the brightness characteristic information included in the data of each frame from the reproduction device, wherein the data of the second video is decoded and the decoded data of the second video is processed based on the brightness capability information by the reproduction device, and the brightness characteristic information represents a brightness characteristic; and
circuitry configured to control displaying of a video based on the data of the second video and the brightness characteristic information included in the data of each frame.

* * * * *